United States Patent [19]
Jefferson et al.

[11] Patent Number: 5,244,146
[45] Date of Patent: Sep. 14, 1993

[54] ENERGY-CONSERVING THERMOSTAT AND METHOD

[75] Inventors: Donald E. Jefferson, Silver Spring; Arnold D. Berkeley, Potomac, both of Md.

[73] Assignee: Homebrain, Inc., Arlington, Va.

[21] Appl. No.: 880,556

[22] Filed: May 8, 1992

[51] Int. Cl.$^5$ ............................................. F23N 1/00
[52] U.S. Cl. ................................. 236/11; 236/46 F; 165/12
[58] Field of Search ..................... 236/11, 46 R, 46 F, 236/78 D; 165/12

[56] References Cited

U.S. PATENT DOCUMENTS

| | | | |
|---|---|---|---|
| 4,199,023 | 4/1980 | Phillips | 165/26 X |
| 4,725,001 | 2/1988 | Carney et al. | 236/11 |
| 4,938,684 | 7/1990 | Karl et al. | 236/46 F |

Primary Examiner—Harry B. Tanner
Attorney, Agent, or Firm—Oblon, Spivak, McClelland, Maier & Neustadt

[57] ABSTRACT

A thermostat is described for controlling a furnace for a hot air, hot water, or steam heating system which delivers heat to a heated space via a delivery system. The thermostat causes the system to conserve energy by limiting the "burn" or on-time cycle to a system-specific interval during which the heat exchanger of the furnace operates in its linear region. At the end of this interval (designated a "MAX_ON" interval), the burn cycle is terminated, but delivery of heat to the heated space continues for a secondary-delivery interval during which the furnace's blower (or other delivery means) continues operation. The secondary-delivery interval ends when the residual heat has been extracted from the furnace and delivery system. The system then remains off until the next burn cycle begins. The duration of the off-time interval is such that heat input to the heated space and heat outflow to the ambient from the heated space are kept in equilibrium. Methods and apparatus are described for making a site-specific measurement of MAX_ON and secondary-delivery intervals, at a furnace plenum or in a hot-air delivery duct.

85 Claims, 19 Drawing Sheets

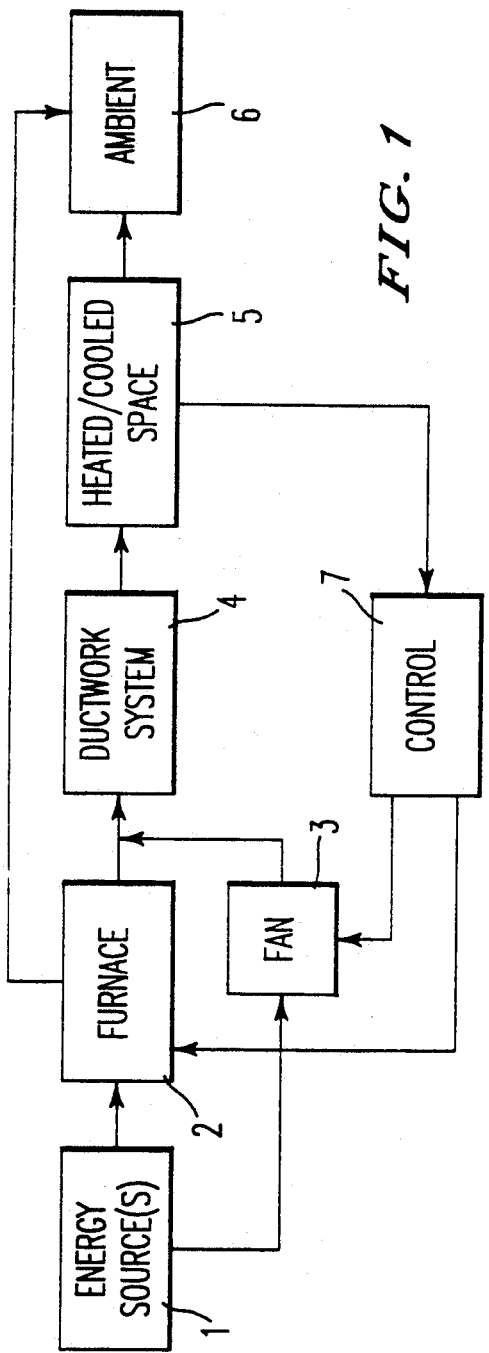
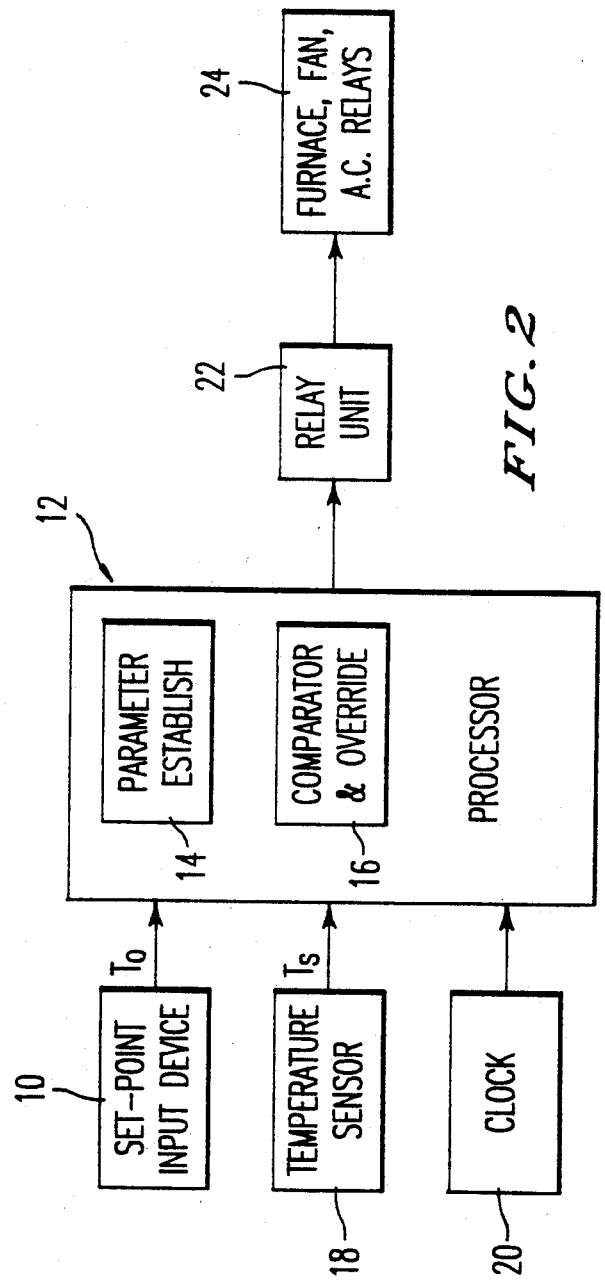

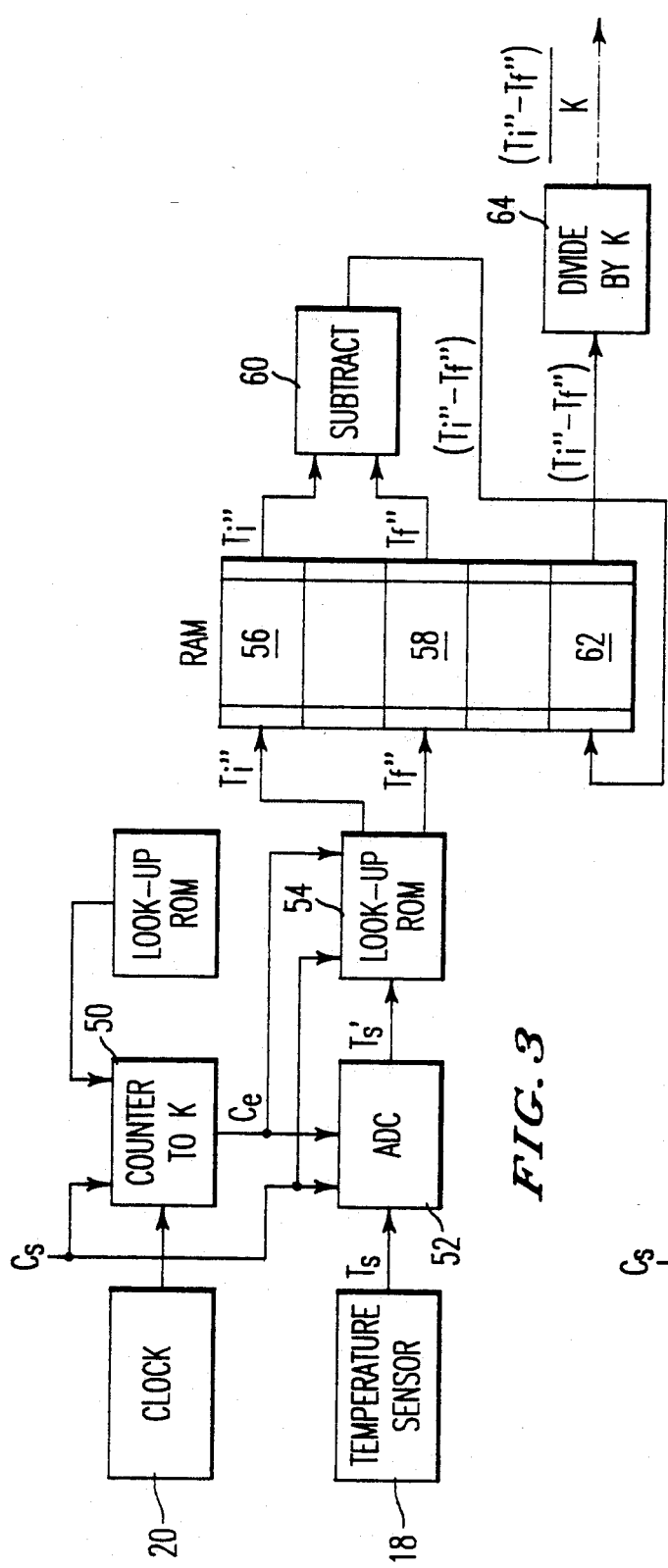
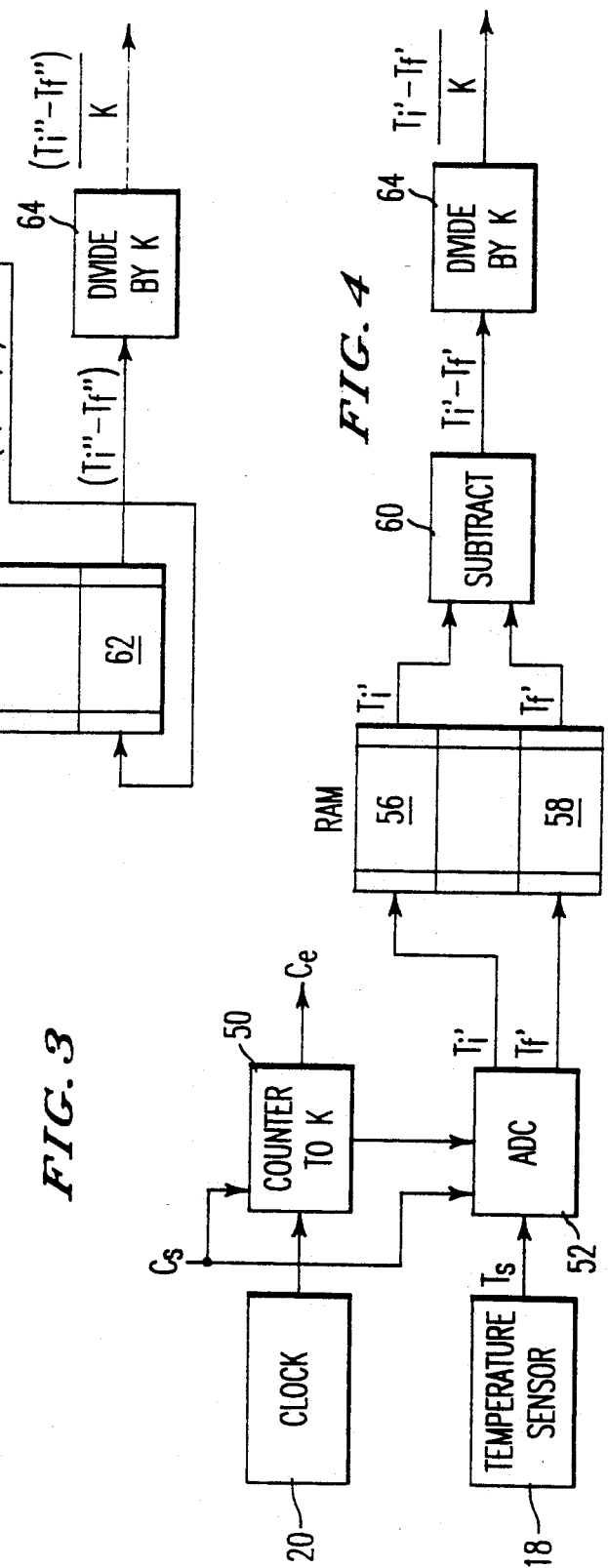

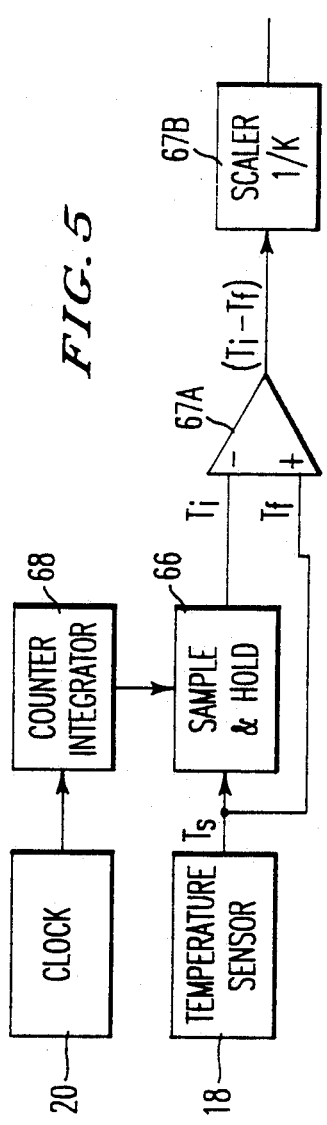
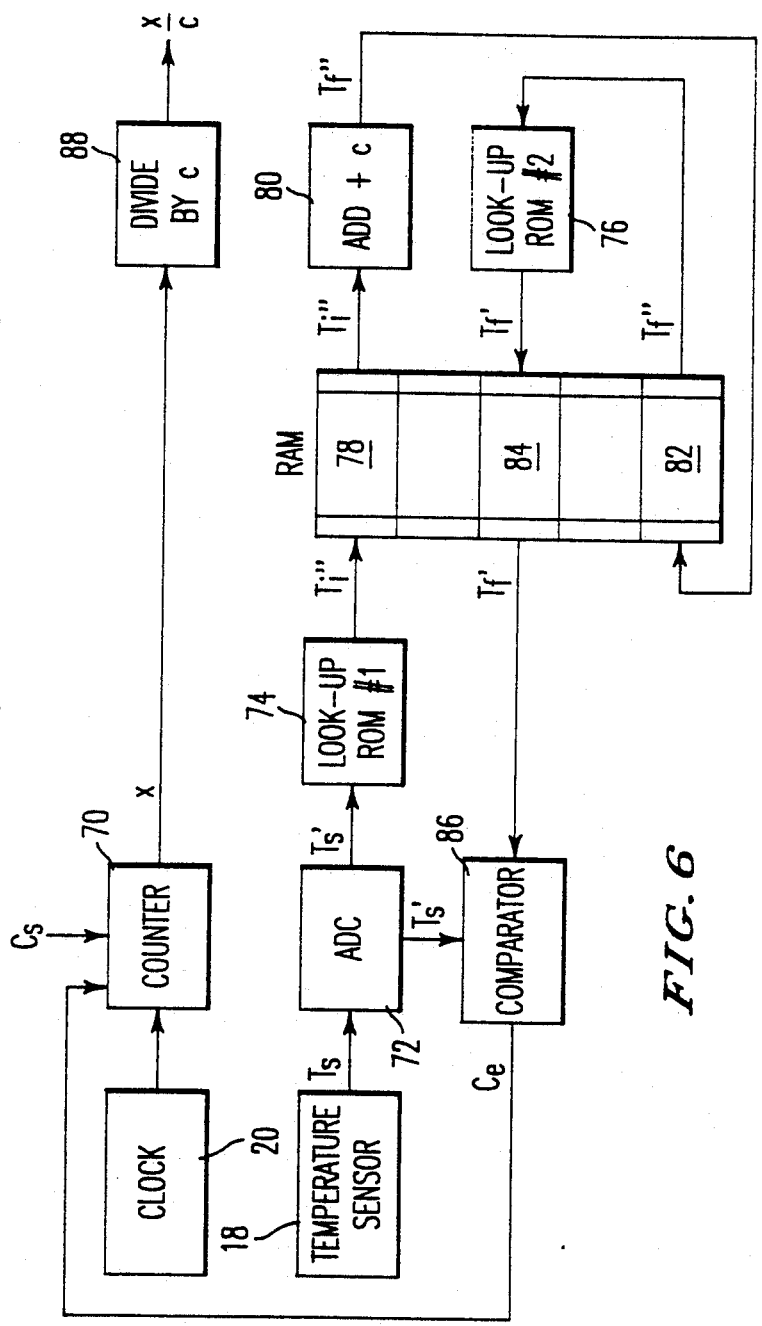
FIG. 5
FIG. 6

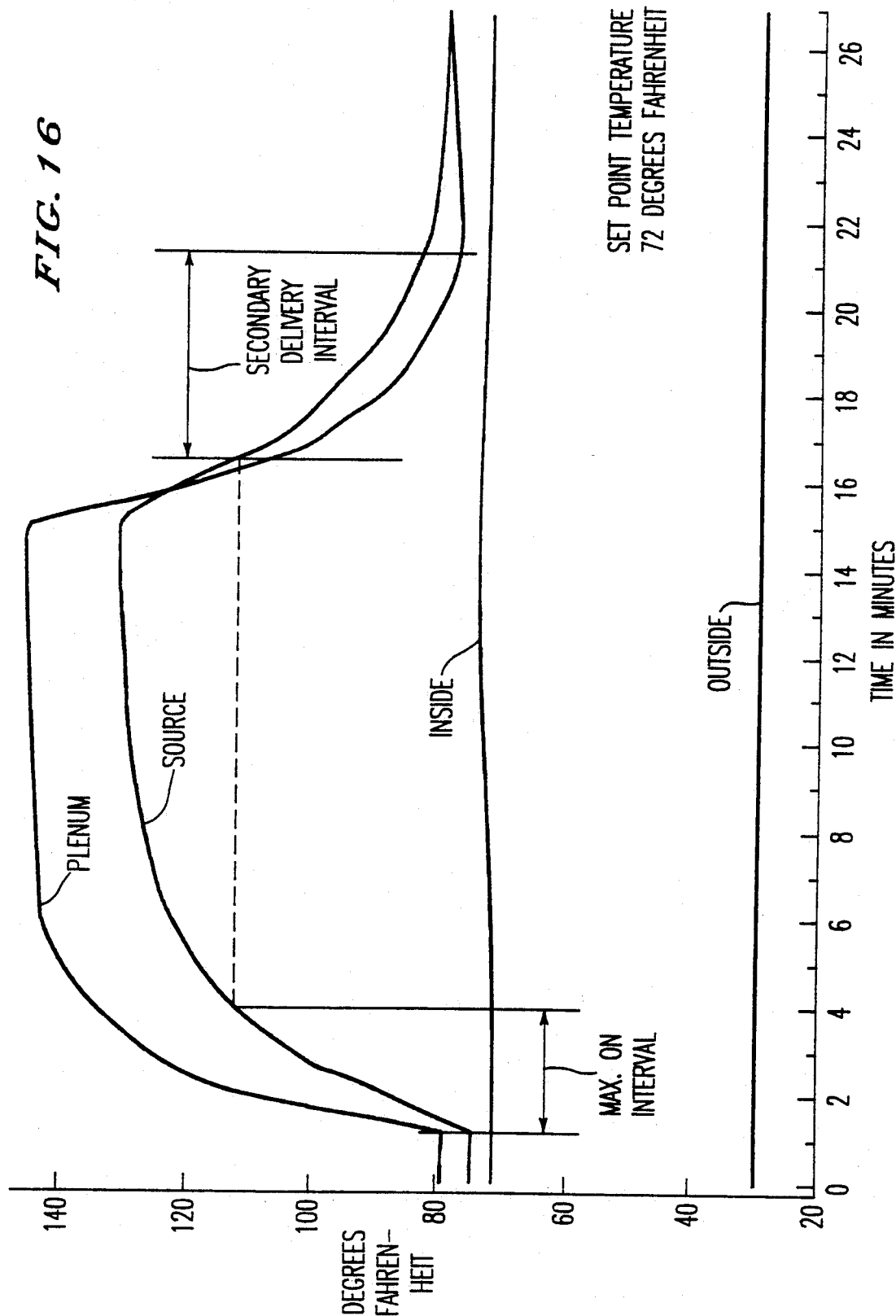

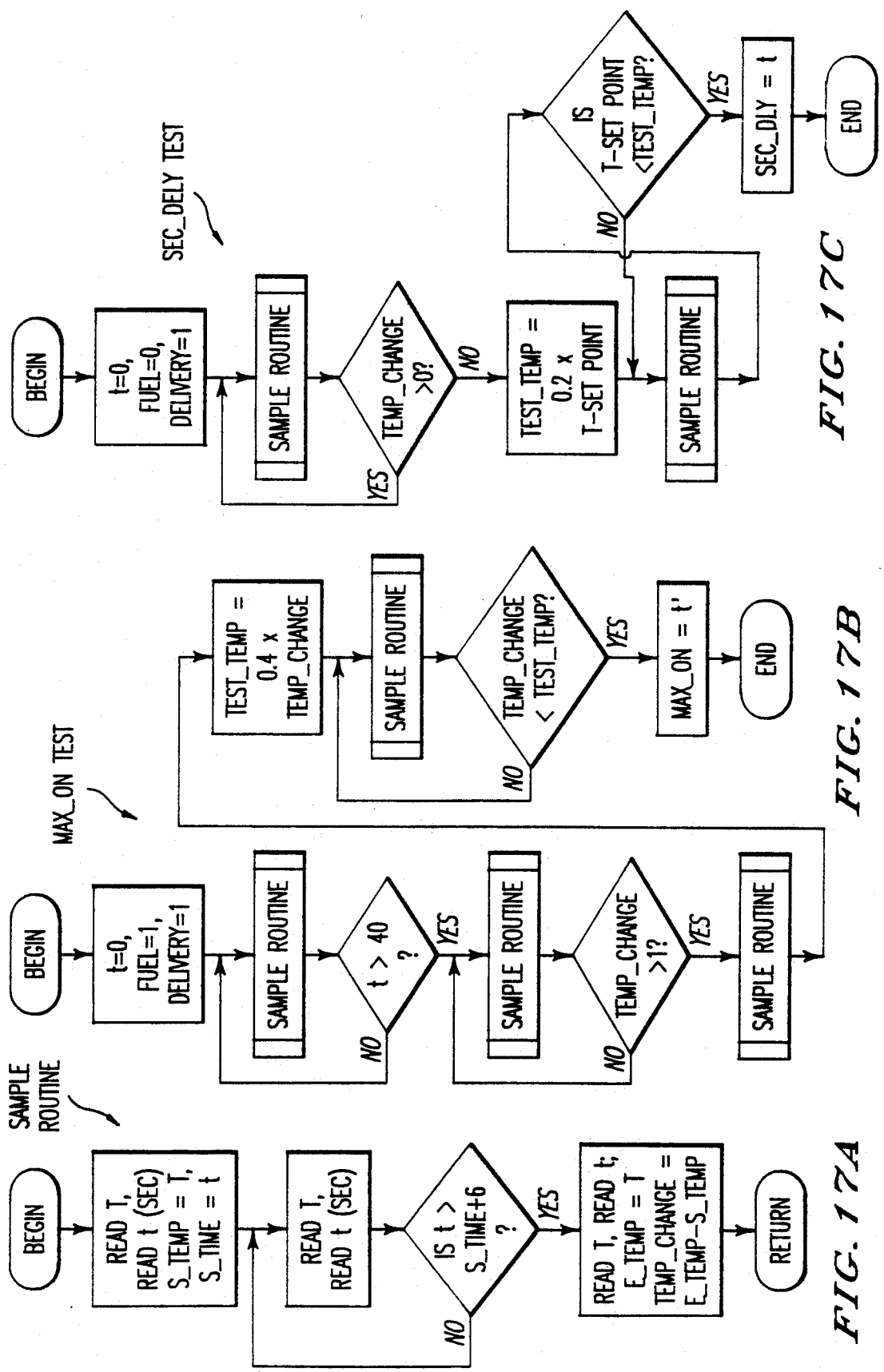

ENERGY-CONSERVING THERMOSTAT AND METHOD

BACKGROUND OF THE INVENTION

This invention concerns a thermostat for controlling heating, ventilation, and air conditioning (HVAC) systems in a manner, that conserves expenditure of energy, and a method for operating HVAC systems under the control of such a thermostat to conserve energy. The invention is directed particularly to such operation of furnaces of such systems.

The use of short heating cycles to conserve energy in furnaces is taught by, among others, Phillips et al. U.S. Pat. No. 4,199,023. The Carney et al. U.S. Pat. No. 4,725,001 generally reviews the prior art in this field including on/off cycling techniques previously taught.

Phillips states that short heating cycles should be used because the heat exchanger (plenum) of a furnace reaches a relatively high temperature ("saturates") in two to five minutes. The rate of heat transfer from the combustion chamber (including, as used here, combustion gases and heat transfer surfaces) to the plenum then decreases substantially, because said rate is a function of the difference between combustion-chamber temperature and plenum temperature. Hence, the longer a combustion interval, more heat goes up the chimney; at the same time, less heat is transferred to the plenum to be delivered therefrom to the heated space. Phillips asserted that the furnace, for most efficient operation, should be on for less than two minutes in any cycle and off for greater than one minute. However, Phillips did not provide a basis for selecting these intervals, and in his description of his preferred embodiment he prescribed on/off cycles such as 4 minutes on, 0.5 minutes off, and even 4.5 minutes on, 0 minutes off (a 100-percent duty cycle).

Carney et al. attempted to optimize furnace operation by employing an "increment/decrement" cycling technique in which the on-time interval during which fuel is consumed and heat is transferred to the exchanger is sought to be minimized; the purpose is to avoid saturation of the heat exchanger. Carney et al. also sought to maximize the off-time or "pause" interval during which the furnace consumes no fuel and the heat exchanger returns toward its temperature at the beginning of the on-time interval.

While the Carney et al. thermostat may provide savings in energy usage, the present inventors believe that its technique has limitations that prevent achievement of savings beyond a certain point. More specifically, its technique of manipulation of on-time and off-time intervals until the system runs into the edge of the deadband of the set-point is only indirectly related to the HVAC system parameters and the model characterizing the system. That in turn limits the optimization possible, particularly when system parameters (such as ambient temperature) change. Hence, the Carney et al. thermostat can cause the HVAC system to operate under conditions of heat-exchanger saturation or nonlinearity, which leads to fuel waste. In addition, the cycling system using incrementation or decrementation of on-time and off-time intervals requires a many-cycle period to catch up with changes in temperature on load.

While Carney et al. and Phillips et al. recognize the desirability of short on-time intervals, they (as well as others using increment/decrement cycling methods) fail to provide thermostat systems that consistently avoid partial saturation of the HVAC system's heat exchanger. Rather, their and other prior art thermostats utilize "continuous burn" cycles (also referred to as 100% duty cycles) to reach set-point temperature, when that is deemed necessary to overcome a temperature excursion. They do so despite the fact that such operation leads to full or partial saturation of the heat exchanger with a consequent adverse effect on fuel consumption efficiency.

Further, total saturation of a heat exchanger is not the only operating region in which the exchanger is inefficient. A heat exchanger may not be fully saturated to the point where no heat exchange at all occurs. Nevertheless, to the extent that the length of the fuel-consuming interval is so long that significant nonlinearity occurs, then inefficient fuel utilization occurs because of relatively poorer heat transfer. It is believed that prior art thermostats fail to teach the importance of consistently remaining in a linear operating region of the HVAC system's heat exchanger and avoiding more than minimal partial saturation of the heat exchanger.

Thermal characteristics of HVAC systems are often specific to a particular installation, so that proper utilization of such characteristics to improve efficiency requires site-specific measurements, or at the very least equipment-specific measurements. It is believed that prior thermostat art (1) does not address the question of how to determine and utilize the relatively linear region of operation of heat exchangers, and (2) does not address how to do so on a site-specific basis.

It is also believed that the prior art does not address the issue of making heat flux from the furnace to the heated space equal heat flux from the heated space to the ambient. In particular, the prior art does not address determination of system parameters characterizing such flux, so as to regulate it at a desired equilibrium. Rather, prior art devices in this art depend on temperature measured at the thermostat to regulate space temperature, on a feedback basis. Thus, when the difference between measured space temperature at the thermostat and a predetermined setpoint temperature exceeds a predetermined threshold, the heating system is actuated (or deactivated). To avoid what is considered undue fluctuation or "hunting," which may at times result from slight drafts caused by a person walking past the thermostat, such devices typically employ wide "deadbands" providing hysterisis to counteract such effects. That feature is inconsistent, however, with maintaining a tight temperature regulation.

OBJECTS AND SUMMARY OF INVENTION

It is an object of the present invention to provide a thermostat for controlling the operation of HVAC systems (including, among other things, forced-air heating and boiler heating) to conserve energy usage. It is intended that this object should be accomplished by making the operation of the HVAC system that the thermostat directs be responsive as directly as possible to the relevant parameters of the system comprising the house (or other "defined space") that is heated, HVAC system, and ambient. The inventors consider the principal relevant parameters of such systems to be the linearity characteristics of the heat exchanger, the heat-flux parameters of the system during on-time (fuel-using) and off-time (nonfuel-using) intervals, and system constraints dictating minimum on-time and off-time intervals. Since some of these parameters are site-specific, it is a further object of the invention to provide a means of determining site-specific factors and incorporating them into the control mechanisms of a thermostat. It is a further object of the invention to utilize such parameters in order to maintain thermal equilibrium of the furnace, heated space, and ambient, considered as a system.

It is a further object of the invention to decrease peak-load of utilities, as well as base-load, by increasing the efficiency of individual HVAC systems, thereby decreasing their fuel usage. The invention decreases peak-load usage of fuel by limiting the duty cycle of each HVAC system using the invention to a predetermined fraction of 100%, thereby causing the thermostat of the invention to interdict any "continuous burn" mode in that HVAC system. The predetermined fraction of 100% is such that the HVAC system preferably operates at all times with a substantially unsaturated heat exchanger. This simultaneously (1) increases the efficiency of fuel utilization in all HVAC systems equipped with the thermostat of the invention and (2) prevents the peak-load fuel consumption by a set of randomly distributed HVAC systems using the thermostat from ever exceeding a predetermined fraction of the sum of their maximum capacity ratings, since none of the set is permitted to operate on a 100% duty cycle.

For example, where a particular thermostat causes its HVAC system to operate for an on-time (fuel-consuming) interval of no more than 3 minutes and an off-time (not fuel-consuming) interval of no less than 7 minutes, that HVAC system can never have a duty cycle greater than 30%. By the same token, that HVAC system cannot consume move than 30% of its hourly BTU rating, translated into terms of fuel, even at peak load time. Accordingly, at peakload time, a randomly distributed set of such units operates at no move than 30% of the sum of the units' ratings. To be sure, different HVAC systems will have different capacities and different duty cycles, but a statistical aggregation of HVAC systems using thermostats of the invention will operate in a mode that does not allow all of them to run at a 100% duty cycle at peak load times, and instead forces them to operate at a fraction of that fuel consumption.

The thermostat of the invention is preset to have a fuel-using interval that is not so long that nonlinear operation of the heat exchanger occurs. This results in a site-specific maximum furnace on-time interval, since the linear zone of operation of the heat exchanger of the furnace is preferably measured at the particular site. Further, there is a site-specific minimum off-time interval, similarly measured. (It is possible, but not preferable, to determine a maximum on-time interval for the brand and model of furnace, disregarding variations in parameters from site to site.)

The invention, as described hereinafter, uses several different approaches for accomplishing these objectives. The thermostat of the invention operates with a maximum furnace on-time interval, which is based on the time it takes for the heat exchanger to enter a nonlinear operating region, and the duration of this interval is substantially independent of variable factors such as outdoor ambient temperature and indoor set-point temperature. Ordinarily, the HVAC system operates with that particular furnace on-time interval. The furnace off-time interval is a variable, dependent largely on indoor and outdoor temperature, and can be determined in any of several different ways.

In one implementation, the thermostat measures (1) the time required to heat the heated space by a given small temperature increment, and (2) the time required for the heated space to lose the same heat to the ambient by leakage. The thermostat then uses parameters derived from these measurements to balance the ratio of furnace on-time to furnace off-time, so as to deliver just as much energy to the heated space as the space dissipates to the ambient.

Accordingly, the thermostat of the invention times the furnace on-time interval required for temperature in the heated space to rise by a given fraction of a degree. The thermostat also times the furnace off-time interval during which the temperature of the space falls by a given fraction of a degree. The ratio of such intervals represents the desired ratio of furnace on-time to off-time, which is typically in the range of 3:1 to 5:1. The heated space then receives energy at the same overall rate as it leaks energy to the ambient.

However, imbalances in energy credits and debits can occur. For example, the ambient temperature may change, thus changing leakage; or a window or door may be opened, changing leakage. The thermostat therefore contains override circuitry. If room temperature falls below a given margin from set-point temperature, the furnace is turned on notwithstanding the on-time/off-time ratio previously described. By the same token, if room temperature rises above a given margin from set-point temperature, the furnace is turned off notwithstanding the on-time/off-time ratio previously described. The thermostat employs comparator circuits to ascertain whether room temperature is less than set-point temperature by more than a predetermined margin. If so, the furnace is turned off for a shorter off-time interval. Similarly, if room temperature exceeds set-point temperature by more than a predetermined margin, the furnace is turned off for a longer off-time interval. Occurrence of such an energy imbalance may reflect a change in the relevant system parameters; therefore, a new parameter measurement is made and on-time/off-time ratio is updated.

Further implementations of the invention involve different methods of determining system parameters, methods of operating the system with nonlinear sensors, and alternative expedients for balancing energy credits and debits in accordance with the principles described previously. Both hardware (digital and analog) and software implementations of these procedures are described. In one implementation, the off-time interval is determined by the system's temperature sensor. Thus, the off-time interval may be terminated when the temperature falls (assuming a heating mode) to the level it had at the beginning of the on-time interval. In another implementation, the off-time interval may be terminated, instead, when the temperature falls to a set-point level.

An optional disabling mode is described, which can be provided for the thermostat to permit temporary nonlinear or even continuous operation in special circumstances, if and when that feature is considered necessary for customer satisfaction, even though the inventors consider that this mode of operation interferes with the energy-conserving objects of the invention and its feature of lessening peak load.

It is contemplated that the main benefit of the invention will be realized in replacing of existing thermostats for existing HVAC systems. However, the invention may be practiced also with new installations.

BRIEF DESCRIPTION OF DRAWINGS

FIG. 1 is a block diagram of the entire system comprising building, HVAC unit, ductwork or pipe system, ambient, and control.

FIG. 2 is a block diagram of the elements of a thermostat.

FIG. 3 is a block diagram of a subsystem for measuring thermal parameters of a heating system, in which a look-up ROM compensates for analog temperature-sensor nonlinearities.

FIG. 4 is a block diagram of a version of the same subsystem for measuring thermal parameters of a heating system, in which temperature-sensor nonlinearity is disregarded.

FIG. 5 is a block diagram of analog circuitry for implementing the subsystem of FIG. 3.

FIG. 6 is an alternative subsystem for measuring thermal parameters of a heating system, using look-up ROM compensation for nonlinearity.

FIG. 11 is directed primarily to portions of the circuitry relating to time measurements. FIG. 12 is directed primarily to portions of the circuitry relating to temperature sensing and setpoints. FIG. 13 is directed primarily to portions of the circuitry relating to system states.

FIG. 16 shows a graph of system temperatures in relation to determination of maximum fuel-on and secondary-delivery intervals.

FIG. 17 shows a flowchart of a programmed-microcontroller or microprocessor implementation of the device of FIG. 15.

DETAILED DESCRIPTION OF INVENTION

I. Background-System Model

Elements of HVAC System

Figure 7:
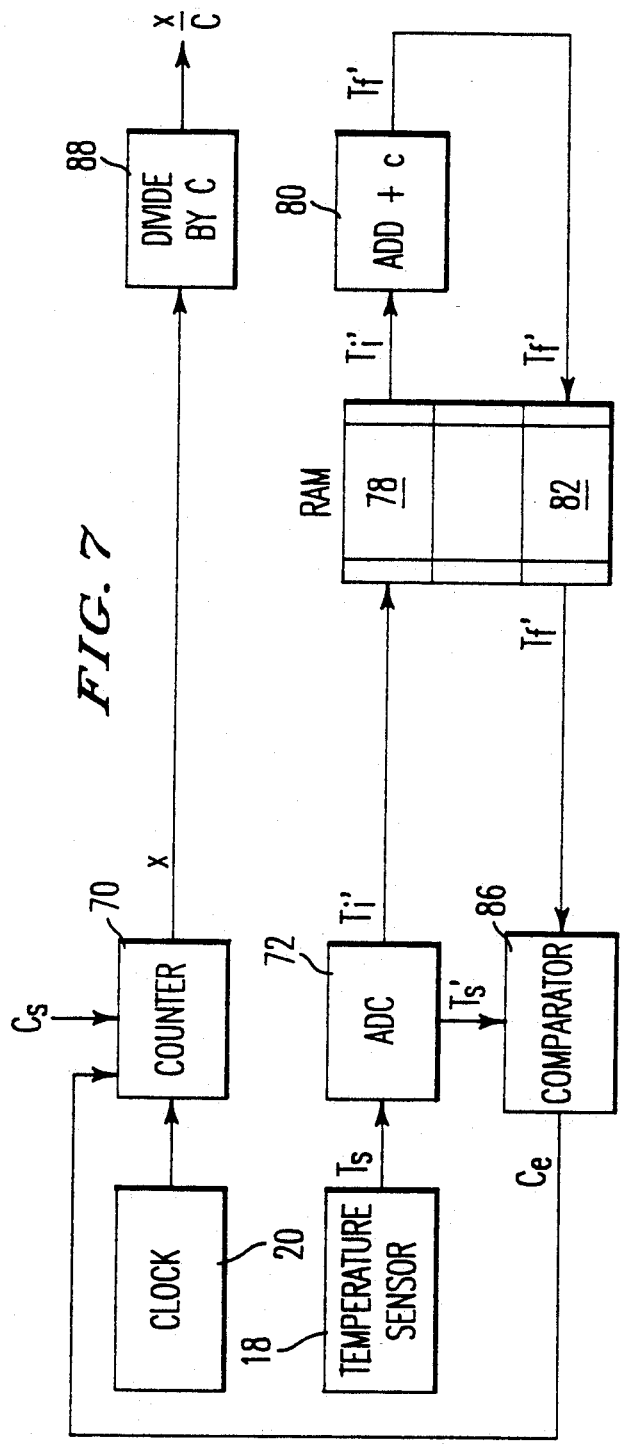
FIG. 7 is a version of the subsystem of FIG. 6 for measuring thermal parameters of a heating system, in which sensor nonlinearity is disregarded.

The invention may be understood more readily in the context of a conceptual model of the physical context in which the apparatus of the invention is placed and operates. FIG. 1 shows a block diagram of an entire HVAC system, including the external environment to provide a closed system.

An energy source or sources 1 deliver power to a temperature-modifying apparatus 2. The apparatus is primarily intended to be a forced-air furnace but it may also be a hot-water on steam boiler system or other heating system. Power is also delivered to a fan 3 for forced-air ventilation, or another delivery means such as a hot-water pump. The energy may be electrical, as it ordinarily will be for a fan and may at times be for a furnace. The energy source (fuel) for a furnace may more commonly be natural gas, fuel oil, or coal.

Furnace 2 and fan 3 cooperate to deliver heated air via a ductwork system 4 to a heated space 5. Furnace 2 and heated space 5 lose energy to an ambient (environment) 6. Furnace energy losses are substantially all in the form of heat lost up the chimney.

A control 7 (thermostat) controls operation of furnace 2 and fan 3 in response to conditions measured in space 5.

In a boiler heating system, heat is delivered to the heated space via a pipe and radiator system, which may be pump-assisted, rather than via the ductwork system and fan of FIG. 1. However, there is no difference in the basic concept: energy is put in, ambient energy leakage occurs, and a control directs the HVAC system on the basis of conditions in the heated space. In general, whatever is said in this specification about forced-air hot-air heating systems having fans applies with equal force to hot-water heating systems using pumps and steam systems. However, it should be recognized that the thermal mass of a hot-water or steam system is primarily associated with the heated fluid, while that of a hot-air system is primarily associated with the plenum and ductwork.

Electrical-Analogy Model

Another model of the entire system (not shown diagrammatically) is based on an electrical analogy. In this model, a furnace delivers energy (represented as charge in coulombs, delivered at a rate represented by current in amps) to a ductwork (or delivery) system and also loses some energy to the ambient. In this model, charge is delivered in pulses representing fuel-consuming states. The model (as described here) does not address the nonlinearity of the heat exchanger of the system.

The ductwork system delivers energy to a heated space, which has a space temperature. (Temperature is represented by voltage in this model.) The ductwork system has a characteristic impedance (represented in the model as delivery impedance in ohms), which hinders delivery of energy to the space. A second characteristic impedance (leakage impedance) of the system is found between the heated space and the ambient; it hinders leakage of energy from the space to the ambient.

The heated space is analogous to a capacitor, which is periodically charged via the delivery impedance (ductwork system) and which continuously leaks current to the ambient via the leakage impedance. In this model, the ambient is regarded as a voltage generator opposing leakage current from the capacitor. Thus, the energy leakage from heated space to ambient is proportional to the difference between a capacitor voltage representative of room temperature and a voltage-generator voltage representative of ambient temperature, and the same energy leakage is inversely proportional to the leakage impedance.

A refinement of this electrical model would include diodes. Thus, the capacitor representing the heated space can leak charge only to the ambient, and cannot leak charge backwards through the delivery impedance to the furnace;, hence, a diode is in series with the delivery impedance. Also, the furnace can lose charge to the ambient (chimney loss), via a furnace-leakage impedance, but the ambient cannot deliver charge to the furnace; hence a second diode is in series with the impedance between furnace and ambient. Also, there is some capacitance associated with the ductwork system.

To summarize the foregoing electrical model, charge (current) is delivered in pulses to a capacitor via a delivery impedance. The capacitor leaks charge (current) continuously to the ambient via a leakage impedance.

It follows from this model that a steady-state condition in which the voltage on the capacitor (representing the temperature of the heated space) remains substantially level is one in which the integral of the current pulses delivered to the capacitor equals the integral of the leakage current from the capacitor. In other words, if the same amount of energy is delivered to the heated space as leaks from it, the temperature of the space stays the same. For equilibrium, energy debits and credits must be balanced.

Thus a basic principle of this invention is to operate the HVAC system in a manner that keeps energy credits balanced with energy debits, as described below. That result is advantageously accomplished by measuring certain thermal parameters and using them to determine the relation of off-time to on-time. Such parameters change with environmental conditions, and the system drifts from set-point. Therefore, the foregoing procedure must be supplemented by expedients to counteract such drift, which are described below.

II. General Description of Thermostat

The thermostat of the invention is illustrated as a block diagram in FIG. 2.

Set-point input

A set-point input device 10 feeds a signal $T_o$, which is representative of set-point temperature (for example, 70° F.), to processor 12. Set-point input device 10 is contemplated for commercial embodiment as a keypad digital input transmitting a scan code to processor 12, where the keypad is of the type found in hand-held calculators. Such keypads are common shelf items available from many sources.

Other set-point input expedients may be used. For example, instead of using a keypad, alternative digital input devices can be used. One such device is commonly found in electronic clock-radios. A button is held down, actuating a 1–10 Hz pulse source that feeds a signal to a counter and also to a decoder for an LED or LCD array. The user stops holding the button down when the desired number is shown on the array. Thus, the pulse source can step the array through a series of temperatures from, for example, 50° F. to 90° F., in increments such as 1.0°. The user stops stepping the array when a desired setpoint temperature is displayed. The user then enters that setpoint and proceeds to enter the next relevant item, if any. In a variation on this system, one button is held down to increment a reading, a second button is held down to decrement the reading, and a third button is used as an "Enter" key. (The latter is used when multiple set points are entered on other multiple entries must be made.) Digital watches use a variation on this type of circuit, in which a button is pressed to increment an LCD array reading by one unit.

Another such digital input device has been used to set times and temperatures for microwave ovens. The user twists a dial, which causes pulses to step a counter and LED or LCD array, as above. When the LED or LCD array shows the desired number, the user stops twisting the dial, and can reverse direction if the desired number is overshot.

Set-point input device 10 may also be implemented by a potentiometer connected to a reference voltage, where the potentiometer has an indicator marked in °F. and/or °C. For any given temperature setting of the potentiometer, its output provides a voltage signal equal to the temperature sensor output voltage (discussed below) that is representative of that temperature. Here, the potentiometer acts both as input device and storage (memory) device for the input signal (an analog voltage).

Figure 12A:
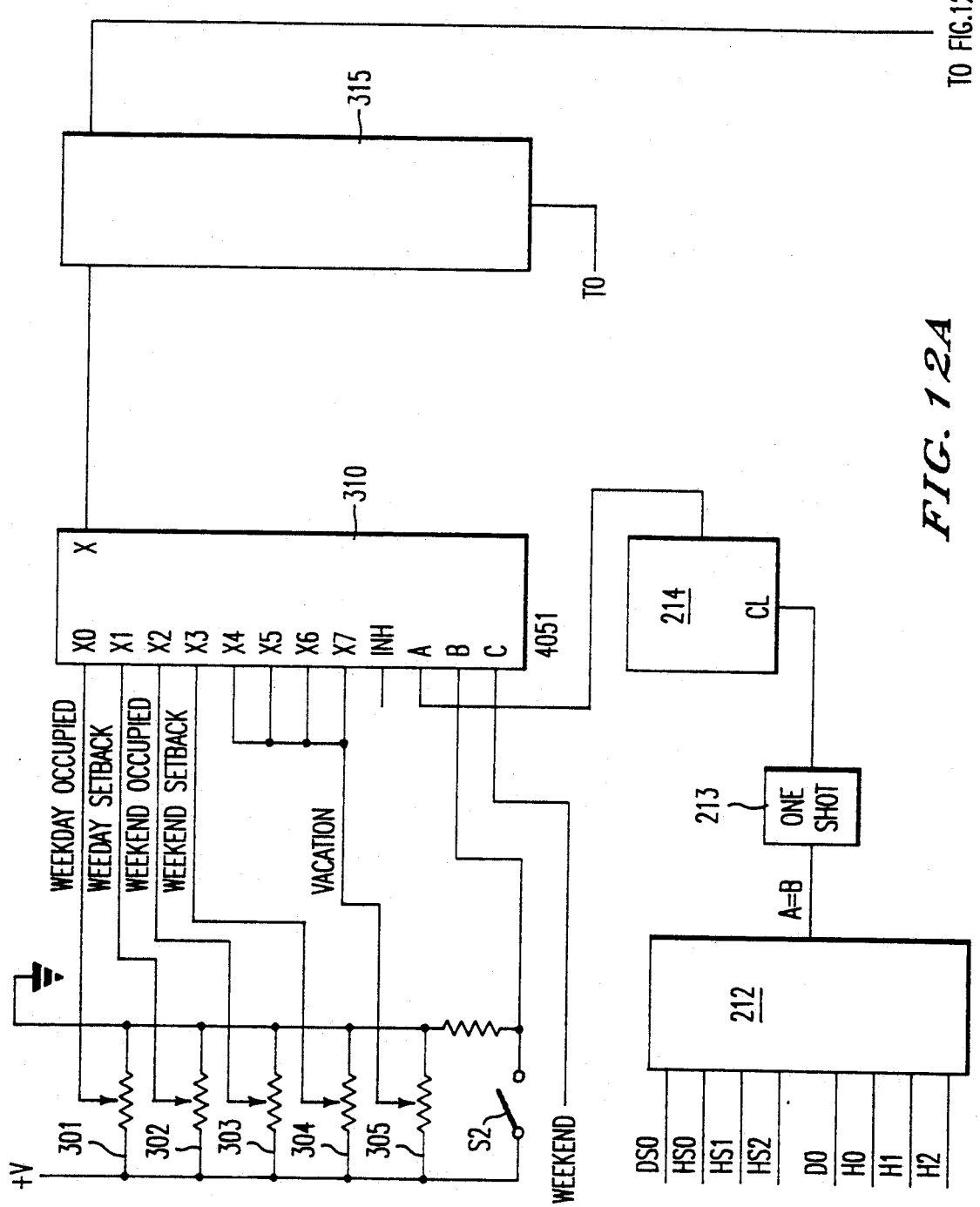
Figure 12B:
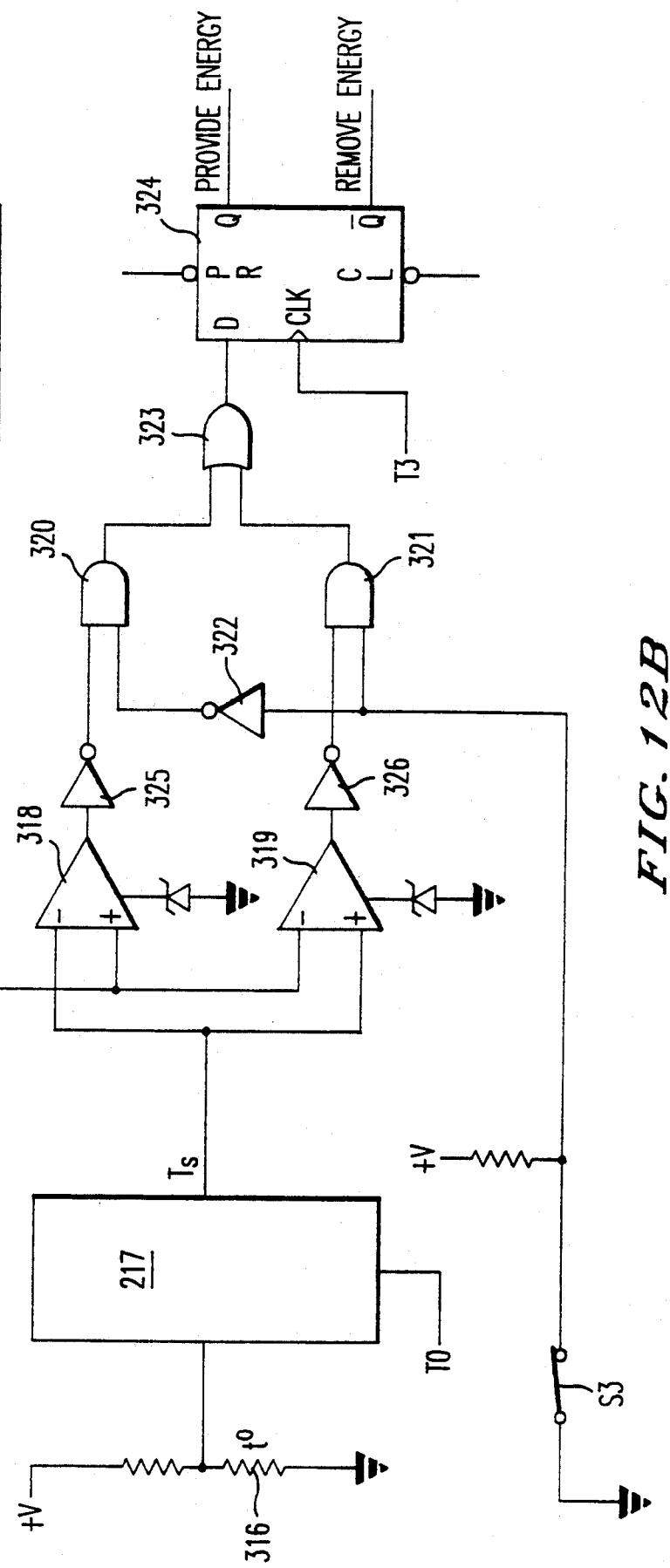

A plurality of potentiometers may be used when there are several different set-points, for example, one for day and another for night, or one for weekdays and another for weekends. (FIG. 12 shows such an arrangement.) Instead of using a plurality of potentiometers, which may be expensive, a single precision potentiometer can be used and its reference voltage can be stored in an integrated circuit storage chip, such as an ISD1012 chip (Information Storage Devices, Inc., San Jose, Calif.), which is a CMOS EEPROM similar in function to a set of sample-and-hold circuits or to a set of capacitors driven by field-effect transistors (FETs).

Voltage-divider IC chips may be used in lieu of potentiometers. Conventional combinatorial logic circuitry is used to select and enable reading of the appropriate voltage signals from these chips.

Set-point storage

Figure 10:
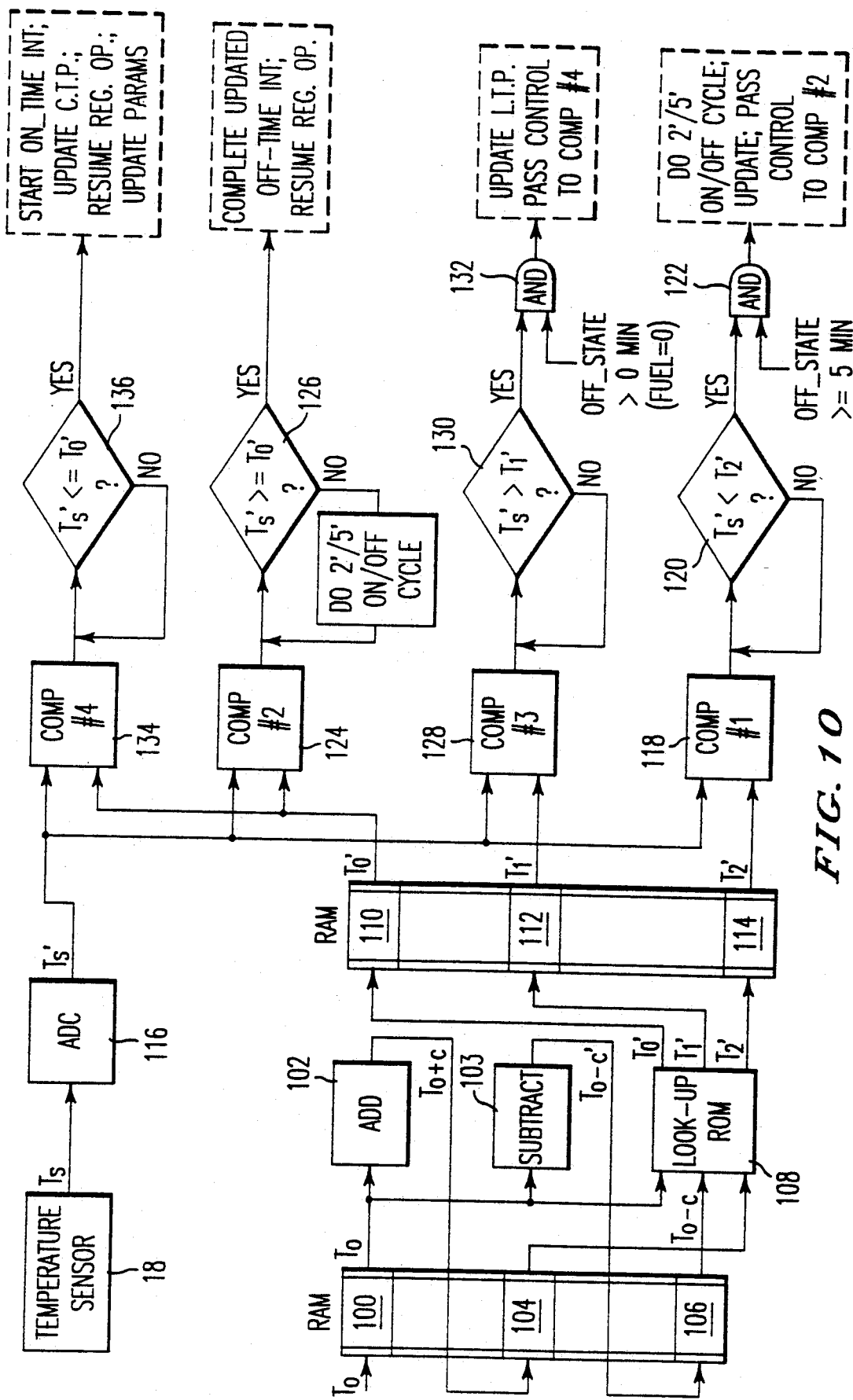
FIG. 10 is a block diagram of a combinatorial-logic comparator-and-override subsystem for counteracting system drift away from set-point temperature.

As shown in FIG. 10, $T_o$ is stored in a read-write memory location for use in correcting undershoot and overshoot, as described below in section V. This is for the implementation using a keypad or other digital input. In the case of an implementation using a device such as a potentiometer or voltage-divider chip, the device itself stores the set-point signal and $T_o$ is read from the device, as needed. Additionally, as indicated above, voltage readings can be stored in analog storage integrated circuits.

Processor 12 includes a parameter-establishment subsystem 14 for establishing the thermal parameters of the system, and a comparator-and-override subsystem 16 for overcoming drift from setpoint temperature.

Temperature sensor

A temperature sensor 18 feeds to processor 12 a signal $T_s$, which is representative of current room temperature. Sensor 18 is advantageously implemented as a Yellow Springs Instrument Co. YSI 44008 thermistor, a National Semiconductor Corp. LM 335/LM 336 diode bridge and precision resistor network, or a National Semiconductor Corp. LM 34D temperature sensor. Thermistor temperature sensors such as the YSI 44008 have nonlinear temperature characteristics, which may call for circuitry adaptations discussed below. More linear temperature characteristics can be obtained from other devices, such as thermocouples and precision wire-alloy devices. Such devices typically produce less output signal than thermistor devices, however, thus requiring use of an amplifier to boost the signal.

Bimetal-strip relays may also be used as temperature sensors, but they are less accurate and require more complex mechanical expedients. However, a bimetal-strip sensor may appropriately be used as a backup device, operated in parallel with the thermostat of the invention to prevent freezing of pipes in the event of failure of the invention's electronic circuitry in winter. Thus, a rugged bimetal strip device set for 40° F. to 50° F. could turn on a furnace (or other heating device) before freezing occurred, despite inoperability of the electronic circuits described hereafter. But bimetal strip devices are considered unsuitable for the main purposes of the present invention.

For the foregoing reasons, it will be apparent that engineering tradeoffs are involved in the selection of a temperature sensor. Different temperature sensor expedients may be utilized as a matter of design choice, while still performing the same function to accomplish the same result in a way that is the same for purposes of this invention. Hence, while the inventors consider thermistors preferable for commercial and engineering reasons at the present time, the invention is not limited to any particular form of temperature sensor.

Referring again to FIG. 2, a clock 20 feeds a signal (pulse train) to processor 12, to provide a means for measuring elapse of time. Clock (timer) chips are common off-the-shelf items, and microcontroller chips frequently include them as integral elements.

Processor unit

Processor 12 can be implemented in several way. One implementation described herein is a collection of discrete analog and digital circuits. Another contemplated implementation is in the form of integrated combinatorial logic circuitry (gate array). Another contemplated implementation is a programmed microcontroller, microprocessor, calculator chip, or other device capable of performing addition, subtraction, and similar arithmetic and logical operations, in association with RAM, ROM, registers, and/or other information-storage devices. Implementations of processor 12, and subsystems thereof, are described below using combinatorial logic circuitry, analog circuitry, and programmed microcontrollers (or other CPUs). While not all aspects of the system are exemplified by each of the foregoing types of implementation, in those instances where only some forms of implementation (for example, combinatorial logic circuitry) are described below it is within the skill of those familiar with design of electronic circuitry to go from the implementations expressly described to alternative implementations.

Relay unit and output signals

Processor 12 sends on-time and off-time signals to the furnace, via relay unit 22. The electromechanical or solid-state relays of unit 22 cause initiation and termination of on-time (fuel-burning) states in the furnace or air conditioner. The relays control 24 VAC power lines used in conventional HVAC systems to actuate fan, furnace, and/or air conditioning control relays 24 at the site of the fan, furnace, and/or air conditioner. The relay unit 22 is advantageously implemented as any of a number of commercially available electromechanical or solid-state devices, such as TRIACs, SCRs, or power FETs. Unit 22 is also conveniently implemented with optoisolators. Depending on the capability of the I/O provided by the selected microcontroller or other processor 12 implementation, a driver may or may not be needed to drive the optoisolator or other output device.

The output signals from the thermostat, which actuate the coils of 24 VAC fan, furnace, and/or air conditioning control relays 24, are referred to hereinafter at times as FUEL-1 signals, FUEL-0 signals, DELIVERY-1 signals, and DELIVERY-0 signals. A FUEL-1 signal causes 24 VAC power to be applied to the coil of a relay actuating a furnace or boiler; a FUEL-0 signal causes such power not to be applied. A DELIVERY-1 signal causes 24 VAC power to be applied to the coil of a relay actuating a fan (or other delivery means, such as a hot water propulsion pump in a hot-water heating system); a DELIVERY-0 signal causes such power not to be applied.

A latch circuit, such as a bistable multivibrator, is advantageously included as part of the I/O between thermostat and HVAC system. When a FUEL-1 or DELIVERY-1 signal is sent to an HVAC system relay coil, for example, by reason of a pulse "1" signal in a circuit of the thermostat, the relay coil should remain energized (or magnetically latched) until a FUEL-0 or DELIVERY-0 signal is sent to change the state of the system. Thus, when it is said hereinafter that a FUEL-1 or DELIVERY-1 signal is sent to HVAC system relay coils, it should be understood that such a signal remains in effect until countermanded (or replaced) by a FUEL-0 or DELIVERY-0 signal.

III. Operation of Furnace

The following description is directed primarily to operation of a furnace in accordance with the principles of the invention. However, the same principles also apply to operating other forms of heat-modifying apparatus, such as hot-water boiler/pump and steam-boiler systems, to the extent that their system hardware lends itself to such operation.

A. General Operation of Furnace

A preferred method for operating the HVAC system for heating comprises the following steps: First, the furnace operates for a predetermined interval (a "maximum fuel-on interval"), during which the furnace consumes fuel and the delivery system delivers heat to the heated space. Then, the furnace stops consuming fuel; a fuel-off interval begins and continues until the next fuel-on interval occurs. At the beginning of the fuel-on interval, or very shortly thereafter (within 1 min), a fan (or other delivery device) is actuated and a delivery interval begins. The delivery interval has two successive components. The first component, which occurs during the fuel-on interval, is referred to herein as a primary-delivery interval. The second component, which occurs for a predetermined interval following the end of the fuel-on interval and during the delivery-on interval, is referred to herein as a secondary-delivery interval.

The foregoing cycle-system or sequence of states is illustrated in the following tabulation:

TABLE A

Three Part Heating Cycle

| | | | | | | |
|---|---|---|---|---|---|---|
| FUEL | ON | OFF | OFF | ON | OFF | etc. |
| DELIVERY | ON | ON | OFF | ON | ON | etc. |

TABLE A-continued

Three Part Heating Cycle

| Fuel-On Interval | Fuel-Off Interval | | Fuel-On Interval | Fuel-Off Interval | etc. |
|---|---|---|---|---|---|
| Primary Delivery Interval | Secondary Delivery Interval | Nondelivery Interval | Primary Delivery Interval | Secondary Delivery Interval | etc. |
| 0    2 | 4    6    8 | 10    12 | 14    16 | 18    20 | |

Time - Minutes (Typical)

The maximum fuel-on interval is established in accordance with system characteristics. This interval is based on the most efficient operating region for the furnace, which is a region preceding in time any saturation of the heat exchanger (furnace plenum). This is a fuel-on interval during which plenum temperature increases linearly with time. Since the furnace provides equal increments of heat in equal increments of time, it burns equal amounts of fuel in equal time increments. Hence, the fact that plenum temperature increases linearly with time means that equal fuel increments are producing equal temperature increments. (A procedure and device for determining when nonlinear operation occurs and thus what is the appropriate on-time interval to maintain linear operation is described below in Section IV. Also, a further discussion of what is meant by "linear" operation is found in Section IV.) At the end of the maximum fuel-on interval, the heat exchanger begins to operate in a nonlinear mode; that means that additional unit increments of fuel cause successively smaller increments of heat to be delivered to the heated space and successively greater increments of heat to go up the chimney and be wasted.

The function of the secondary-delivery interval is to extract residual heat from the plenum and ductwork (or boiler system), and deliver it to the heated space. The interval should continue until substantially all such heat is extracted (for example, 90%). One effect of the secondary-delivery interval is to deliver more heat to the heated space as a result of each fuel-on interval. Perhaps even more important, the secondary-delivery interval causes the plenum temperature to fall back toward the ambient temperature of the location of the plenum (for example, the basement of a building), rather than to remain at the peak temperature it reaches because of its contact with combustion gases during the immediately preceding fuel-on interval. Hence, the heat transfer in the heat exchanger is improved. (According to Newton's Law of Cooling, heat transfer occurs at a rate proportional to the difference in temperature between two bodies. Lowering the temperature of the plenum in the secondary-delivery interval thus increases heat transfer from combustion gases during the next-occurring fuel-on interval.)

The appropriate maximum fuel-on interval is a function primarily of the mass of the plenum and nearby ductwork (or in the case of a boiler system, the thermal mass of the fluid), and of the rate of combustion in the furnace. That interval is thus site-specific, although similar installations of the same model of furnace will have similar values of this parameter. Similarly, the proper secondary-delivery interval is site-specific, depending on such factors as the mass of the ductwork and plenum, and fan throughput. In the case of boiler systems, secondary-delivery is particularly important because of the great thermal mass of the water in the system.

The secondary-delivery interval is the principal factor constraining possible duration of the fuel-off interval. Unless the fuel-off interval is at least as long as the secondary-delivery interval, it will not be possible to extract substantially all of the residual heat and to lower the plenum temperature sufficiently to provide efficient heat transfer during the next fuel-on interval.

In addition, minimum on-time requirements may be set by apparatus constraints of some furnace systems. These constraints may include predetermined time delays before intermittently operated fans begin to remove heated air from furnace plenums, which are typical of some furnace systems. (For example, the plenum may have to reach 85° F. before the fan starts, so that cold air will not be circulated to the heated space. This may take 0.5 to 0.8 minutes.) In addition, some gas furnaces operate in two stages, so that full heat generation does not occur until an initial heating stage is completed. Many systems do not have these constraints, and they are usually unimportant (for purposes of this invention) even in those systems having them. More specifically, a fuel-on interval determined by heat-exchanger linearity considerations is frequently on the order of 3-5 minutes for a home HVAC system. That interval is frequently much longer than the duration required by any minimum on-time constraint of a furnace.

Subject to these constraints, the HVAC system of this invention operates, as indicated earlier, in a fuel-consuming on-time interval (maximum fuel-on interval) equal to the time it takes before the system's heat exchanger begins to lose efficiency because of nonlinear operation. This fuel-consuming on-time interval is followed by an off-time interval during which fuel is not consumed, but residual heat in the heat exchanger and ductwork continue to be delivered during a secondary-delivery interval if a fan continues to operate for such purpose after the furnace stops consuming fuel to provide heat. A nondelivery, nonfuel-consuming interval then occurs for a length of time that causes total heat flux from the heated space to the ambient, during the nondelivery interval, to approximate the total heat flux occurring from the HVAC system to the heated space during the interval in which heat is delivered to the space minus the heat flux from the space to the ambient during the same interval.

We turn now to methods for determining how long the nondelivery interval should be to provide a proper balance of energy debits and credits while the HVAC system operates in a heating mode. Several different approaches are described for causing the heat flux from the furnace to the heated space to be made equal to the heat flux from the space to the ambient (external environment). Methods are also described for measuring system parameters relevant to that determination.

B. Parameter-ratio Method

The inventors consider two HVAC system parameters associated with heat flux (energy delivery and energy leakage) relevant for maintaining energy debits and credits in balance. At a given ambient temperature, wind velocity, and other factors, it may require 4 minutes, for example, to deliver enough heat to the living space of a house to heat it from 69.5° F. to 70.0° F., and may require 20 minutes for the house to cool from 70.0° F. to 69.5° F. It follows that a heating cycle in which the HVAC system delivers heat for 4 min and is then off for 20 min should maintain thermal equilibrium.

In principle, the same results would occur for 1 min/5 min and 16 min/80 min cycles. However, some qualification of that is needed. First, a 1-minute on-time interval may be too short to be consistent with equipment specifications; or the corresponding off-time interval may be too short to be consistent with equipment specifications. (Further, very short on-time intervals result in increased valve wear in the furnace.) Second, as on-time and off-time intervals are lengthened, two adverse effects may occur. One may be that temperature excursions from set-point are greater, causing customer discomfort. The other may be that nonlinear performance of the heat exchanger occurs, as described above, which causes inefficient utilization of energy (fuel).

The system parameters on which the stated space-heating and leakage-to-ambient times depend are comparable to the delivery impedance and leakage impedance of the electrical model previously described. They are referred to hereinafter as a charging-time parameter, or signal representative thereof, and a leakage-time parameter, or signal representative thereof— such terminology being based on the analogy to the charging and leakage time constants of a capacitor. The mode of operation referred to hereinabove as the parameter-ratio method is also referred to, at times hereinafter, as the computed-pause mode of operation, where the term "pause" refers to the fact that the HVAC system pauses is in a fuel-off, nondelivery state from the third part of the cycle, and the thermostat computes the duration of this pause.

Charging-Time Parameter

In general terms, the charging-time parameter is established by starting a count of clock signals during an interval while the ductwork system is delivering heat to the space in heat-delivery mode of the HVAC system. Temperature in the space ($T_s$) is measured by a temperature sensor when a time count starts. After a suitable interval, the count is stopped and temperature is measured again. A ratio is then provided for elapsed time and difference in temperature; for example, 2.0 minutes is divided by 0.50° F., so that the charging-time parameter in this case is 4.00 min/°F.; or equivalently the reciprocal is determined, 0.25° F./min. When such a measurement is made, the plenum should not be at so elevated a temperature that it operates in a nonlinear mode.

Leakage-Time Parameter

The leakage-time parameter is established in the same manner, after a nondelivery interval has begun in which the HVAC does not deliver any heat to the space. Thus, the furnace should have stopped consuming fuel, and the fan should no longer be running and delivering heat (by continuing to extract more heat from the plenum and ductwork).

Preferably, the measurement is made when space temperature is near the set-point temperature, because the parameter is effectively a function both of the insulating properties of the building and also of the difference between inside (space) and outside (ambient) temperatures. Thus, the value of the leakage-time parameter at a given outside temperature might be 4.00 min/°F. at a 70° F. inside temperature and 3.75 min/°F. at a 60° F. inside temperature.

Occurrence of Leakage During Charging

It may be considered that a problem in measuring parameters could occur because the charging-time parameter as described above includes an element of leakage-time parameter. That is, a heated space leaks heat to, and a cooled space absorbs heat from, the ambient continuously, just as the charged capacitor of the electrical model described earlier leaks charge continuously through a leakage impedance. Hence, part of the heat energy delivered to (or removed from) the space during an on-time interval is counteracted by heat energy leakage during the same interval.

As a practical matter, however, it is unnecessary to make a more precise calculation to separate the leakage impedance from the delivery impedance of the system. First, in the experience of the inventors, the delivery impedance of a home HVAC system is on the order of approximately 5% of the house's leakage impedance. Hence, leakage impedance has a negligible impact during the on-time interval. Moreover, as long as the set-point, ambient, and other conditions continue to be the same as obtained during the measurement of the parameters, the effect of leakage impedance cancels out because the leakage impedance has to be factored back in again once it is factored out for purposes of determining the charging-time parameter.

Effect of Secondary Heat-Delivery Interval

The method of determining appropriate off-time interval by multiplying maximum fuel-on interval by a ratio of system parameters may be characterized as a first approximation of the desired result. This first approximation disregards the effect of heat delivery during the secondary heat-delivery interval (the additional interval of approximately 4 minutes when the furnace has been turned off but the fan is still blowing, extracting additional heat from the plenum and ductwork). The result of such secondary-delivery operation for furnaces may be to deliver an additional 6 to 10% of energy to the heated space, on the average.

This causes a nonlinear time and temperature relationship, illustrated in FIG. 16. During the secondary heat-delivery interval, the curve of temperature vs. time approximates the shape of a capacitor-discharge decaying exponential function. The heat transferred during this interval is not a simple product of time and a constant; rather, it too resembles an exponential function. At first, more heat delivery to the heated space occurs and temperature continues to rise in the space, but progressively less heat is delivered per unit of time as the secondary-delivery interval draws to its close, so that the space-temperature curve levels off.

One second approximation approach is therefore to add an additional 10% of the heat flux during the primary-delivery period (fuel-on interval) to the heat credit that is to be overcome by leakage during the nondelivery interval. That is somewhat arbitrary, but it has the advantage of simplicity and its inaccuracy can be corrected by the override procedures discussed below in section V.

Another second approximation would be to ignore the nonlinearity of temperature rise during the total heat delivery interval comprising the on-time interval plus the secondary heat-delivery interval. This occurs if charging-time parameter is set as the quotient of total temperature change during the total heat-delivery interval (on-time interval plus secondary heat-delivery interval) and the length of that interval. Using this procedure somewhat understates the heat delivery during that interval, because of the decreasing slope of the temperature vs. time curve during heat delivery, with the result that the off-time interval so determined will be overstated. The resulting understatement of heat delivery using this method is on the same order of magnitude as the 10% error associated with the procedure referred to above as a first approximation.

The implementation of the procedure for establishing thermal parameters, into functioning hardware and/or software, is now described. A first implementation discussed below measures the two thermal parameters of the system described above over a predetermined time interval K. Another implementation measures them over a predetermined temperature increment c.

C. Circuitry for Fixed Count Procedure

Circuitry for determining charging-time and leakage-time parameters of the system is now described, which measures change in space temperature over a predetermined time interval, and then provides their ratio. Referring to FIG. 3, it is seen that a counter 50 counts clock signals from clock 20 (shown also in FIG. 2). Counter 50 presets its count to K when it receives a clock-start signal at the start of the predetermined interval. The counter counts clock signals until it reaches predetermined count K, for example, a count corresponding to 0.5 min. Then it generates a count-end signal. (The predetermined value of K is conveniently stored in a look-up table stored in ROM or other non-volatile storage device.)

An analog-to-digital converter (ADC) 52 is connected at its input to analog output $T_s$ of temperature sensor 18 (shown also in FIG. 2). Temperature sensor 18 is advantageously implemented as a Yellow Springs Instrument Co. YSI 44008 precision thermistor (nominal resistance 30K at 25° C.) and resistor (24K) series pair. Manufacturer data for resistance versus temperature of the YSI 44008 unit from 15° C. (59° F.) to 30° C. (86° F.) is as follows:

TABLE I

| Temp (°C.) | Resistance (K) |
|---|---|
| 15 | 46.67 |
| 16 | 44.60 |
| 17 | 42.64 |
| 18 | 40.77 |
| 19 | 38.99 |
| 20 | 37.30 |
| 21 | 35.70 |
| 22 | 34.17 |
| 23 | 32.71 |
| 24 | 31.32 |
| 25 | 30.00 |
| 26 | 28.74 |
| 27 | 27.54 |
| 28 | 26.40 |
| 29 | 25.31 |
| 30 | 24.27 |

Manufacturer-recommended use of the YSI 44008 is to ground it at one end and place it in series at the other end with a 24K resistor connected to a 5 volt dc reference. Output voltage is measured at the junction of resistor and thermistor. Hence, output voltage $V_0 = 5R/(24+R)$, where R is thermistor resistance in K. A table of temperatures and corresponding voltage outputs follows:

TABLE II

| Temp (°C.) | Output Voltage (v) |
|---|---|
| 15 | 3.302 |
| 16 | 3.251 |
| 17 | 3.199 |
| 18 | 3.147 |
| 19 | 3.095 |
| 20 | 3.042 |
| 21 | 2.990 |
| 22 | 2.937 |
| 23 | 2.884 |
| 24 | 2.831 |
| 25 | 2.778 |
| 26 | 2.725 |
| 27 | 2.672 |
| 28 | 2.619 |
| 29 | 2.566 |
| 30 | 2.514 |

ADC 52 receives analog voltage signal $T_s$ (which, as shown in Table II, is a nonlinear function of sensed temperature) from sensor 18 and converts it to a digital signal $T_s'$ representative of analog signal $T_s$. ADC 52 thus provides an output $T_s'$ that is a digitized temperature sensor signal.

A look-up table stored in ROM 54 is used to convert the digitized sensor signal $T_s'$ to a numerical temperature value. The look-up ROM is preferably an EPROM, because EPROMs are cheap and stable. Obviously, a masked ROM can be used instead of an EPROM, but that might cost much more (depending on quantity); the same can be said of an EEPROM. Also, a DRAM or SRAM can be used if battery-refreshment is available to maintain information storage; however, if power is ever interrupted, the stored information will be lost.

Look-up ROM 54 has addresses whose values are representative of a range of prospective digitized temperature sensor signals that ADC 52 will provide. Each such address corresponds to a location in the ROM in which information is stored. The information at each address represents the temperature corresponding to the digitized temperature sensor signals from ADC 52 that the address represents. Hence, when the ROM is presented with an address corresponding to a given digitized temperature-sensor signal from ADC 52, the ROM outputs a digital signal representative of the corresponding temperature.

The nonlinear voltages of Table II are appropriately conditioned for the look-up ROM. Thus, by way of a very simple illustration, the signals for a simple illustrative look-up ROM with stored data representative of just those voltages and temperatures might be conditioned as indicated in the following table. Columns 1–2 repeat the data of Table II. Column 3 shows the voltage signal of column 2 less 2.5140 v (the lowest voltage of column 2). Column 4 shows the voltages of column 3 divided by 0.0524 (the lowest non-zero value of voltage difference in column 3), to three decimal places. Column 5 shows the values of column 4 rounded off to the nearest integer. For purposes of the present example, that number will also be the address number in the ROM. Column 6 shows the difference between the rounded-off figures of column 5 and the figures shown in column 4, and thus is representative of the cumulative nonlinearity (deviation) of the sensor voltage, relative to the base value sensed at 30° C. Column 6 thus shows the degree of nonlinearity involved with this sensor at common room temperatures.

TABLE III

| Temp | Voltage | Subtract | Divide | Round | Dev'n |
|------|---------|----------|--------|-------|-------|
| 15 | 3.3020 | 0.7880 | 15.038 | 15 | 0.038 |
| 16 | 3.2507 | 0.7367 | 14.059 | 14 | 0.059 |
| 17 | 3.1993 | 0.6853 | 13.078 | 13 | 0.078 |
| 18 | 3.1473 | 0.6333 | 12.086 | 12 | 0.086 |
| 19 | 3.0949 | 0.5809 | 11.086 | 11 | 0.086 |
| 20 | 3.0424 | 0.5284 | 10.084 | 10 | 0.084 |
| 21 | 2.9899 | 0.4759 | 9.082 | 9 | 0.082 |
| 22 | 2.9371 | 0.4231 | 8.074 | 8 | 0.074 |
| 23 | 2.8840 | 0.3700 | 7.061 | 7 | 0.061 |
| 24 | 2.8308 | 0.3168 | 6.046 | 6 | 0.046 |
| 25 | 2.7778 | 0.2638 | 5.034 | 5 | 0.034 |
| 26 | 2.7247 | 0.2107 | 4.021 | 4 | 0.021 |
| 27 | 2.6717 | 0.1577 | 3.010 | 3 | 0.010 |
| 28 | 2.6190 | 0.1050 | 2.004 | 2 | 0.004 |
| 29 | 2.5664 | 0.0524 | 1.000 | 1 | 0 |
| 30 | 2.5140 | 0.0000 | 0.000 | 0 | 0 |

Accordingly, in this example, address #1 would be representative of voltage value 2.5664 v from the sensor. At address #1 in the ROM there would be stored a value representative of 29° C. (84.2° F.). Thus, when the sensor provided an analog signal of 2.5664 v, the ADC would convert that to a digital signal, which would then be conditioned by subtraction (subtracting 2.5140) and scaling (multiplication by 1/0.0524), and would be rounded off to the nearest integer, providing a 1 as a ROM address; and as indicated a value is stored at that address that is representative of 29° C. Similarly, when the sensor provided an analog signal of 3.0424 v, for example, which is representative of 20° C., the same process would provide a 10 as a ROM address, and at that ROM address a value would be stored that is representative of 20° C.

Referring again to FIG. 3, the processor sends a count-start signal $C_S$ to counter 50. The counter starts counting. At the same time a signal is sent that causes ADC 52 to send a digital signal $T_s'$ from the ADC output port to the input of look-up ROM 54. Digital signal $T_s'$ is representative of analog signal $T_s$ from the sensor. As indicated above, the digital signal is conditioned to provide an address in the look-up ROM; a numerical value representative of the sensed temperature is stored at that address.

The ROM output is a signal representative of sensed temperature. The signal $T_i''$ developed at the start of the count is representative of an initial temperature $T_i$. That signal is stored in a first read-write memory 56 (advantageously, a location in a RAM or a register associated with processor 12).

When counter 50 reaches the predetermined count K, it sends a count-end signal $C_e$, so that the final value of temperature can be read. The current digitized sensor signal $T_f'$ from the ADC is sent to look-up ROM 54. The ROM provides a final-value temperature signal $T_f''$, which is stored in a second read-write memory location 58.

The two temperature signals $T_i''$ and $T_f''$ are fetched from memory locations 56 and 58, and are fed to a subtractor 60, which provides a difference signal representative of their difference, $|T_i''-T_f''|$. That signal is stored in a third read location 62.

The difference signal is fetched from location 62 to a divider or scaler 64, which divides the signal representative of the difference value $|T_i''-T_f''|$ by a signal representative of the predetermined count K. The output signal is representative of a change in temperature per unit of time—for example, 20 min/°F. It makes no difference which signal is divided by which, as long as consistency is preserved. Thus, the output could just as well be a signal representative of 0.05° F./min or 20 min/°F. In FIG. 3, the division is shown as divide-by-K, producing a result of $|T_i''-T_f''|/K$. That is intended to suggest use of a scaler to avoid an actual division which would involve greater use of computer resources and would be more difficult to implement in hardware. Divider 64 can also be implemented as a look-up ROM, in which scaled values are stored in locations representative of the address times a scaling factor.

Mutatis mutandis, the procedure is the same for developing a charging-time signal or a leakage-time signal. The value of predetermined count can be different for charging-time and leakage-time parameters, as long as appropriate correction is made. An empirical correction factor of, for example, 10% was described earlier, to compensate for additional heat delivery during a secondary-delivery interval. One way to introduce that factor is by correcting the scaling factor K when charging-time parameter is determined.

Implementation disregarding nonlinearity

The circuit of FIG. 3 addresses the nonlinearity of the thermistor sensor by using a look-up table. FIG. 4 shows a circuit that disregards the effect of nonlinearity in sensor voltage $T_s$, thereby slightly modifying the circuit of FIG. 3 to reduce parts count in a hardware implementation. Thus, the circuit of FIG. 4 does not use the look-up ROM 54 used in FIG. 3. Instead, the ADC outputs $T_i'$ and $T_f'$ are simply subtracted by a subtractor (the same subtractor as element 60 of FIG. 3). Their difference $|T_i'-T_f'|$ is then appropriately scaled to provide a voltage-to-temperature conversion. Thus, when temperature is approximately 70° F., the sensor output changes by 0.0293 v/°F. Hence, the appropriate scaling is to divide difference voltage $|T_i'-T_f'|$ by 0.0293, providing a signal representative of temperature difference. That scaling is advantageously combined with the scaling for divide-by-K performed by divider 64 in FIGS. 3 and 4, to save a step or part.

The circuit of FIG. 4 thus provides a modified procedure in which nonlinearity is disregarded. That makes it possible to omit the look-up ROM 54 and memory location 62 of FIG. 3. Also, the difference signal is routed directly from subtractor 60 to the divider/scaler 64 in FIG. 4.

Analog implementation

Entirely analog means can be used instead of using the digital means following analog-to-digital conversion of FIGS. 3-4. Thus, FIG. 5 shows a modification of the circuit of FIG. 4 to provide a wholly analog circuit. In FIG. 5, an initial value $T_i$ of analog output voltage $T_s$ from thermistor temperature sensor 18 is simply fed to an analog sample-and-hold circuit 66, where it is stored as an analog voltage. ADC 52 of FIGS. 3-4 is therefore eliminated in the circuit of FIG. 5 as unnecessary.

A predetermined interval then occurs. During this interval, temperature sensor voltage $T_s$ changes to its final value $T_f$. Then, $T_f$ is fed to one input of an operational amplifier configured as a subtractor 67A. The initial value $T_i$ of output voltage $T_s$ from the temperature sensor is then fed from sample-and-hold circuit 66 to the other input of subtractor 67A. The output is a difference signal representative of $|T_i-T_f|$. The output is then scaled appropriately by a second operational amplifier 67B. (Or operational amplifiers 67A and 67B are combined in one unit as operational amplifier 67.)

Counter 50 of the circuits of FIGS. 3-4 can be replaced by an analog device, also. Thus, an integrator 68 in FIG. 5 provides a ramp output which, when it reaches a predetermined voltage level, gates the stored voltage $T_i$ (i.e., causes it to be fed) to the subtractor 67A, providing a difference signal representative of $|T_i - T_f|$. While the foregoing wholly analog implementation is considered within the scope of the invention, the inventors do not consider it a preferred mode.

The circuits of FIGS. 3-5 provide signals representative of charging-time and leakage-time parameters. As will be shown below, a programmed microprocessor implementation also provides such information. The parameters derived by these procedures can be used to determine an appropriate nondelivery interval for the thermostat and HVAC system. The ratio of the two parameters is multiplied by the maximum fuel-on interval, thereby providing a nondelivery interval. (As previously indicated, an appropriate correction such as 10% can be made for secondary heat delivery.) The thermostat then uses this information to cycle the HVAC system between on- and off-states in a manner that balances energy debits and credits during the different intervals.

For example, suppose that the maximum fuel-on interval for a given furnace is 5 minutes. Suppose further that the appropriate secondary-delivery interval is 3 minutes, during which another 10% of heat delivery occurs. Finally, suppose that the circuitry of FIG. 3 (or an alternative to it) provides leakage-time and charging-time parameters having a ratio of 6:1. Then the thermostat would provide a cycle as follows: First, there would be a 5-minute fuel-on interval. Then there would be a 3-minute secondary-delivery interval. Then, there would be a nondelivery interval. Its duration would be 5 min $\times$ 6 $\times$ 1.1 = 33 min. (That would be subject to the possibility of an override due to other temperature factors, discussed below.) Then a new fuel-on interval would begin.

D. Circuitry for Fixed-temperature Procedure

The circuits of FIGS. 3-5 used a fixed time count and a variable temperature increment in determining system parameters. It is also possible to determine these system parameters by fixing a temperature increment and varying the time interval that the system requires to traverse the increment. As will appear from FIG. 6 and the following description, the latter approach results in a greater parts count for a hardware implementation. (There may be no significant difference, however, for a programmed microprocessor implementation. Also, both time and temperature increments could be varied without great difficulty, in a programmed microprocessor implementation.) It is therefore not considered a preferred mode, although it is considered within the scope of the invention.

Referring to FIG. 6, a counter 70 counts clock signals from clock 20 (also shown in FIG. 2). Counter 70 starts its count when it receives a count-start signal $C_s$ from processor 12 of FIG. 2. The counter continues counting until it receives a count-end signal $C_e$, whereupon the counter provides a count signal x which is representative of elapsed time since the count began. (The elapsed time is that required for a predetermined temperature increment c to be reached, where $c = |T_i - T_f|$; c is conveniently stored in a look-up ROM or other memory device.)

An analog-to-digital converter (ADC) 72 is connected at its input to the output of temperature sensor 18 (also shown in FIG. 2). ADC 72 converts analog voltage signal $T_s$, which it receives from sensor 18, to a digital signal $T_s'$ representative of analog signal $T_s$. ADC 72 thus provides a digitized temperature sensor signal, as did ADC 52 of FIG. 3.

Thus, when count-start signal $C_s$ occurs, the counter starts counting and at the same time ADC 72 is enabled so that an initial temperature value $T_i$ at sensor 18 is digitized to provide signal $T_i'$. $T_i'$ is then fed to a first look-up ROM 74, providing numerical signal $T_i''$, which is stored in a first read-write memory location 78.

An adder 80 increments $T_i''$ by c, providing a value $T_i'' + c$, which is the numerical target value for $T_f$. However, the numerical information must be converted into a form convenient for comparison with information from sensor 18. This is done by means of a second look-up ROM 76, which is used in the circuit of FIG. 6, but has no counterpart in FIG. 3. ROM 76 makes an inverse conversion from numerical information to corresponding digitized temperature voltages; the latter are the same as the outputs voltages from sensor 18 via ADC 72 for various temperatures. Thus, $T_i'' + c = T_f''$, and is converted by ROM 76 to $T_f'$, which will be monitored. $T_f'$ is stored in a memory location 84 for further use.

For example, the initial value of $T_i$ might be 69.0° F., for which sensor 18 might provide an analog voltage signal of 3.042 v. The ADC would convert this analog voltage to a digitized signal, which the first ROM would convert into numerical information. The predetermined increment c might be 0.5° F., so that adder 80 would provide numerical information representing 69.5° F., which the second ROM would convert into a digitized reference signal d equal to what the ADC would provide when its analog input was a voltage a (for example, 3.027 v) representative of 69.5° F. The ADC output would then be monitored for the digitized reference signal d corresponding to the awaited analog input voltage a.

The ADC is periodically enabled and the current digitized value of $T_s'$ is fed to one input of a comparator 86. At the same time the digitized signal $T_f'$ is fetched from memory location 84 and fed to the other input of comparator 86. When the current sensor signal approaches the reference signal within the comparator's deadband, indicating that space temperature has changed by the predetermined temperature increment, a comparator output signal is provided to cause a count-end signal, stopping the counter.

Count signal x, representative of elapsed time, is sent to a divider 88, which divides the count signal by a signal representative of the predetermined temperature increment c. As before, a scaler may conveniently be used to avoid actual division. Also, as before, it makes no difference whether °/min or min/° is determined, as long as consistency is preserved throughout.

As in the case of the circuit of FIG. 4, the nonlinearity of the temperature sensor can be disregarded, thereby eliminating the look-up ROMs; this approach is illustrated in FIG. 7. Further, an analog implementation (not illustrated) of this procedure can be utilized; that circuit can be developed from that of FIG. 7 in the same manner as the circuit of FIG. 5 is developed from the circuit of FIG. 4.

E. Circuitry for Same Temperature Excursion Procedure

Figure 8:
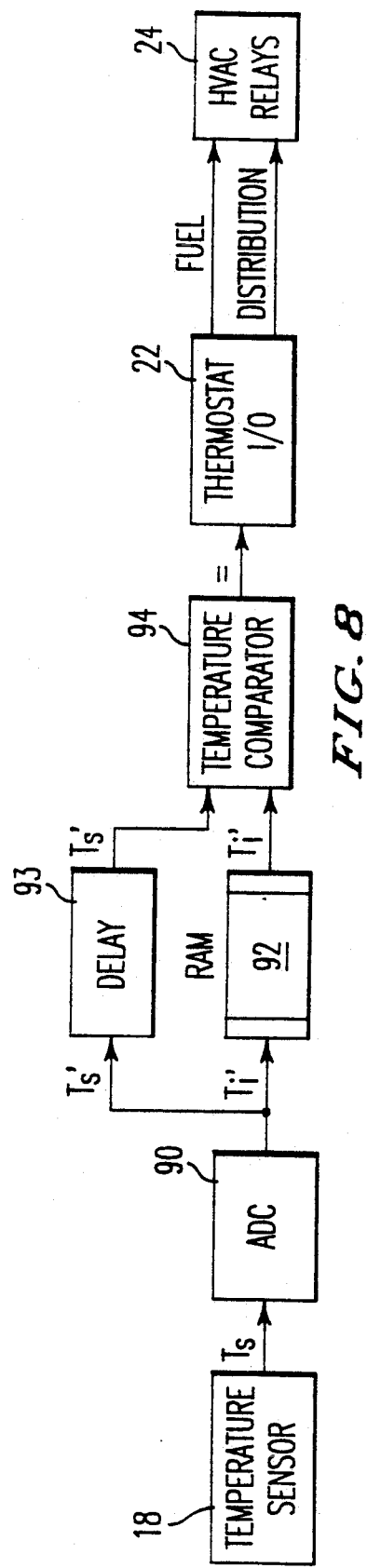
FIG. 8 is a block diagram of a subsystem using a surrogate (based on temperature excursion) for measuring thermal parameters of a heating system.

A procedure illustrated in FIG. 8 utilizes a surrogate for the charging-time and leakage-time parameters. The surrogate is temperature excursion during the interval in which heat is delivered to the heated space.

In this procedure, space temperature is registered at the beginning of a fuel-on interval. The fuel-on interval continues for the predetermined maximum fuel-on interval. The space temperature then rises to its maximum. Subsequently, the secondary-delivery interval ends and a nondelivery interval begins. The space temperature is then monitored to determine when it falls back to its value at the start of the fuel-on interval. When that occurs, a new fuel-on interval begins.

This procedure requires no count, predetermined time interval, or predetermined temperature increment for measuring system parameters. Instead, each cycle has a temperature excursion, positive and then negative, which is made to net out to zero. The excursion may vary from cycle to cycle, because one burn cycle may deliver more or less heat than another, as a result in change in fuel composition or in combustion conditions, or other changes in the system may cause the excursion to vary (for example, opening a window or door). However, this procedure accomplishes substantially the same result as the previously described procedure, albeit in a somewhat different manner.

Referring now to FIG. 8, it is seen that as before temperature sensor 18 provides an analog temperature signal $T_s$ to an ADC. ADC 90 converts analog signal $T_s$ to digitized temperature signal $T_s'$. At the beginning of each fuel-on interval, the value of $T_s'$, designated here as initial digitized value $T_i'$, is sent from ADC 90 to a read-write memory location 92, where it is stored. During the delivery interval that follows, the signal $T_s'$ increases above $T_i'$, reaches a maximum, and then decreases back in the direction of $T_i'$. A comparator 94 compares the current digitized sensor signal $T_s'$ with stored signal $T_i'$. When the current digitized sensor signal approaches the stored signal to within the comparator's deadband, the comparator provides an output signal to actuate the furnace for another fuel-on interval. (A delay circuit may advantageously be inserted to insure that current temperature exceeds initial temperature before any comparison occurs. The time delay is a matter of design choice; one or two minutes is a reasonable choice.)

When this procedure is effected in hardware, it is believed to have the lowest parts count of any of the procedures described hereinabove. This procedure does not require any look-up ROM conversion of nonlinear voltage outputs to linear numerical values, as the preceding procedures did. That is because it makes no difference here whether the excursion voltage is linearly or nonlinearly representative of the sensed temperatures. All that matters is that the reference temperature signal's value be reached to indicate the end of a cycle and the time for a new fuel-on interval. It will be noted that this procedure, like the previous ones, has no deadband.

Figure 9:
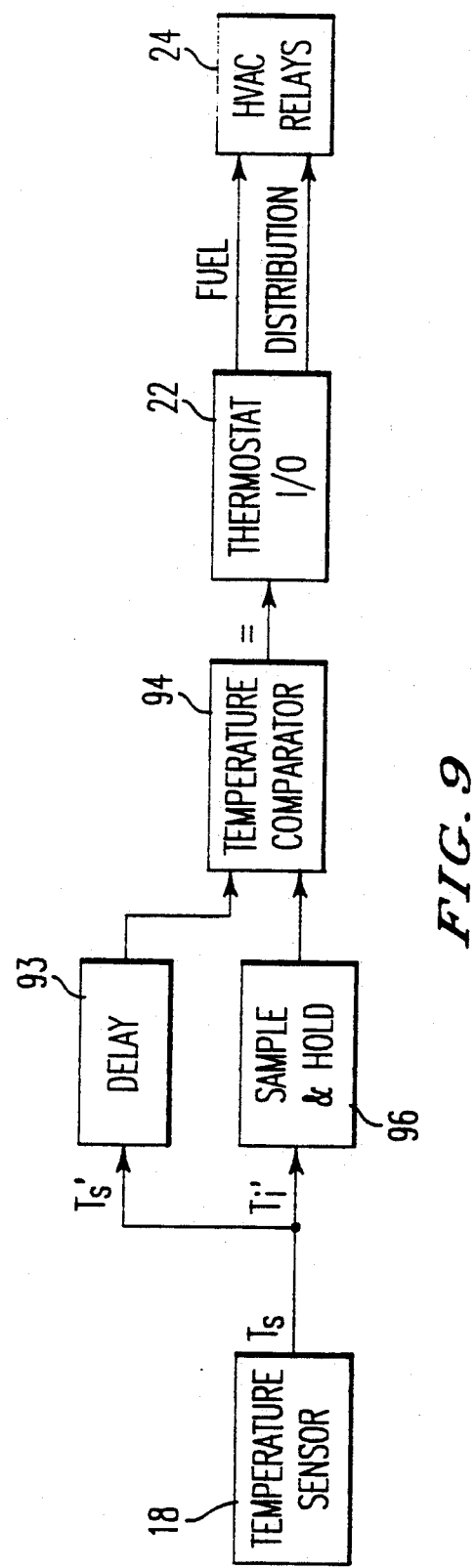
FIG. 9 shows analog circuitry for carrying out functions that digital circuitry performs in FIG. 8.

A still lower parts count (but not necessarily an overall improvement in cost and reliability) can be realized by an analog version of this circuit, shown in FIG. 9. Sensor 18 is now connected to a sample-and-hold circuit 96, which may be implemented as an analog storage chip. Circuit 96 is enabled to read the initial value of the analog sensor voltage $T_s$ at the beginning of the fuel-on interval. Circuit 96 of FIG. 9 performs the function of memory location 92 of FIG. 8. The intervening ADC 90 of FIG. 8 is not needed in the circuit of FIG. 9 because no analog-to-digital conversion occurs.

Sensor 18 is also connected to one input of comparator 94 via a delay circuit 98. (As in the circuit of FIG. 8, one or two minutes of delay is reasonable.) The other input of the comparator is connected to the sample-and-hold circuit, thereby permitting a comparison of initial and current analog temperature signals. Comparator 94 of FIG. 9 acts in the same way as comparator 94 of FIG. 8. Basically, this circuit is the same as the preceding one except that (a) the ADC is not used and (b) analog storage of initial temperature for reference purposes is used in place of digital storage.

That the present expedient accomplishes the same result as the earlier-described procedures may be appreciated by reference, to the model for the system. In the procedures of sections III-B and C, the time constants for charging and leakage are ascertained, and a time is computed for leakage to allow the space temperature to decrease to the same point from which it was charged at the beginning of a heating cycle. In the procedure of this section III-D, the time for the falling part of the cycle to be completed, is determined by monitoring temperature instead of computing it. But either way, total heat flux into the heated space while temperature goes up must equal total heat flux out of the space while temperature goes down.

In a variation on this procedure, the reference temperature that the comparator uses is a set-point temperature instead of the space temperature measured at the beginning of the latest fuel-on interval. In theory, the initial space temperature should be approximately the set-point temperature (assuming that the system is working as desired). However, if the ambient becomes warmer or colder during a cycle, or if another change (such as opening a door) occurs, equilibrium of the system (heated space) is not maintained by using the cycle's initial space temperature as a reference. A digital logic or gate array circuit using this approach is described in more detail below (see FIGS. 11-13).

F. Increment-Decrement Procedure

Another method for determining duration of a nondelivery interval operates by incrementing or decrementing an initial value of the nondelivery interval in accordance with whether the latest nondelivery interval was too short or too long. Under this approach, a fuel-on interval of the duration of the predetermined maximum fuel-on interval is followed by a fuel-off interval containing a nondelivery interval whose duration is determined by an appropriate incrementation-decrementation strategy.

For example, consider an operation in which maximum fuel-on interval is 4 minutes, secondary-delivery interval is 3 minutes, and nondelivery interval is 15 minutes. At the end of 13 minutes of nondelivery interval, space temperature falls below a 70° F. set-point temperature. One increment-decrement approach would be to decrement the stored nondelivery interval by the 2 minutes of difference, to make it 13 minutes for the next interval until a new discrepancy occurs. A second approach would be to decrement the nondelivery interval by a predetermined fraction of the difference, such as 75% of 2 minutes (i.e., 1.5 min). A third approach would be to decrement the interval by a predetermined number of minutes, for example, 5 minutes. Other decrementation strategies may be used. Which strategy is used is a matter of designer choice.

Incrementation of the nondelivery interval may also be required. In the previous example, incrementation might be needed if at the end of 15 minutes space temperature was above set point by more than a given threshold, or if the next fuel-on interval caused the space temperature to exceed set point by more than a given threshold. Various incrementation strategies may be used that are generally similar in concept to the decrementation strategy described above.

G. Effect of Insufficient Capacity

In certain circumstances, it may not be possible to operate a france system in a linear mode, because the furnace does not provide enough BTU per unit time. First, in extremely cold weather, the net heat that the HVAC system delivers to the heated space during the predetermined maximum fuel-on interval is less than the heat that the space leaks to the ambient during a secondary-delivery period. Second, when set-point temperature is changed, for example, from a night setting of 58° F. to a day setting of 72° F., the customer may consider the time required before, the heated space reaches the new setting to be unacceptable.

Figure 14:
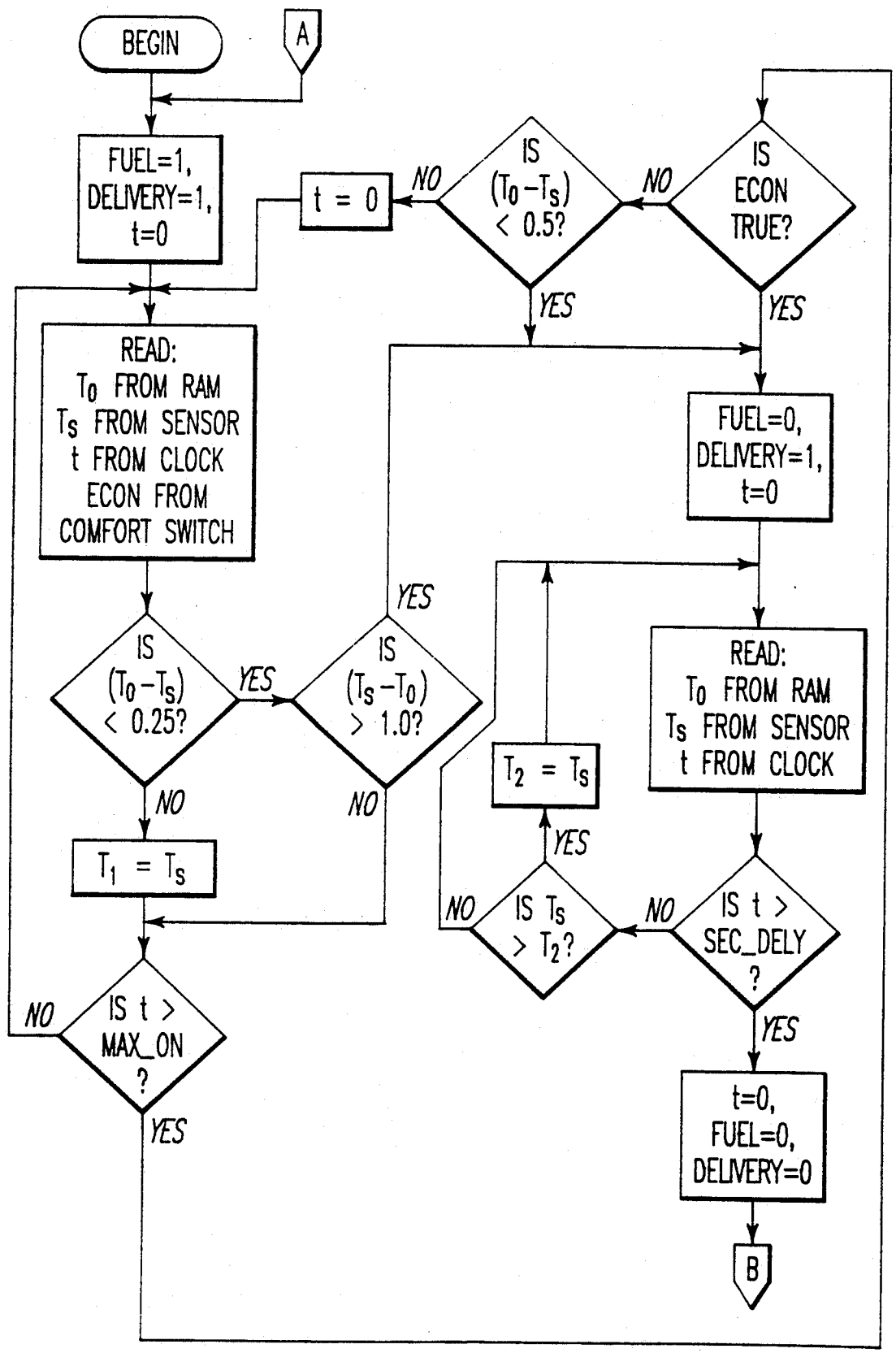
FIGS. 14, 14A, 14B, and 14C show flowcharts for several programmed microcontroller or microprocessor implementations of the thermostat.

This suggests that it may be necessary to add an optional "noneconomy mode" setting to the thermostat of the invention to disable the efficiency-maximizing feature when circumstances require that. Either or both of two criteria may be considered appropriate for noneconomy mode to go into effect: (a) the system fails to maintain a space temperature within a predetermined margin from a set-point temperature for a predetermined interval, and (b) a user-operated switch or other input device is actuated. An illustrative example of this is shown in FIG. 14. The same technique can be used in the implementations shown in other figures.

When noneconomy mode is in effect, several different strategies may be used. First, a continuous-burn mode may be placed in effect until space temperature comes within a predetermined margin of set-point temperature. Second, the fuel-on interval may be increased from the system's maximum fuel-on interval, placing the furnace in a nonlinear mode of operation but not a continuous-burn mode. Third, the secondary-delivery interval may be shortened but not wholly eliminated. Fourth, the second and third strategies may be combined. Whichever strategy is used, the system should return to the economy mode of the invention as soon as space temperature comes within a predetermined margin of set point.

In principle, the first strategy is the least economical. But it results in the fastest transition to set point. In principle, the second strategy is inferior to the third and fourth, because prolonging the operation of the furnace when the heat exchanger is at its hottest provides the least incremental heat delivery per unit of fuel-burning time and sends the most heat up the chimney. Furthermore, some variation on the fourth strategy is almost inevitable, because prolonging the fuel-on interval by a time increment dt necessarily raises the maximum temperature that the heat exchanger reaches. That in turn increases by an increment dt' the length of the secondary-delivery interval required to return the heat exchanger to equilibrium. Hence, increasing the fuel-on interval in effect makes the same secondary-delivery interval be less than its optimum. Yet, increasing the secondary-delivery interval when the fuel-on interval is increased would counteract the effect of increasing the fuel-on interval, by adding to leakage loss. It therefore appears to be simplest to increase the fuel-on interval and let the secondary-delivery interval remain the same. It is considered that temporarily doubling the fuel-on interval is a reasonable expedient for most purposes.

H. Effect of High Ambient Temperature

It was previously noted (see section III-B) that if the value length of an appropriate delivery interval is 4 minutes and the length of an appropriate nondelivery interval is 20 minutes, a similar heating effect can be obtained by dividing each interval by n, to produce a 2 min/10 min cycle or a 1 min/5 min cycle. It was then noted that this point must be qualified by a caveat against turning the furnace on so frequently that excessive value wear occurs.

When outside temperatures are very high relative to set-point temperature—for example 60° F. ambient and 70° F. set point—particulary in a well-insulated, airtight house, different factors may come into play. In such circumstances, charging-time parameter can be very small relative to leakage-time parameter—for example, 4 min/°F. versus 40 min/°F. When such conditions obtain, it may become desirable to reduce the fuel-on interval below the maximum permissible interval in order to promote system stability and stay closer to set point.

It is considered desirable, therefore, to have a "high-ambient" mode for operation in relatively warm weather, such as late spring and early fall. The inventors consider that reducing the fuel-on interval to 1 /n the maximum fuel-on interval, where n=2,3, or 4, is appropriate for this mode. Initiation of the mode is appropriately triggered manually by the user and/or automatically when the ratio of leakage-time to charging-time parameter falls outside a predetermined range.

I. Time for Change in Set Point ("Look Ahead")

It may be desirable to add a look-ahead feature to the thermostat system, to provide for transition from night set point to day set point. In order to avoid a need to operate in a nonlinear mode, the furnace should be turned on in advance of the time preset for a transition from night set point to day set point. That is, the thermostat should "look ahead" to the transition time and provide more heat in anticipation of it. This is best illustrated by an example.

Consider that the night set point of a system is 60° F. and the day set point is 70° F. The preset transition time is 8:00 AM, meaning that the heated space should be 70° F. at 8:00 AM. The question is, at what time should the furnace start delivering more heat and at what rate?

Let us assume that the charging-time parameter is 10 minutes/°F. at 1:00 AM; the leakage-time parameter is 20 minutes/°F.; the maximum fuel-on interval is 6 minutes, during which space temperature rises by 0.6° F.; and the secondary-delivery interval is 4 minutes, during which space temperature rises by a further 0.1° F. It follows that the system can operate in a linear mode with a cycle of 6-minute fuel-on and 4-minute secondary delivery (0-minute nondelivery) intervals. One such cycle would provide a net temperature gain of 0.7° F.; 14 such cycles would provide a 9.8° F. rise from 60° F. to 69.8° F., assuming that the initial conditions remained unchanged. That would mean that the furnace should begin transition approximately 140 minutes (14 times the 10-minute length of the cycle) before 8:00 AM, or at 5:40 AM, given the assumptions made.

It is not correct, however, to assume that the relevant parameters will remain constant. The early morning hours may often be ones in which weather and temperature conditions change substantially. For example, the leakage-time parameter is highly dependent on the difference between space temperature and ambient temperature, each of which may change substantially during the transition period.

Accordingly, it is considered preferable to redetermine leakage-time parameter (or both parameters) at least once or twice an hour during a transition period, in order to improve the accuracy of the determination. A description of one possible model of this procedure follows:

The same assumptions are made as in the immediately preceding example. It is therefore initially determined that 14 cycles, beginning at 5:40 AM, are required. At 5:40 AM the first cycle (5 min fuel-on, 4 min secondary delivery, 0 min nondelivery) begins. After 30 minutes, at 5:10 AM, the space temperature rises to approximately 62.1° F. During this interval, ambient temperature rises slightly, as well. A measurement of system parameters is made. Charging-time parameter remains 9 min/°F.; leakage-time parameter is now 45 min/°F. A delivery cycle now delivers a temperature rise of 0.8° F. To maintain the same 8 AM transition, a non-delivery interval is now introduced to dissipate the 0.1° F. increment per cycle. That interval is (0.1° F.)×(45 min/°F.)=4.5 min. Therefore, a cycle is now instituted consisting of 6 min fuel-on, 4 min secondary delivery, 4.5 min nondelivery. After another 30 min, at 5:40 AM, another redetermination is made, and so on.

Conditions may also vary in the opposite direction. Suppose, instead, that it suddenly becomes much colder at 7:00 AM, so that the charging-time parameter changes to 15 minutes/°F. Then the operating cycle selected here will fail to meet set point by 8:00 AM. It is a matter of design choice whether to take no action or to go into a noneconomy mode at that point.

IV. Determination of Optimum On-time Interval

The implementations described above all use a predetermined maximum fuel-on interval in economy mode to generate heat and deliver it to the heated space without placing the heat exchanger into a nonlinear mode of operation. The fuel-on interval is preferably followed by a secondary-delivery interval to extract residual heat from the heat exchanger and ductwork, while returning the heat exchanger to a temperature at which it can again operate linearly. It is therefore considered advantageous to provide, as an adjunct to the invention, a convenient means for making an on-site determination of an appropriate fuel-on interval (maximum fuel-on interval) that will avoid operation of the furnace in a nonlinear mode. It is also advantageous to provide a similar means for determining an appropriate secondary-delivery interval.

A. Definition of Linear Operation of Heat Exchanger

First, it is important to refine the concepts of linearity and nonlinearity in the operation of a HVAC heat exchanger. It must be recognized that any model, such as Newton's Law of Cooling, that postulates a rate of heat transfer that is a function of the difference in temperatures of the two relevant bodies, will result in a somewhat nonlinear curve if one body succeeds in heating the other body so that the temperature difference of the bodies decreases.

The inventors have made measurements of HVAC plenum temperature vs. time under various operating conditions at various sites. An illustrative set of curves for a furnace is shown in FIG. 16. These curves show plenum temperature, temperature in an air duct near the thermostat, and space temperature, all as functions of time.

The inventors have observed that substantially linear operation, defined as no more than 10% change in slope, can be realized during furnace operation. Thus, the plenum of the furnace of FIG. 17 operated in a linear mode for approximately 5 minutes. This value of maximum fuel-on interval is satisfactory for heating purposes and permits operation at optimal efficiency under most conditions observed in the climate of Washington, D.C.

B. Secondary-Delivery Interval

The secondary-delivery interval is the time required to extract heat from the heat exchanger (and ductwork) by continuing the fan in operation after the furnace is turned off. The issue of efficiency in this context is not primarily one of maintaining a linear mode of operation to save fuel from being expended to heat the ambient via the chimney, as it is with heating the heat exchanger during the primary-delivery interval. Operating the system so that the curve of temperature vs. time is linear during secondary delivery is not a primary concern, since each additional increment of time during secondary delivery provides only a fan-power increment, not a fuel expenditure increment. The cost of fan power is small relative to the cost of fuel expenditure. The main concern here is rather to extract enough residual heat from the heat exchanger to permit it to operate linearly during the next heating cycle of the system. That means that the parameter of interest here is the gross temperature difference, per se, not the rate of temperature change as in the primary-delivery interval. Whatever plenum-temperature level during the secondary-delivery interval at which the fan is stopped will be approximately the initial plenum-temperature level for the next fuel-on interval. Thus, the question becomes one of how long after the temperature maximum should the fan be turned off.

In this mode of operation, one suitable measure of exhaustion of residual heat or cooling is considered to be (a) the difference between the maximum and current plenum temperatures, relative to (b) the difference between the maximum and minimum plenum temperatures. One criterion that the inventors consider appropriate is that extracting 90% of the temperature difference and leaving the other 10% unextracted is a satisfactory mode of operation. For example, a maximum value of plenum temperature at the end of a maximum fuel-on interval may be 130° F., which may be 60° F. above a minimum measured plenum temperature of 70° F. Here 90% of the difference temperature is 54° F., so that in this example 90% of the heat is extracted when the plenum temperature has fallen to 76° F.

C. Measurement of Linearity

The inventors used laboratory-type equipment for this purpose. They simply measured and recorded temperature as a function of time, and observed when the curve began to depart from a ramp, indicating occurrence of progressively lesser temperature increments per unit of time (that is, increased nonlinearity and approach of saturation). The inventors do not consider that instrumentation approach appropriate for field use by HVAC company technicians or home owners.

Ideally, a device for making a site-specific measurement of maximum fuel-on time interval would measure heat exchanger performance at, or as close as possible to, the heat exchanger. Thus, a sensor would be placed on or in the plenum itself. While it is feasible for HVAC company technicians to do that, it is considered infeasible to ask home owners, in general, to do that. The inventors consider that it is practicable for utilities or other suppliers to provide home owners with a device that they can use by placing a probe into a hot-air delivery duct. Accordingly, measurements were made such as those illustrated in FIG. 16, comparing plenum and air duct ("source") temperatures as a function of time during heating, with a view toward determining the feasibility of providing a means by which utilities could facilitate do-it-yourself retrofitting of home HVAC systems with the thermostat of this invention. The intention was to permit using a site-specific, user-measured value of maximum fuel-on interval. (It would be possible to make only an HVAC unit-specific measurement based on one unit of a particular brand and model of furnace, and use that data for all installations of similar units. But it is considered more sound to make a site-specific measurement for each installation.)

These measurements showed that air-duct temperature, measured near the thermostat, can be reasonably correlated to plenum temperature, for purposes of making linearity measurements. That is, the linear region of operation as measured in a delivery air-duct near the thermostat approximately correlates in a consistent way to that region as measured at the plenum, although the knee of the curve is less well defined for the air-duct measurement. The inventors made measurements of the type illustrated by FIG. 17 for HVAC systems of a number of homes and observed that air-duct temperatures were consistently related to plenum temperatures for the type of data of interest here. They observed that an air-duct temperature increment of 40% of an initial reference value occurred consistently at the same time that a plenum temperature increment of 90% of the corresponding initial reference value occurred, during a furnace's continuous fuel-on interval. Thus, if saturation of the heat exchanger is defined in terms of a 90% saturation constant for plenum measurements, it may be defined in terms of a 40% constant for air duct measurement, with the same operational results.

Figure 15:
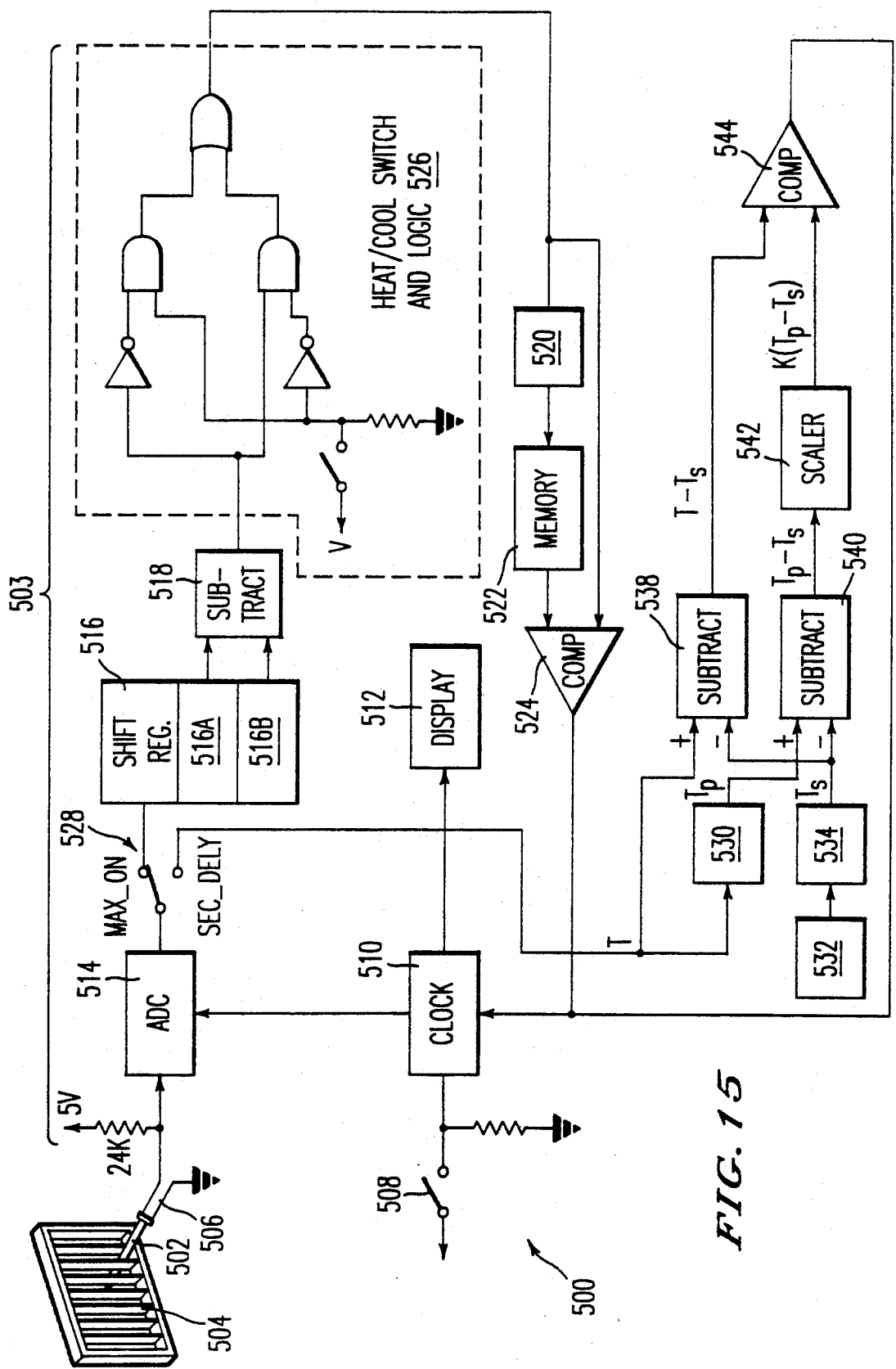
FIG. 15 shows a block diagram of a device for determining a site-specific maximum fuel-on interval and site-specific secondary-delivery interval.

A convenient on-time optimizer device for making an on-site determination of maximum fuel-on interval at the time of a retrofit installation of a new thermostat is shown in FIG. 15. (A similar procedure would be used for a new installation.) The on-time optimizer device described here is capable of being operated by any ordinary HVAC technician or by a home owner, and it provides a direct reading of the maximum fuel-on interval that should be programmed into the thermostat of the invention. The device is designed so that it may be used by any reasonably intelligent person, even one without technical training.

The use of the device is now described for heating mode purposes, in a retrofit installation. The user makes the measurements with the old thermostat still in place. On-time optimizer device 500 comprises a probe 502 and a main unit 503, which are connected to one another by a cable 506. The user places the probe 502 in an air-delivery duct 504 near the thermostat. The house is then brought up to near a reasonable set-point temperature (for example, 70° F.), using the existing thermostat, and the furnace plenum is then allowed to cool for at least 10 minutes. Then the thermostat is set at a substantially higher set-point (for example, 80° F.). The furnace then goes on and operates continuously.

At the same time, the user initiates measurement action by pressing a start/reset button 508. The start/reset button causes a clock 510 to begin a count. Clock 510 feeds a continuously operating LCD time display unit 512, located on the outside of the case of main unit 503. The display shows cumulative running time in minutes and seconds from when start/reset button 508 began the procedure. Clock 510 also enables an analog-to-digital converter (ADC) 514 every 6 seconds (0.1 min).

Probe 502 is advantageously implemented with the same thermistor sensor system previously described in section III. That is a YSI 44008 in series with a 24K resistor connected to a 5 vdc power supply. Probe 502 provides an analog voltage temperature signal to ADC 514, which is fed every 6 sec (0.1 min) via a mode switch 528 to a shift register or memory 516, having locations 516A and 516B. Each new temperature reading goes to location 516A, and the reading previously in location 516A is then shifted to location 516B.

The readings in locations 516A and 516B are fed to a subtractor 518, which provides a difference signal. The first 40 seconds and/or each initial difference reading until a subsequent difference reading is greater than its prior reading, whichever takes longer, is discarded (circuitry not shown). This eliminates from consideration the initial, leftmost part of the curves shown in FIG. 16.

The next difference reading after that is scaled to 40% by scaler 520, providing a scaled signal for reference purposes. The scaled signal is routed to and stored in memory location 522. The scaling constants were set at these values for reasons described in section IV-A, and other values may be substituted without departing from this invention. (Boiler values are, of course, different from hot-air system values. But the principle of the procedure is the same and is within the ordinary skill of this art.)

Comparator 524 then compares each subsequent difference reading with the reference value in location 522. If any subsequent difference reading is less than the reference value in memory location 522, comparator 524 thereupon provides a stop-count signal to clock 510. That also stops the time display in display 512. The time shown in display 512 is the length of time during which the furnace operates in a "linear" region, or the maximum on-time interval (maximum fuel-on interval) to be used by the thermostat. It may be desirable to make several measurements and average them to lessen experimental error.

The foregoing procedure may be summarized as follows: The temperature probe provides periodic temperature signals, from which temperature increments are provided for comparison purposes. While this process proceeds, a cumulative time measurement is kept which indicates how long the furnace has been burning (heating mode in a hot-air furnace). The comparison procedure is to compare each successive temperature increment over time (normalized to a unit time basis, as necessary, to make temperature increments properly comparable because they correspond to the same time increment) with a reference, start-up increment. A scaling constant c, where $0 < c < 1$, is used (for example, 40% for heating mode). A stop-time point is reached when one of the normalized temperature increments has a value equal to or less than the normalized reference start-up temperature increment multiplied by the predetermined constant c. A stop-count signal is then sent to stop the cumulative time measurement. That provides a signal (which may be referred to as a maximum fuel-on interval determination means output signal) that is representative of the cumulative time elapsing between the beginning of the fuel on-state and the stop-time point. That represents the linear region of operation.

D. Measurement of Secondary-Delivery Interval

The same device 500 can be adapted to measure a secondary-delivery interval. The inventors observed various home HVAC systems and observed that for plenum temperature tracked that for plenum temperature closely during the secondary-delivery interval. It was observed that 90% of the temperature difference between the maximum temperature and its lower limit, as measured at the plenum, correspond to 80% of the same temperature difference as measured at an air duct near the thermostat. (In the air duct, the set-point temperature or room temperature represents the lower limit.)

Measurement of the secondary-delivery interval is carried out by placing the sensor in an air-delivery duct, as before. The house is once again brought to near a reasonable set-point temperature (for example, 70° F.), using the existing thermostat. A measurement-mode switch 528 of device 500 is reset from MAX_ON position (measurement of maximum on-time interval) to SEC_DELY position (measurement of secondary-delivery interval). The user waits until the furnace turns off. The HVAC system is then placed in a continuous-fan mode, using the HVAC system's existing continuous-fan switch. The start/reset button 508 is then actuated.

As before, a clock count and running LCD display starts. The probe continuously monitors air-duct temperature T, and the clock enables the ADC every 0.1 min, as before. The ADC provides a first signal representative of a peak temperature $T_p$, which is stored in a memory location 530.

The set-point temperature $T_s$ is entered by means of a keypad and interface 532, and a signal representative thereof is stored in a memory location 534. The keypad and interface can be dispensed with if the user is instructed always to make the measurement with a predetermined set-point temperature, such as 70° F., which is then prestored.

Thereafter, the ADC provides subsequent signals representative of subsequent temperature readings T, which are fed to a + input of a subtractor 538. A signal representative of $T_s$ is fed from memory location 534 to the − input of the subtractor 538 and also to a − input of a second subtractor 540. The + input of the subtractor 540 is fed a signal representative of $T_p$ from memory location 530. Thus, subtractor 538 provides a signal representative of $T-T_s$, and subtractor 540 provides a signal representative of $T_p-T_s$. The latter signal is scaled by 0.2 (or another appropriate constant) by a scaler 542, which thus feeds one input of a comparator 544 with a signal representative of $0.2(T_p-T_s)$. The other input of comparator 544 is fed the signal representative of $T-T_s$ from subtractor 538.

Comparator 544 provides an output signal when $(T-T_s) \leq 0.2(T_p-T_s)$. That comparator output signal provides a stop-count signal to the clock, and the display then shows total elapsed time since the furnace was turned off. That time is the secondary-delivery interval during which the fan should operate after the furnace is turned off.

The two time parameters that are measured in this means, maximum on-time interval and secondary-delivery interval, are subsequently input to the thermostat and are stored in a nonvolatile memory device such as an EEPROM.

While the foregoing description is in terms of discrete logic devices, the on-time optimizer device may more conveniently and inexpensively be implemented by a programmed microcontroller integrally including a clock, ROM for program, RAM, and ADC. Numerous such microcontrollers are on the market at this time. It is also possible to implement the device with wholly analog elements, or to make a hybrid implementation. However, the programmed microcontroller implementation is considered preferable. A flowchart for the programmed-microcontroller implementation of the device is shown in FIG. 17.

No look-up ROM correction for nonlinearity is described here, because the nonlinearity of the YSI 44008's output in the temperature zone of interest is much less than 10%. If for some reason such correction were desired, procedures for that are described at length in preceding section III.

While the on-time optimizer device has been described above as a stand-alone unit, it may advantageously be integrated with the thermostat of this invention by connecting the probe to the thermostat via a plug and socket. In the programmed microcontroller implementation, such integration facilitates using the same microcontroller to carry out control (thermostat) and data acquisition (probe) procedures. Further, the thermostat can directly acquire the maximum on-time interval and secondary-delivery interval data, so that it is not necessary to read the display for such data and then have a person enter it into the thermostat. That makes it much easier for do-it-yourself operation. Using this approach also makes it easier to update these system parameters automatically to adapt periodically to changes such as a decrease in fan speed occurring after passage of time.

While the foregoing description is in terms of an on-time optimizer used upon initial installation of a thermostat or on specific user-determined occasions, an alternative implementation leaves the probe device permanently in place. Thus the probe may be either removably coupled to the thermostat or integrally coupled to it so that the two remain coupled at all times. The programming of a microprocessor or microcontroller in the thermostat can then [in the integrally coupled unit] direct periodic updating of maximum on-time interval and secondary-delivery interval parameters without any user intervention. That can be carried out by standard techniques, such as counting cycles, timing, and switching from regular heating mode of the program to measurement mode of the program at predetermined intervals. This implementation is considered more suitable for new-building installations than for retrofitting an existing site, because in a new installation it is easier to install the probe inconspicuously so that it will not interfere with the appearance of the home or other building. In the case of the secondary-delivery parameter, if the device is permanently in place it is feasible to control delivery (e.g., fan) operation continuously by means of the device; in that version of the unit, the secondary-delivery interval is thus determined in each cycle by monitoring air-duct temperature and comparing it with set-point (or space) temperature, so that the fan is kept running until the difference between the two temperatures reaches an appropriate level.

While the foregoing probe has been described in terms of a unit for use with a hot-air system, it will be obvious to persons skilled in this art to utilize the same approach for a probe inserted into or attached to a steam or hot-water line for a boiler/radiator system.

V. More Detailed Description of Override Logic

A general description of the comparator and override procedure for counteracting drift from set-point temperature was given above. The procedure is now described in more detail, in terms of an illustrative heating system, and using illustrative temperature values. The following time and temperature values are specified arbitrarily for purposes of this illustration, and the particular values chosen for the example do not affect the principle of how the system operates. FIG. 10 shows a block diagram of combinatorial logic circuitry for the illustrative procedure.

The illustrative heating system operates at a set-point temperature of 70° F., with predetermined upper and lower margins of 1° F. Secondary-delivery interval for the system is 5 minutes. Maximum fuel-on (on-time) interval is 2 minutes. The system operates under an implementation determining off-time as a system-parameter ratio times the on-time interval. Here the ratio of leakage and charging time parameters is 15:1, corrected for secondary-delivery. Thus, the off-time interval is 30 minutes, at the time that this illustrative example occurs. Accordingly, a normal cycle would be 2 minutes furnace on; 5 minutes secondary-delivery; 25 minutes nondelivery.

The comparator and override procedure and apparatus are now described for drifts of sensed temperature, first to 68.5° F. (undershoot condition) and second to 71.5° F. (overshoot condition).

In the hardware implementation described below, nonlinearity of temperature sensor 18 is disregarded, as in the implementation of FIG. 4. If it is considered desirable, compensation for nonlinearity can be made as indicated in FIG. 3. Additionally, an alternative analog implementation of this circuitry can be derived from FIG. 5 by converting this implementation to analog circuitry based on that of FIG. 5.

A. Undershoot correction

Set-point temperature $T_o$, 70° F. in this example, has been input to the system by a keypad or other device, and is stored in a first read-write memory location 100 as shown in FIG. 10. $T_o$ is sent to an add circuit 102, where $T_o$ is incremented by a first predetermined margin c to provide upper predetermined temperature limit $T_o+c$, which is 71° F. in this example. A subtractor circuit 103 decrements $T_o$ by a second predetermined margin c' to provide lower predetermined temperature limit $T_o-c'$, which is 69° F. in this example. While $c=c'$ in this example, that is not necessary; that is a matter of design choice, as is the magnitude of c and c'.

$T_o+c$ and $T_o-c'$ are stored in read-write memory locations 104 and 106, respectively. $T_o$, $T_o+c$, and $T_o-c'$ are also sent to look-up ROM 108, which outputs digital signals $T_0'$, $T_1'$ and $T_2'$, respectively representative of numerical temperature values $T_0$, $T_o+c$, and $T_o-c'$. ROM 108 is the same as ROM 76 of FIG. 6. The digital signals $T_0'$, $T_1'$ and $T_2'$ are stored in read-write memory locations 110, 112, and 114.

Temperature sensor 18 senses room temperature as 68.5° F. ADC 116 converts analog voltage $T_s$, provided from sensor 18, to digital form $T_s'$. Both signals are representative of 68.5° F. in this example.

First comparator 118 monitors $T_s'$ and compares it with $T_2'$ stored in read-write memory location 114. In the present example, $T_s'$ is representative of 68.5° F. and $T_2'$ is representative of 69° F. Hence, $T_2'>T_s'$. As flowchart symbol 120 next to first comparator 118 indicates, first comparator 118 provides a "true" ("1") output if $T_2'>T_s'$ and a "false" ("0") output if $T_s'\geq T_2'$. Upon a 0 output, first comparator 118 resumes monitoring $T_s'$ and comparing it with $T_2'$. Upon a 1 output, first comparator 118 feeds the 1 output to a first input of AND gate 122. A second input of AND gate 122 is true if an off-state has been in effect for at least the 5-minute (or other predetermined) minimum off-time interval predetermined for this system. Hence, AND gate 122 provides a 1 signal if and only if $T_2'>T_s'$ and the furnace has been off for at least 5 minutes. When AND gate 122 provides a 1 signal, the following things occur in the following order: (a) the furnace goes on for a 2-minute (or other predetermined) on-time interval; (b) then the furnace goes off for a 5-minute (or other predetermined) minimum off-time interval; and (c) then control passes to second comparator 124. During this cycle, charging-time and leakage-time parameters are updated.

Second comparator 124 now compares $T_s'$ from ADC 116 with setpoint temperature signal $T_0'$ of read-write memory location 110, after comparator 124 is enabled as a result of AND gate 122's output going to 1, as described in the preceding paragraph. As flowchart symbol 126 next to second comparator 124 indicates, second comparator 124 provides a true (1) output if $T_s'\geq T_0'$ and a false (0) output if $T_s'<T_0'$. Thus, in the present example, comparator 124 now monitors sensed temperature to determine whether the on-off cycle that just occurred raised room temperature to at least $T_0$, here 70° F. If so, comparator 124 provides a 1 output and the system is directed to complete the remainder of the updated off-time interval (of which the first 5 minutes, in this example, have already elapsed); then regular processor control of the system resumes with updated system parameters.

If the single 2-minute/5-minute (or other predetermined), on/off cycle is insufficient to raise temperature to 70° F., second comparator 124 provides a 0 output. Then, as flowchart symbol 126's NO output indicates, the same steps are repeated that followed after AND gate 122's 1 output, including another 2-min/5-min on/-off cycle. This ends with a return of control to second comparator 124 and the procedure described in the previous paragraph is repeated. These steps continue until comparator 124 provides a 1 output, indicating that sensed temperature has risen to setpoint temperature, and regular control of system operations resumes.

B. Overshoot correction

Sensor 18 senses a $T_s$ in excess of $T_0+c$; in the present example, that is a sensed temperature of 71.5° F. ADC 116 converts analog signal $T_s$ to digital signal $T_s'$, representative of 71.5° F.

Third comparator 128 monitors $T_s'$ and compares it with $T_1$ from read-write memory location 112. In this example $T_1'$ is representative of 71° F. As flowchart symbol 130 next to third comparator 128 indicates, third comparator 128 provides an output of 1 if $T_s'>T_1'$, as here, and third comparator 128 provides an output of 0 if $T_s'\leq T_1'$. Upon a 0 output, third comparator 128 resumes monitoring $T_s'$ and comparing it with $T_1'$.

Upon a 1 output, third comparator 128 feeds the 1 to a first input of AND gate 132. A second input of AND gate 132 is 0 if the furnace is on (FUEL=1) and 1 if the furnace is off (FUEL=0). Thus, nothing will happen until the current on-time interval (if any) is completed, and an actual off-state interval (of duration >0) occurs. Then AND gate 132 is able to provide a 1 output, which causes the following things to occur: (1) the leakage-time parameter is updated; (2) control passes to fourth comparator 134.

Fourth comparator 134 now monitors $T_s'$ and compares it with $T_0'$. The furnace remains off, because it receives no new on-time signal. $T_s'$ decreases as heat leaks to the ambient. As flowchart symbol 136 next to fourth comparator 134 indicates, fourth comparator 134 provides an output of 0 as $T_0' < T_s'$. When $T_0' \geq T_s'$, fourth comparator 134 provides an output of 1. Then, an on-state occurs; control of the system passes back to regular operation under the processor; a parameter update occurs at the next opportunity; and on/off cycling resumes according to the updated system parameters.

Instead of permitting a current on-time interval to continue in effect if set-point temperature is exceeded during an on-time interval, the system can be arranged to terminate the current on-time interval immediately. This arrangement differs from the preceding one by permitting some on-time intervals to be less than the predetermined maximum on-time interval, rather than having all on-time intervals of equal length and then adjusting only the off-time intervals.

The preceding description provides for updating system parameters after an overshoot or undershoot. If thus is directed to the first and second implementations described above. In the case of the third implementation (in which positive and negative temperature excursions are equalized), requiring such updating is unnecessary. The apparatus for the third implementation automatically effectively updates the temperature excursion parameter on which it is based, in every cycle. Hence, the update steps in the preceding description are omitted for the third implementation as superfluous.

By the same token, the update steps described above can be carried out every cycle, instead of only when an undershoot or overshoot occurs. Then, in effect, the ratio of off-time to on-time is continuously updated. However, if the temperature variations are very small, recomputation should be avoided. Thus, it is appropriate to require temperature variation to exceed a predetermined threshold level before an update is made.

VI. System With Discrete Logic Devices

A furnace-control circuit is now described in terms of discrete logic devices that readily lend themselves to implementation with a gate array. This system combines features of the system of FIG. 8 with other features, so that a complete thermostat is described, which operates a furnace and its fan, and includes provision for extraction of residual heat and cooling during a secondary-delivery interval of fan operation. The thermostat generates FUEL-1 and FUEL-0 signals to energize and de-energize the coil of a furnace relay, and DELIVERY-1 and DELIVERY-0 signals to energize and de-energize the coil of a fan relay (or other delivery device, such as a hot-water pump).

State Machine Description

This type of control system can be described, for purposes of explaining how it works, in terms of a cycle of states which the HVAC system assumes and in terms of the conditions that trigger a change from a given state to the next state.

The system has means for providing three state signals, which may be designated as STATE_A, STATE_B, and STATE_C. These states and signals are mutually exclusive, so that when any one of the states (or the signal representative of it) is "1," the other two are "0." The three states are characterized in terms of what signals the thermostat's relay unit sends to the HVAC furnace and fan relays. Thus, when the STATE_A signal is "1", the relay unit of the thermostat sends a FUEL=1 signal and a DELIVERY=1 signal to the HVAC relays. When the STATE_B signal is "1", the thermostat sends a FUEL=0 signal and a DELIVERY=1 signal. When the STATE_C signal is "1", said thermostat sends a FUEL=0 signal and a DELIVERY=0 signal. (These states are shown above in Table A of Section III-A.)

The transitions of the cycle of states are from A to B to C to A, and so on. The STATE_A signal goes from "0" to "1" when each of the following conditions has occurred:
(a) the difference between the set-point-temperature signal and the space-temperature signal exceeds a predetermined threshold;
(b) a secondary-delivery interval is not in effect; and
(c) a minimum off-time interval is not in effect.

The STATE_A signal then remains "1" until at least one of the following occurs:
(a) a next maximum fuel-on interval ends, where the interval began when the STATE_A signal last went from "0" to "1"; or
(b) the difference between the space-temperature signal and the set-point-temperature exceeds a predetermined threshold.

The STATE_A signal goes from "1" to "0" when at least one of the following conditions occurs:
(a) the maximum fuel-on interval ends; or
(b) the difference between the space-temperature signal and the set-point-temperature signal exceeds a predetermined threshold.

The STATE_A signal then remains "0" until each of the following conditions has occurred:
(a) a secondary-delivery interval which began when the STATE_A signal last went to "0" ends;
(b) a minimum off-time interval which began when the STATE_A signal last went to "0" ends; and
(c) the difference between the set-point-temperature signal and the space-temperature signal exceeds a predetermined threshold.

The STATE_B signal goes from "0" to "1" when a fuel-"1" signal ends, whereupon the secondary-delivery interval begins. The STATE_B signal then remains "1" during the interval. The STATE_B signal goes from "1" to "0" when the interval ends. The STATE_B signal then remains "0" until a next fuel-"1" signal ends.

The STATE_C signal goes from "0" to "1" when a secondary-delivery interval ends. The STATE_C signal then remains "1" as long as at least one of the following conditions occurs:
(a) a minimum off-time interval which began when, the STATE_A signal last went to "0" has not yet ended; or
(b) the difference between the set-point-temperature signal and the space-temperature signal is less than a predetermined threshold.

The STATE_C signal goes from "1" to "0" when both of the following conditions occur:
(a) the minimum off-time interval has ended; and
(b) the difference between the set-point-temperature signal and the space-temperature signal becomes more than a predetermined threshold.

The STATE_C signal then remains "0" until a next secondary-delivery interval ends.

Gate Circuitry

Figure 11A:
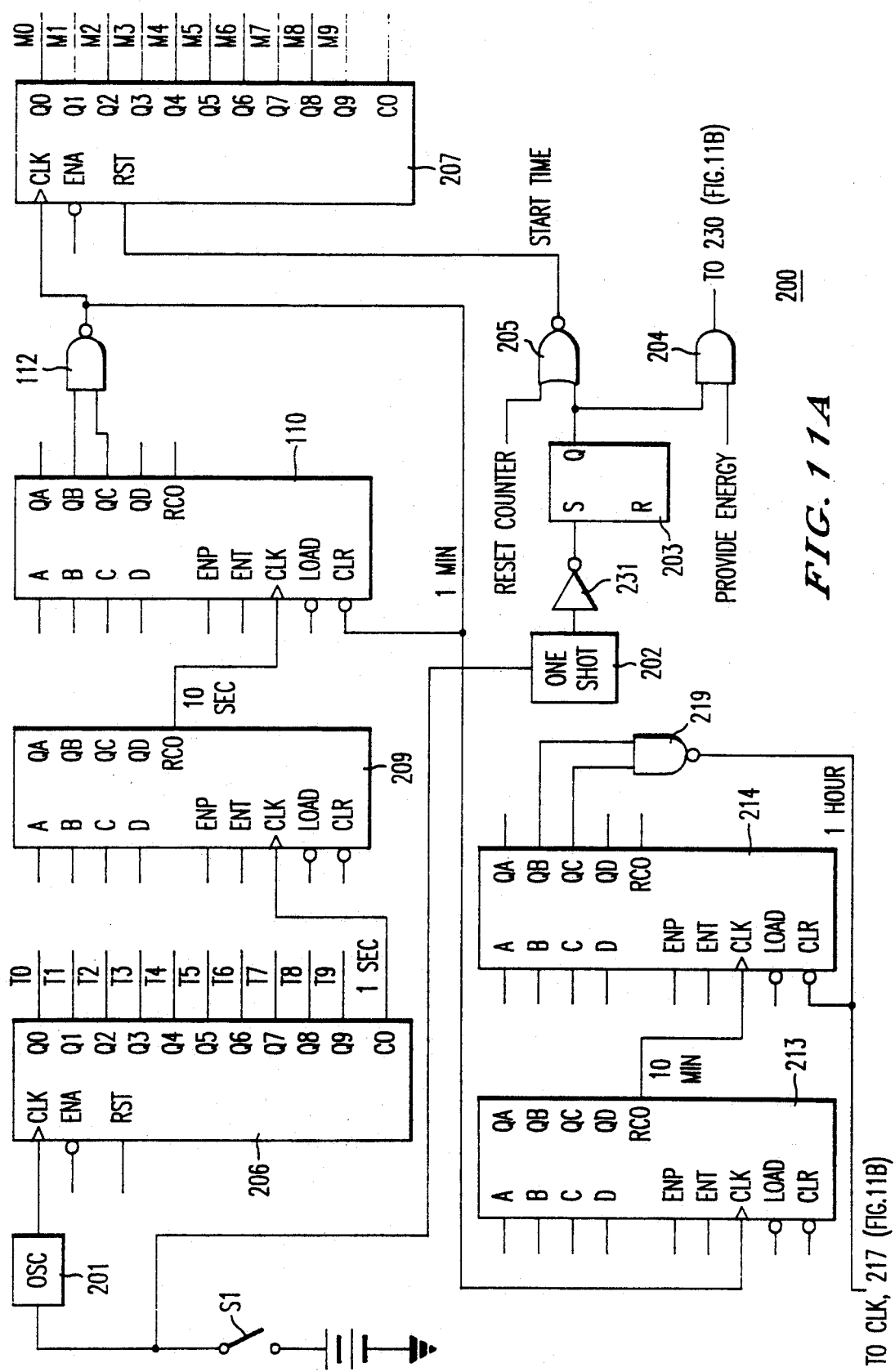
FIGS. 11-13 are diagrams of the elements of a thermostat, based on an elaboration of the subsystem of FIG. 8.
Figure 11B:
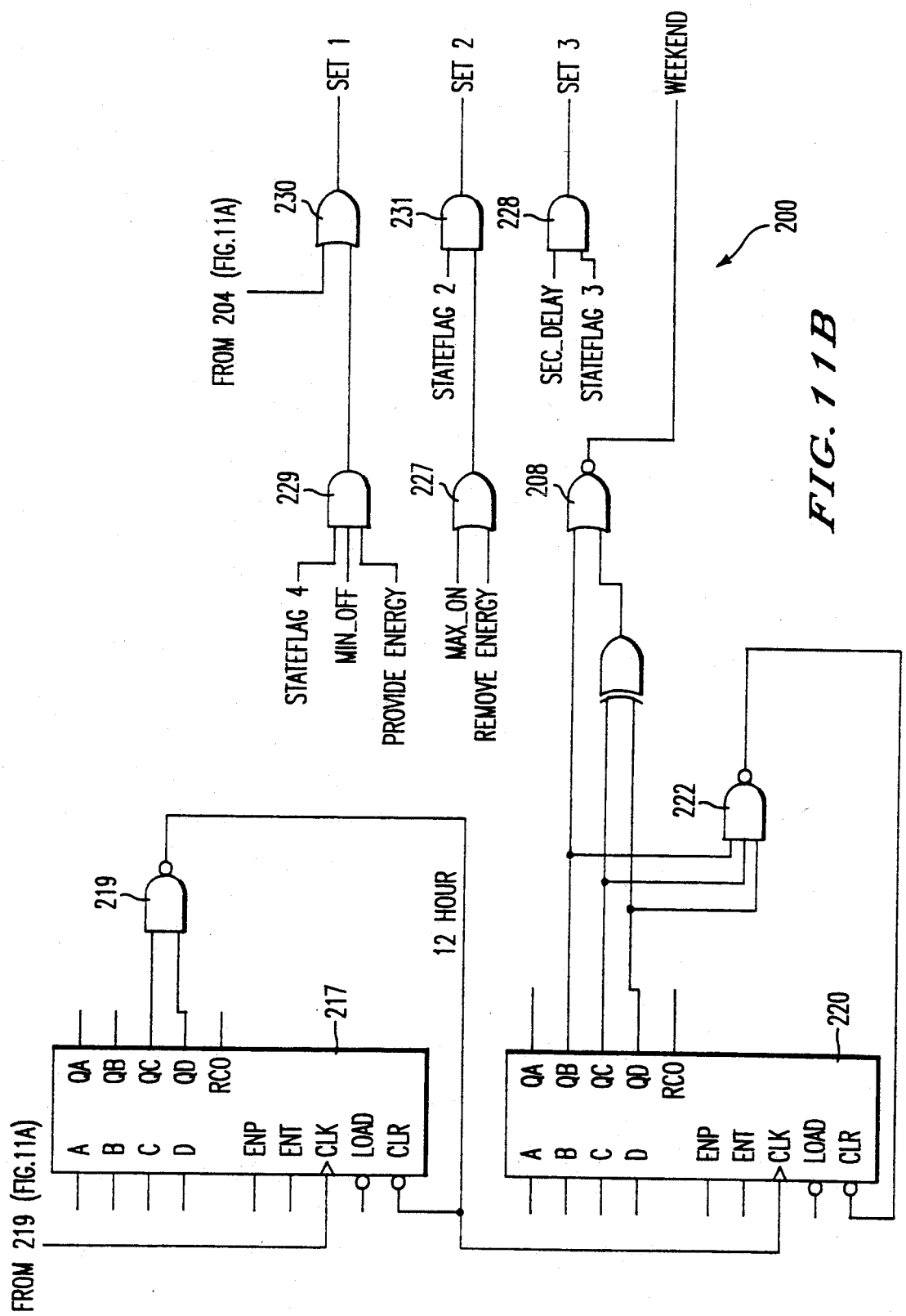
Figure 13A:
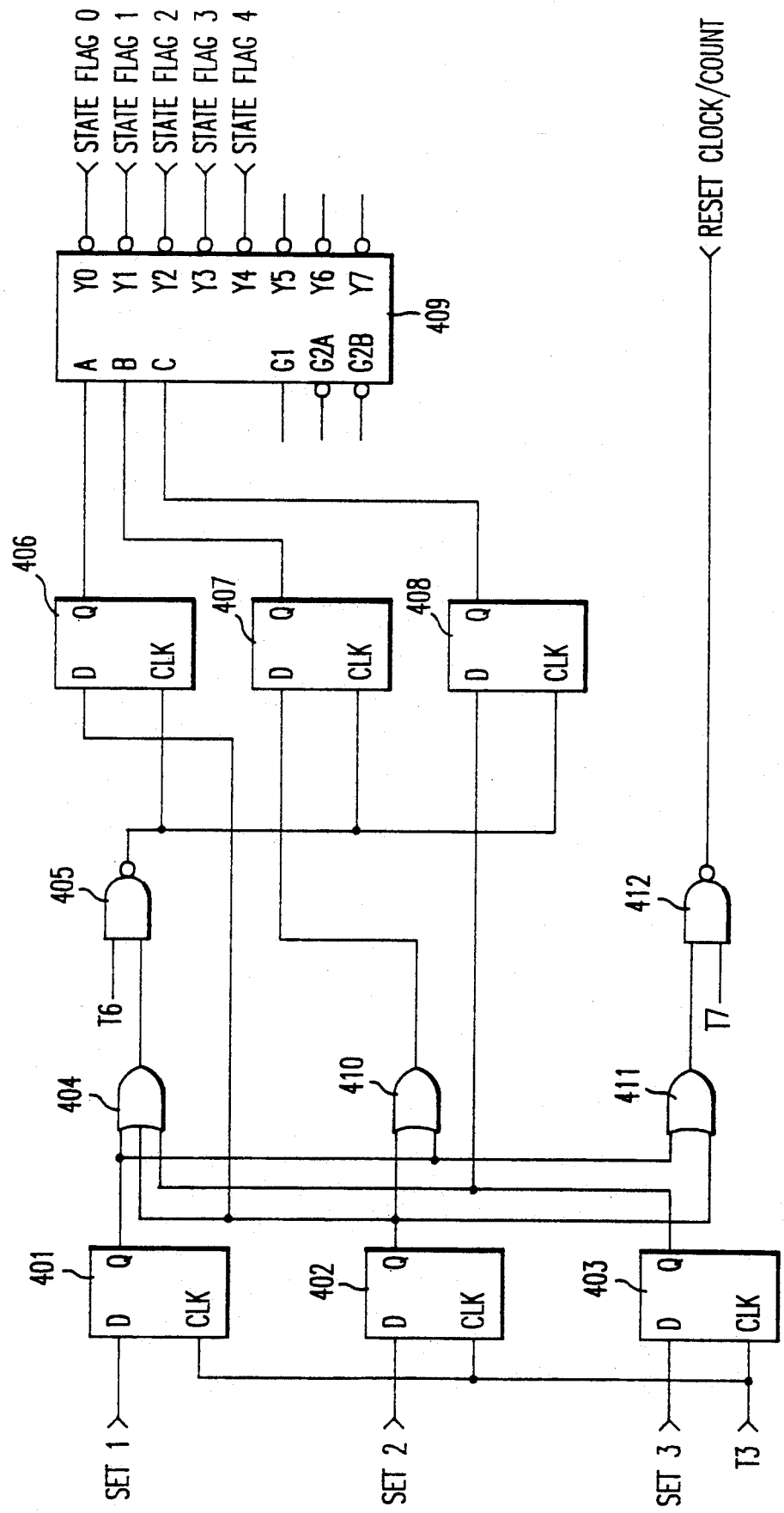
Figure 13B:
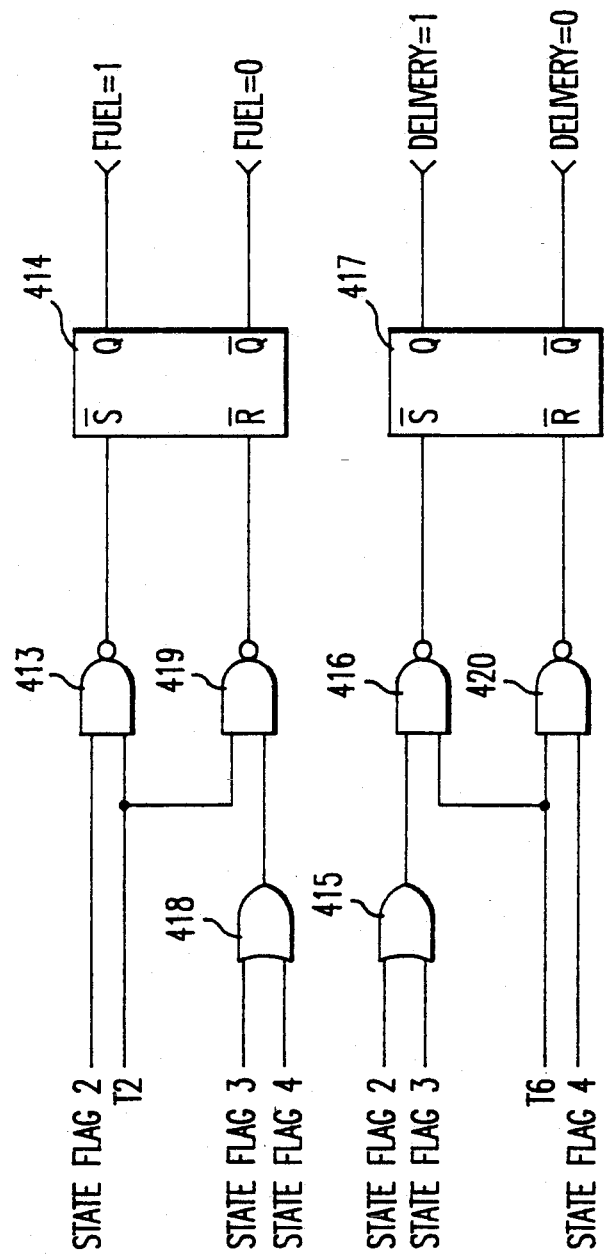

FIGS. 11, 12, and 13 show portions of circuitry that provides this kind of sequence of states. The circuit is based on an implementation in which a predetermined maximum on-time interval MAX_ON, a minimum off-time interval MIN_OFF, and a secondary-delivery interval SEC_DELY for fan lag-time for extraction (or absorption) of residual heat after the furnace (or air conditioner) is turned off are encoded into the system at the time of installation. This circuit also provides various temperature setbacks for night, weekend, etc., that are not described in detail.

The thermostat provides a FUEL-1 signal when current temperature of the heated space differs from set-point temperature by more than 0.50° F., provided that the system has been in a state not providing energy for at least the MIN_OFF interval. The HVAC system then consumes fuel for the predetermined MAX_ON interval, unless current temperature begins to differ from set-point temperature (in an overshoot mode) by more than 1.0° F., in which event a FUEL-0 signal replaces the FUEL-1 signal. During the foregoing on-time interval, the thermostat sends FUEL-1 and DELIVERY_1 signals to the relays of the HVAC system. When the interval ends, the FUEL-1 signal is replaced by a FUEL-0 signal, but the DELIVERY-1 signal continues for the predetermined SEC_DELY interval. At the end of the SEC_DELY interval, the DELIVERY-1 signal is replaced by a DELIVERY-0 signal. FUEL-0 and DELIVERY-0 signals then remain in effect until the current temperature of the space once again deviates by more than 0.50° F. from set-point temperature.

Referring to FIG. 11, it is seen that discrete logic system 200 comprises a number of standard AND gates, NAND gates, OR gates, inverters, D and R-S flip-flops, and other conventional devices that have gate array counterparts. While FIG. 12 shows a pair of operational amplifiers connected to the same analog temperature sensor previously described, the operational amplifiers can be replaced by a comparator if an analog-to-digital converter is provided.

Power Start-Up

System 200 is started up by closing a switch S1, thereby applying power from a power source V to system 200. The resulting power pulse starts a clock (oscillator) 201, which is a 6 Hz clock (or a divide-by-10 flip-flop array fed from 60-cycle power as a signal input). The power pulse also powers up a one-shot multivibrator 202, causing it to emit a pulse output. Multivibrator 202 can conveniently be implemented as part of a 74HC123 chip (½).

The pulse output, passed through an inverter 231, sets an R-S flip-flop 203, which provides an output which primes an AND gate 204 (discussed below) and enables a NOR gate 205. NOR gate 205 provides an output that resets a counter decoder 207 to a minute count of zero. Inverter 231 can conveniently be implemented as a 74HC04 chip (1/6). Flip-flop 203 can conveniently be implemented as part of a 74HC74 chip (½). AND gate 204 can conveniently be implemented as part of a 74HC08 chip (¼). NOR gate 205 can conveniently be implemented as part of a 74HC02 chip (¼). Counter decoder 207 can conveniently be implemented as a 74HC4017 chip.

After power startup, each clock pulse from the clock 201 causes a second counter decoder 206 (also conveniently implemented as a 74HC4017 chip) to sequentially produce pulse outputs T0 through T9. Pulses T0 and T2 cause other system elements (discussed below in connection with FIG. 12) to read setpoint and current temperatures, and compare the two readings.

Reading Setpoints

FIG. 12 shows a subsystem which performs temperature comparisons. Five potentiometers 301, 302, 303, 304, and 305 are connected to the power source V, and are each set by the person using the system to various desired temperatures referred to here as WEEKDAY_OCCUPIED, WEEKDAY_SETBACK, WEEKEND_OCCUPIED, WEEKEND_SETBACK, and VACATION. The potentiometers are calibrated with markings so that their respective output voltages will correspond to the analog signals from a temperature sensor (sensor 316, discussed below) for the particular setpoint temperatures represented by the foregoing designations. For example, if WEEKDAY_OCCUPIED setpoint is to be 70° F., and the sensor output voltage for 70° F. is 2.78 v, then potentiometer 301 should be calibrated and marked to provide 2.78 v when set to 70° F. (The potentiometers can be replaced by digital input circuitry, to provide signals stored in a register. For example, the clock-radio type of time-setting input can advantageously be used.)

Signals from these potentiometers are fed to a multiplexer 310, which is a standard 8-channel analog multiplexer, conveniently implemented as a 74HC4051 chip. In addition, a switch S2 is connected to the power source V and provides a signal MSB1 as one address bit of the multiplexer 310. MSB1 is 0 for non-vacation time and 1 for vacation time. For present purposes, the WEEKDAY_OCCUPIED signal from potentiometer 301 is the only one that needs to be considered. (Any set-point temperature can be considered for purposes of illustrating the operation of the circuit.)

Multiplexer 310 may be considered to have been stepped to its state in which the WEEKDAY_OCCUPIED temperature setpoint signal is fed to a sample-and-hold register 315, which samples the voltage output of the multiplexer 310. The register 315, conveniently implemented as a HA 2420/25 chip, is connected to receive signals T0 (read current and setpoint temperatures) from the counter-decoder 206 of FIG. 11. On receiving signal T0, the register 315 samples and holds the signal then being provided from potentiometer 301 and passes it to inputs of a pair of operational amplifiers 318 and 319 (discussed below).

Reading Current Temperature

Referring to FIG. 12, a thermistor sensor 316 reads current temperature. Sensor 316 is advantageously implemented, for example, by the same YSI 44008 precision thermistor (nom. res. 30K at 25° C.), previously described, grounded at one end and connected it the other end in series with a 24K resistor and a 5 v supply. The output from the unground side of thermistor 316 is fed to a sample-and-hold register 317, which is also connected to receive signal T0, in the same manner as the sample-and-hold register 315. Register 317 samples and holds a current-temperature analog voltage signal $T_s$ from sensor 316 upon receiving signal T0 (read setpoint temperature), and passes $T_s$ to operational amplifiers 318 and 319. Like sample-and-hold register 315, register 317 is conveniently implemented as a HA 2420/25 chip.

Comparing Current and Setpoint Temperatures

The outputs of sample-and-hold registers 315 and 317 are connected to operational amplifiers 318 and 319 (conveniently, HA 4900 4-unit chips), so that the output of register 315 is connected to the +input of operational amplifier 318 and the −input of operational amplifier 319, while the output of register 317 is connected to the −input of operational amplifier 318 and the +input of operational amplifier 319. The outputs of operational amplifiers 318 and 319 are connected, respectively, through inverters 325 and 326 to inputs of AND gates 320 and 321. Each AND gate can conveniently be implemented as part of a 74HC08 chip (¼).

The two operational amplifiers are adjusted for voltage offsets $v_0$, which corresponds to the incremental voltage output of sensor 316 for 0.50° F. For the above-described YSI 44008 thermistor connected to 24K and 5 v, $v_0$ is approximately 6 mv in the vicinity of 70° F. Hence, when current temperature is within 0.50° F. of the desired setpoint temperature, the operational amplifiers are providing "1" outputs. These "1" outputs are fed to inverters 325 and 326, providing "0" outputs to AND gates 320 and 321. That keeps AND gates 320 and 321 at "0" output when current temperature is within 0.50° F. of the desired setpoint temperature. By the same token, the signal paths fed therefrom are not enabled, since (as described below) they require at least one "1" to be enabled.

Current Temperature Below Setpoint

However, when current temperature is not within 0.25° F. of the desired setpoint temperature, one of the AND gates will receive a nonzero output from one of the operational amplifier-inverter combinations. For example, assume that setpoint temperature is 70° F., corresponding to a sensor signal of 2.780 v, which is fed to the +input of operational amplifier 318 and to the −input of operational amplifier 319. Assume that current sensed temperature is 69.5° F., causing a signal of 2.786 v to be fed to the −input of operational amplifier 318 and to the +input of operational amplifier 319. That causes operational amplifier 318 and inverter 325 to provide a nonzero ("1") signal to one input of AND gate 320.

At the same time the other input of AND gate 320 is fed by inverter 322, which is fed a signal power from source V and a customer-controlled "Heat/Cool" mode switch S3 (which is not directly relevant here), which is "0" for heating and "1" for cooling. Thus, if S3 is open ("0") for "Heat," AND gate 320 receives a "1" from inverter 322 and AND gate 321 receives a "0" from the switch output. Thus, assuming that S3 is set for "Heat" mode, AND gate 320 now has "1" signals at each input and therefore it produces a "1" output. (Conversely, if S3 is set for "Cool" mode, which is not discussed here, AND gate 320 receives at least one "0" and therefore provides a "0" output.)

The operational amplifiers of this circuit are used to permit analog comparison of current sensed and setpoint temperatures, yet providing a 1/0 output for subsequent gate circuitry. Alternatively, an analog-to-digital converter and digital comparator can be used to accomplish the same function.

The output of AND gate 320 feeds a "1" signal to an OR gate 323, which feeds a "1" signal to an input of a D flip-flop 324. The D flip-flop (conveniently ¼ of a 74HC74 chip) is also connected to receive time pulse T3 (from counter-decoder 206 of FIG. 11). Signal T3 clocks the D flip-flop. If the D flip-flop receives a signal T3=1, the OR gate's "1" output will be transferred to the output of flip-flop 324 to provide a "1," which is designated a PROVIDE_ENERGY signal. That signal will actuate the furnace, when enabled by other parts of the system, which are discussed below. (That is, the PROVIDE_ENERGY signal, if enabled by other combinatorial logic circuitry implementing other system constraints, such as that a minimum of off-time interval has elapsed since the last time the furnace was on, will cause the thermostat to send a FUEL-1 signal to the furnace relay.) Otherwise the furnace will receive no energy. D flip-flop 324 has Q and $\overline{Q}$ outputs, which are inverses so that when Q=1, $\overline{Q}$=0.

Current Temperature Above Setpoint

Now, assume instead that setpoint temperature is the same 70° F., but current sensed temperature is 71.0° F., causing a signal of 2.96 v to be fed to the − input of operational amplifier 318 and to the + input of operational amplifier 319. During heating mode, if current temperature rises above set-point temperature before the maximum on-time interval for the furnace has elapsed, the flip-flop's $\overline{Q}$ output will generate a REMOVE_ENERGY signal to de-energize the furnace.

Time Signals

Referring back to FIG. 11, other signals from the counterdecoder 206 include T4 through T9, and 1_SEC. The signal 1_SEC clocks a BCD (binary-coded-decimal) counter 209, which provides signals to other circuitry elements to provide various timing signals—1-0_SEC, 1_MIN, etc. These signals are used for encoding maximum on-time interval MAX_ON, minimum off-time interval MIN_OFF, and secondary delivery interval SEC_DELY. Other such timing signals are used for identifying night time, weekends, etc., for temperature setbacks. BCD counter 209 can conveniently be implemented as a 74HC162 chip.

System States

The thermostat system generally operates in one of four states. State 1 encompasses the operation of time and pulses T0, T2, T3, discussed previously. States 2, 3, and 4 depend on the operation of three mutually exclusive signals SET_1, SET_2, and SET_3, provided by the circuitry of FIG. 11 and processed by the remaining circuitry of the system. The operation of the SET signals provides STATEFLAG signals used to turn the furnace (or other temperature-modifying device) on and off, and to turn the fan (or other delivery or propulsion device such as a hot-water pump) on and off.

SET_1. A 3-input AND gate 229 can enable an OR gate 230 to provide a SET_1 signal of "1." When SET_1 goes to "1," the system will, as explained below, go toward turning the furnace and fan on. The inputs of the AND gate 229 are signals PROVIDE_ENERGY, MIN-OFF, and STATEFLAG_4. Hence, SET_1=1 if all of these inputs are "1," and SET_1=0 if any of those inputs is "0." The following conditions thus are relevant for SET_1 to be "1": First, the system must be calling for energy to be provided to the furnace; in the system of FIGS. 11-13, that will occur because current temperature has fallen at least 0.50° F. below set-point temperature. Second, MIN_OFF=0. That means that the furnace has been turned off long enough for the minimum off-time interval to have expired, following completion of an on-time interval. Also, the fan is off after completing its secondary-delivery interval. Third, STATEFLAG_4=1. That signal is fed back to gate 229 from circuitry shown on FIG. 13, and indicates that the furnace and fan are off. (As discussed below, that means that the thermostat is sending the furnace signals referred to as FUEL_0 and DELIVERY_0. The reason for having the STATE-FLAG signal as an AND input is that the system does not need to turn the furnace and fan on unless they are off.)

SET_2. An OR gate 227 appears in FIG. 11 below AND gate 229. The output of gate 227 provides one input of an AND gate 231, and the other input is the STATEFLAG_2 signal. When SET_2 goes to "1," the system will, as explained below, go toward turning the furnace off and leaving the fan on.

The two inputs for OR gate 227 are signals MAX-_ON and REMOVE_ENERGY. When at least one of these signals is "1", the OR gate 227 fires and primes AND gate 231. That is the case when one of the following conditions occurs: First, MAX_ON=1, meaning that the furnace is on and the predetermined maximum on-time interval has just elapsed. Second, REMOVE_ ENERGY=1. The REMOVE_ENERGY signal is generated by the Q output of D flip-flop 324 as the inverse of the PROVIDE_ENERGY signal, and it occurs when current temperature exceeds set-point during a furnace on-time interval by more than a predetermined amount. If REMOVE_ENERGY=1, the furnace should not be on. But the fan should be on until the secondary-delivery interval expires.

The AND gate 231 addresses a necessary condition for turning the furnace off, which is that the furnace is on. That is so if STATEFLAG_2=1, which refers to a signal fed back to gate 227 from circuitry of FIG. 12, indicating that the furnace and fan are on. (As discussed below, that means that the thermostat is sending, to the furnace relay, signals referred to as FUEL_1 and DELIVERY_1.)

SET 3. A 2-input AND gate 228 appears in FIG. 11 below AND gate 231. The two inputs are signals SEC_DELY and STATEFLAG_3. When both of these signals are "1," SET_3=1. That is the case when the following conditions occur: First, SEC_DELY=1, meaning that the fan is on during a secondary-delivery interval just after the furnace was turned off, and that interval is just then completed. Second, STATEFLAG_3=1, which refers to a signal fed back to gate 228 from circuitry of FIG. 13, indicating that the furnace is off and the fan is still on. (As discussed below, that means that the thermostat is sending the furnace a FUEL_0 signal and a DELIVERY_1 signal.)

Utilization of SET signals for STATEFLAG signals

Referring to FIG. 13, it is seen that the SET_1 signal is connected to the D input of D flip-flop 401, the SET_2 signal is connected to the D input of D flip-flop 402, and the SET_3 signal is connected to the D input of D flip-flop 403. Signal T3, which as described above enables a PROVIDE_ENERGY signal, is fed to the clock inputs of D flip-flops 401, 402, and 403, in parallel. (These flip-flops can be consolidated into one octal-D flip-flop, such as a 74HC374 chip.)

If SET_1=1, the Q output of D flip-flop 401 goes to "1" upon occurrence of clock pulse signal T3. That "1" enables each of three OR gates 404, 410, and 411, which have inputs connected to the Q output of flip-flop 401. That in turn primes an AND gate 405, sends a "1" to the D input of a D flip-flop 407, and sends a "1" to one input of an AND gate 412. If signal T6=1, AND gate 405 clocks D flip-flops 406, 407, and 408. (As before, these three flip-flops can be consolidated into one octal-D flip-flop, such as a 74HC374 chip.) Of these, flip-flop 407 will then be enabled to pass the "1" sent it by OR gate 410 on to a decoder 409 (conveniently implemented as a 74HC138 chip). Decoder 409 then provides a STATEFLAG_2 signal. In addition, when time pulse signal T7=1, the AND gate 412 will be enabled and will provide a RESET CLOCK/COUNT signal.

If SET_2=1 when time pulse T3=1, the Q output of D flip-flop 402 will be "1," and the three OR gates 404, 410, and 411 will be enabled as above. Also, the D flip-flop 406 will receive the same "1." At time pulse T6=1, the AND gate 405 fires and clocks the D flip-flops 406, 407, and 408. That causes flip-flops 406 and 407 to pass the "1" signals that they receive from the OR gates 404 and 410 on to the decoder 409. That also causes flip-flop 408 to pass the "0" signal at its Q output to the decoder. These signals cause the decoder 409 to provide a STATEFLAG_3 signal. In addition, when time pulse signal T7=1, the AND gate 412 will be enabled and will provide a RESET CLOCK/COUNT signal.

If SET_3=1, the OR gate 404 and the D flip-flop 408 will receive "1" signals. When clock pulse T6=1, the AND gate 405 fires and clocks the three D flip-flops 406, 407, and 408. This causes the D flip-flop 408 to pass the "1" from the D flip-flop 403 to the decoder 409, which provides a STATEFLAG_4 output signal. No RESET CLOCK/COUNTER signal occurs.

Referring again to FIG. 13, it is seen that when STATEFLAG_2=1, and NAND gate 413 (conveniently, ¼ of a 74HC00 chip) is primed for "0" output. On T2=1, the NAND gate 413 provides a, "0" to the S input of an R-S flip-flop 414 so that flip-flop 414 provides a "1" at its Q output and provides a "0" at its Q̄ output. This is a FUEL_1 signal at the output of the thermostat. Also on T2=1 a "1" is sent to an input of NAND gate 419. An OR gate 418 provides another "1" to an input of NAND gate 419 if STATEFLAG_3=1 or if STATEFLAG_4=1. The output of the NAND gate 419 feeds the R input of the R-S flip-flop 414, so that flip-flop 414 provides a "0" at its Q output and provides a "1" at its Q̄ output. This is a FUEL_0 signal at the output of the thermostat. As indicated earlier, a FUEL_1 signal causes 24 VAC to energize the coil of the furnace relay, in heating mode, while a FUEL_0 signal causes 24 VAC not be supplied to that coil. Thus, a FUEL_1 signal turns the furnace on and a FUEL_0 signal turns it off, in heating mode.)

STATEFLAG_2 and STATEFLAG_3 also feed an OR gate 415, so that if either is "1," OR gate 415 provides a "1" input to a NAND gate 416. Additionally, T6 feeds the NAND gate 416, and also one input of a NAND gate 420. Thus, on T6=1, NAND gate 416 provides a "0" to the S input of R-S flip-flop 417 causing a "1" at its Q input and provides a "0" at its Q̄ output. This provides a DELIVERY_1 signal at the output of the thermostat. When STATEFLAG_4=1, the NAND gate 420 feeds the R input of the R-S flip-flop 417, so that flip-flop 417 provides a "0" at its Q output and provides a "1" at its Q̄ output when T6=1. This provides a DELIVERY 0 signal to the output of the thermostat. (As indicated earlier, a DELIVERY_1 signal causes 24 VAC to be supplied to the relay coil for the fan or other delivery means such as a hydraulic pump. A DELIVERY_0 signal causes 24 VAC not to be supplied to that relay coil.)

It is thus seen that in the foregoing implementation, a PROVIDE_ENERGY signal is generated by a deviation from setpoint. However, a PROVIDE_ENERGY signal does not result in the thermostat sending a FUEL_1 signal to the HVAC system relays if a MIN_OFF interval is still in process. Rather, system 200 prevents that from occurring until the latest MIN_OFF interval is completed. The FUEL_1 signal then remains in effect for the predetermined. MAX_ON interval (unless terminated by an overshoot temperature excursion). System 200 then makes a transition to the next state, a predetermined secondary-delivery interval (SEC_DELY). When that is completed, system 200 makes a transition to an off-state in which FUEL_0 and DELIVERY_0 signals remain in effect until the next on-time interval begins after a further PROVIDE_ENERGY signal occurs.

While the foregoing implementation has been described in terms of discrete logic devices, an electronic designer of ordinary skill can readily convert the circuit to a gate array or other integrated device.

VII. Programmed Microprocessor Implementations

The implementations described above were primarily based on combinatorial logic circuitry. As indicated, however, the same procedures can be implemented with an CPU and a program. The counting, scaling, adding, subtracting, comparing, ANDing, etc. operations described above may be carried out by a CPU and program, for example, a microcontroller with program embedded in ROM.

While sensor nonlinearities may be disregarded with little effect on system performance for temperatures relatively close to a given temperature level, such as 70° F., if the system operates over a wide temperature and the effects of such linearities may become objectionable. In a microcontroller implementation, correction of nonlinearity by means of look-up table conversions is readily accomplished. The look-up conversion data can be stored in the same EPROM as the program, and can thus readily be made accessible to the program and CPU. Alternatively, the look-up conversion data can be reduced to a logarithmic formula capable of being manipulated by a calculator chip that has logarithm circuitry. (According to the manufacturer, the temperature T in degrees Kelvin and resistance R in ohms for the YSI 44008 sensor may be expressed as $T = 1/(A + B \ln R + C [\ln R]^3)$, where $A = 9.354011E-4$, $B = 2.210605E-4$, and $C = 1.274720E-7$. That formula and those parameters are readily stored in ROM for use.)

FIGS. 14, 14A, 14B, and 14C show flowcharts of program/CPU implementations of those portions of the foregoing methods and apparatus that lend themselves to program/CPU implementation. Thus, the processing unit 12 of FIG. 2 may be replaced by a programmed microcontroller or microprocessor, but other elements of the thermostat, such as the set-point input device 10 and the relay or other output device 22 of FIG. 2, must be implemented in hardware.

A. Pause Determined by Sensor

FIG. 14 shows a flowchart for a program/CPU implementation of a furnace-control system such as that of FIGS. 11-13. In this implementation, the HVAC system provides a fuel-on interval which lasts for the predetermined maximum fuel-on interval, unless terminated sooner by a temperature overshoot. The off-time interval ("pause") continues until the sensor indicates a temperature below set-point temperature by a predetermined threshold (see FIG. 14A).

During the fuel-on interval, a signal FUEL has the value 1 and during the fuel-off interval signal FUEL has the value "0." During the fuel-on and secondary-delivery intervals, a signal DELIVERY has the value "1"; after the end of the secondary-delivery period and until the next fuel-on interval, signal DELIVERY has the value "0." These signals are referred to below and in the flowchart as FUEL=1, FUEL=0, DELIVERY=1, and DELIVERY=0. FUEL=1 means that 24 VAC is supplied to the coil of the furnace relay (referred to at times as a fuel-1 signal); FUEL=O means that power is not supplied to the furnace relay (referred to at times as a fuel-0 signal); DELIVERY=1 means that 24 VAC is supplied to the coil of the fan relay (referred to at times as a delivery-1 signal); DELIVERY=0 means that power is not supplied to the fan relay (referred to at times as a delivery-0 signal).

The temperature sensor supplies the CPU with current temperature signal $T_s$ (space temperature in °F.). The CPU is also supplied with a set-point temperature $T_o$ and a clock/timer reading t. The latter is periodically reset to O, so that it measures elapsed time from the last "reset" occasion; this is done to make comparisons with stored MAX_ON, MIN_OFF, and SEC_DELY signals representing maximum on-time, minimum off-time, and secondary-delivery intervals.

Figure 14A:
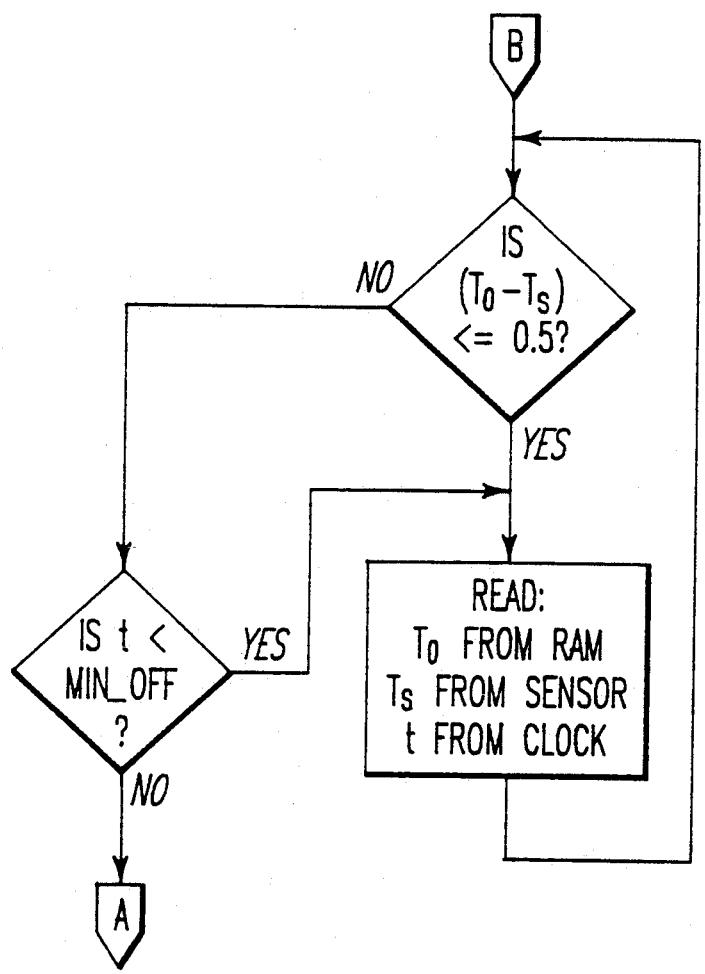

As shown in FIGS. 14 and 14A, at startup FUEL=1 and DELIVERY=1 and t=O. $T_s$, $T_o$, and t are read. While t>MAX_ON and $T_o - T_s > 0.25$, the system continuously updates a reference temperature, T1. When t exceeds MAX_ON or $T_s - T_o > 1.0$, the system leaves this loop and jumps to the next state (assuming that an economy mode is in use).

Then, FUEL=0 and DELIVERY=1, and t is reset to 0. $T_o$, $T_s$, and t are read continuously until $t \geq$ SEC-DELY. A second reference temperature, T2 is set equal to the maximum value attained by Ts. When $t \geq$ SEC-DELY, the loop ends and the system jumps to the next state.

Then, FUEL=0 and DELIVERY=0, and t is reset to 0. $T_s$, $T_o$, and t are read. While $T_o - T_s \leq 0.5$ or if t<MIN_OFF, $T_s$ is continuously updated. If $T_o - T_s > 0.5$ and t>MIN_OFF, the loop ends and the system jumps to the next state, which is the first loop, described above as immediately following startup.

B. Computed Pause

Figure 14B:
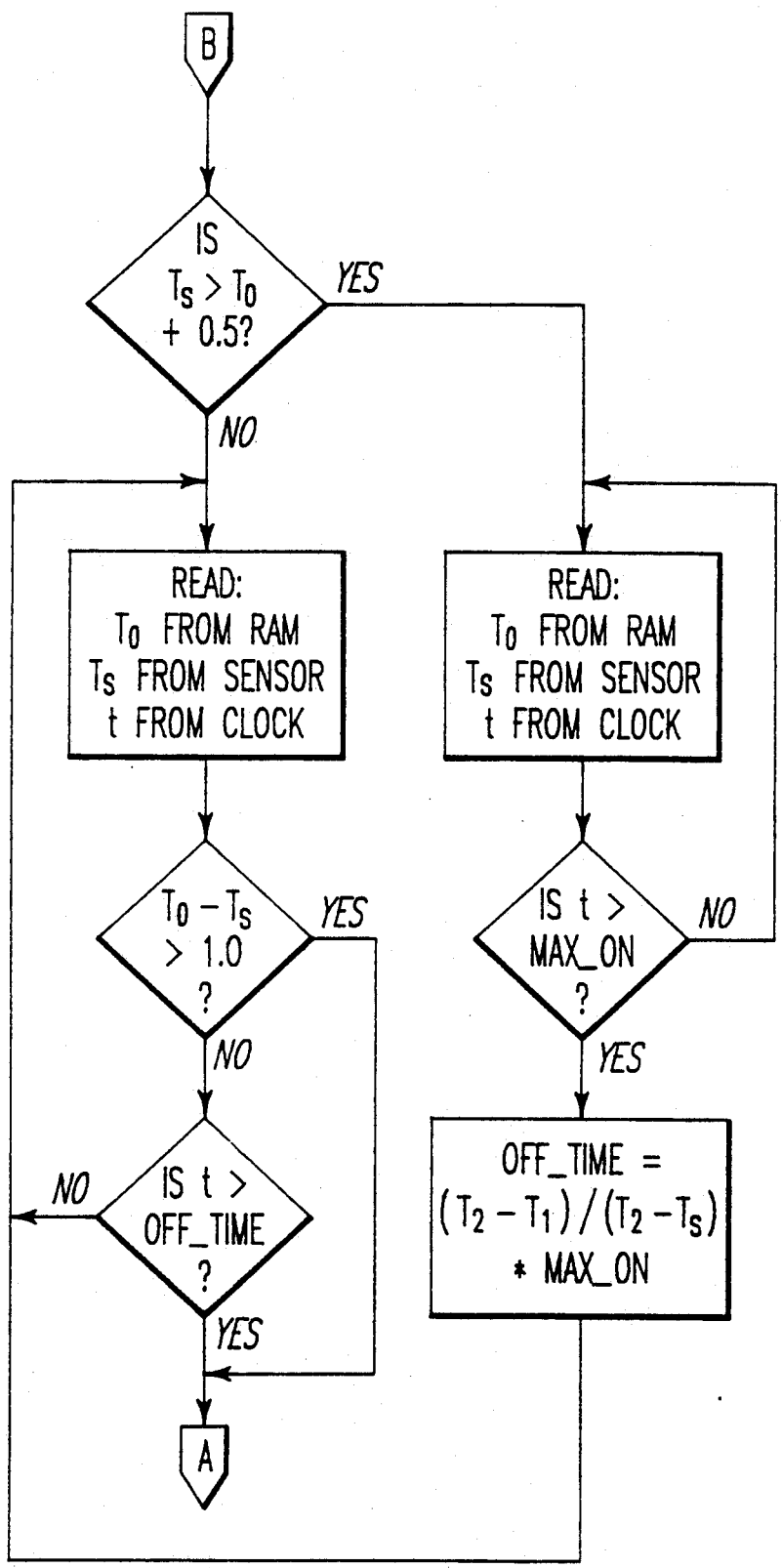

FIG. 14B shows a module of the flowchart for a programmed-microcontroller implementation of a system in which the off-time interval ("pause") is determined by multiplying the MAX_ON interval by the ratio of leakage-time parameter to charging-time parameter. The resulting interval is designated OFF_TIME. However, in the event that $T_o + 0.5 < T_s$ at the end of the secondary-delivery interval, the parameters are redetermined. An UPDATE OFF-TIME routine is initiated in which leakage-time parameters are measured, and a new ("updated") value of OFF-TIME is stored in place of the previous value.

Referring to FIG. 14B it is seen that (as in the case of FIG. 14A) at startup FUEL=1 and DELIVERY=1 and t=0. $T_s$, $T_o$, and t are read. While t<MAX_ON and $T_o - T_s > 0.25$, the system continuously updates a reference temperature T1. When t<MAX_ON or $T_s - T_o < 1.0$, the loop stops and the system jumps to the next state.

In the next state of the system, FUEL=0 and DELIVERY=1; t is reset to 0. The loop continues until t≧SEC_DELY, and then the system jumps to the next state.

Then, FUEL=0 and DELIVERY=0, and t is reset to 0. $T_s$, $T_o$, and t are read. In the event that $T_0-T_5<0.5$ at the end of SEC-DELY, an update OFF-TIME procedure occurs to generate a redetermination of the OFF-TIME interval. When t≧OFF_TIME, this loop ends and the system jumps to the next state, which is the first loop, already described above.

C. Increment-Decrement

Figure 14C:
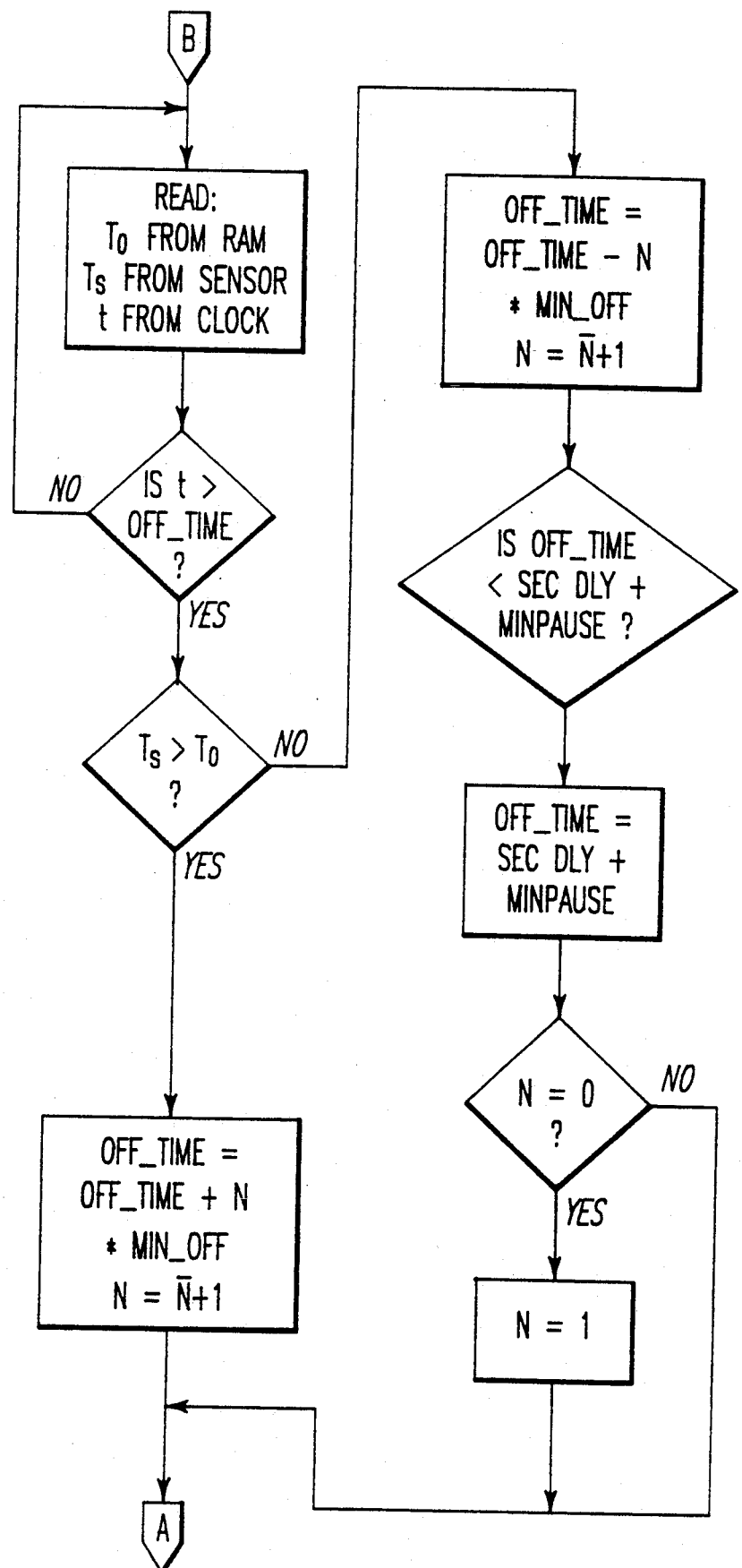

The flowchart module of FIG. 14C shows the procedure for a program/CPU implementation of a system in which the off-time interval is determined by incrementing or decrementing the current off-time interval in the event that $T_o-T_s>0.1°$ F. The only significant difference from FIGS. 14A-14B is how the UPDATE OFF_TIME procedure is carried out.

CONCLUDING REMARKS

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, but rather comprehends the subject matter defined by the following claims.

Claims Terminology

As used in the claims, the following terms have the following meanings:

"Fuel" refers to energy used to provide heat in a furnace. Such fuel includes natural gas, fuel oil, and electrical energy. Such fuel is to be distinguished from the energy, which is ordinarily electrical energy, used to operate a forced-air fan (or blower) of an HVAC system or a propulsion pump of a hot-water system. The term "furnace" as used herein, includes furnaces for steam and hot-water boiler systems, and also resistance-heating systems.

A "fuel on-state" occurs when the furnace consumes fuel, such as when burning natural gas; this state coincides with a "fuel-on interval." A "fuel off-state" occurs when the furnace or other HVAC device does not consume fuel; this state coincides with a "fuel-off interval."

A "FUEL-1 signal" (also referred to as a fuel-"1" signal and FUEL=1) occurs when a signal is sent to a furnace to cause fuel to be consumed. Ordinarily, but not necessarily, this occurs when a 24-volt AC signal is sent from the output of a thermostat to a relay of a furnace to turn it on. A "FUEL-0 signal" (also referred to as a fuel-"0" signal and FUEL=O) occurs in the absence of the foregoing signal. Ordinarily, but not necessarily, this occurs when no 24-volt AC signal is sent from the output of a thermostat to a relay of a furnace or other HVAC device. A FUEL-1 signal may be a pulse, if a latch or like device is present to keep the relay (or equivalent device) of the furnace or other HVAC device actuated. The signal may also be a step function.

A "delivery on-state" occurs when a forced-air fan for a furnace operates, or when a hydraulic pump for a pump-driven hot-water heating system operates. More generally, this refers to any means for delivering heat to a heated space in a building. A "delivery interval" is an interval of time that coincides with a delivery on-state. A "delivery off-state" occurs when the delivery means is not operating. A "nondelivery interval" is an interval of time that coincides with a delivery off-state.

A "DELIVERY-1 signal" (also referred to as a delivery-"1" signal and DELIVERY=1) occurs when a signal is sent to a furnace to cause its forced-air fan to operate, or more generally when a signal is sent to actuate any such delivery means, such as a hot-water pump. Ordinarily, but not necessarily, these signals occur when a 24-volt AC signal is sent from the output of a thermostat to a fan-operating relay of a furnace. A "DELIVERY-0 signal" (also referred to as a delivery-"0" signal and DELIVERY=O) occurs in the absence of the foregoing delivery-1 signal. The signal may be a pulse, if a latch or like device is present to keep the relay (or other actuating device) of the fan or other delivery means actuated. The signal may also be a step function.

A "heat flux" occurs between a heating system and a space within a building (or any other defined space) when the delivery subsystem of the heating system (for example, a forced-air fan and ductwork) delivers heat to the space. Such a heat flux occurs during a delivery interval.

A "heat flux" occurs between a space within a building (or any other defined space) and the ambient (that is, the external environment) at all times during a heating season. Such a heat flux occurs during both delivery and nondelivery intervals, since heat is always leaking from a building or other heated space to a cooler ambient.

Total heat flux during an interval of time refers to a total amount of energy, as measured in BTU, calories, watt-hours, or the like. During a delivery interval, the heat flux to a heated space from the furnace of a heating system ordinarily exceeds the heat flux from the heated space to the ambient, so that a temperature increase occurs during that interval. During a nondelivery interval, the only heat flux is from the heated space to the ambient, so that a temperature decrease occurs during that interval.

"Signal-receiving means" refers to means by which a furnace, fan, or similar device receives signals from a thermostat, directing the former to start or stop an on-state. Typically, such signal-receiving means are 24 VAC relays whose coils are energized when they receive a "1" signal and start an ON state, and whose coils are de-energized when they receive a "0" signal and start an OFF state. However, other such input interface devices for HVAC systems exist.

A "temperature probe for providing signals representative of temperature of a heat exchanger" refers to the type of probe described in section IV of the specification. Such a probe may be placed in an appropriate location for measuring parameters, on installation of an HVAC system, on user-selected occasions thereafter, or on a continuing basis. Signals "representative of temperature of a heat exchanger" may be obtained by placing the probe on the heat exchanger, or (as is suggested earlier may more conveniently be done by home owners) by placing the probe into an air delivery duct. In the latter case, the signal will be representative of the temperature of the heat exchanger only when the fan is on. However, as described in the preceding specification, that is the procedure specified for how the probe is to be used to make measurements of temperature increments. A probe may also be placed on or in a hot water or steam source line. (A hot-water or steam source line is ordinarily a pipe delivering hot water or steam from a boiler to a radiator.)

It should be noted that the fact that a probe signal is representative of temperature of said heat exchanger does not necessarily exclude the fact that the signal is also representative of other temperatures as well. More specifically, a probe in an air duct provides signals that are representative not only of the temperature of the heat exchanger, but also of the temperature of portions of the ductwork system as well. Thus, during a secondary delivery interval, the airflow extracts residual heat stored in the ductwork as well as extracting heat from the heat exchanger. Hence the probe signal is a function of heat exchanger temperature and is also a function of ductwork temperature (as well as other parameters such as airflow speed). As used here, the terminology should be understood in the context of the preceding facts.

"System parameters" refers collectively to the terms "charging-time parameter" and "leakage-time parameter" defined in the specification. These parameters can be expressed in units of temperature per unit of time or in units of time per unit of temperature. As indicated previously, whether °/min or min/° is used will affect which parameter should be the numerator and which the denominator when establishing a ratio, such as one between a non-delivery interval and a fuel-on interval. Ordinarily, such a ratio is expressed as a number greater than 1, since the nondelivery interval is ordinarily greater than the on-time interval for fuel consumption.

The terms "charging-time signal" and "leakage-time signal" refer to signals representative of charging-time parameter and leakage-time parameter.

Reference to a ratio of system parameters being "corrected for secondary-delivery effect" should be understood in terms of the discussion in the specification about how heat flux occurring between the furnace and the space during a secondary-delivery interval makes the total heat flux between the furnace and the space greater than merely the product of fuel-on interval and charging-time parameter. Accordingly, correction of the ratio of system parameters, by a factor of approximately 5% to 10%, for a hot-air system, may be necessary to determine nondelivery interval accurately as a multiple of fuel-on interval. This is advantageously accomplished by scaling the ratio of system parameters by a factor such as 1.05 to 1.10, for a hot-air system. (The factor for a boiler system may be greater.)

Reference to circuitry or means for dividing by a quantity includes such circuitry that multiplies by a number that is the reciprocal of the divisor, as in dividing by 8 by the expedient of multiplying by 0.125. The term "scaling" is also used to refer to this type of operation on a signal.

The terms "clock" and "clock signal" refer to means for providing timing signals, such as pulses to be counted by a counter.

The subject matter claimed is:

1. A fuel-conserving thermostat for controlling operation of a heating system that consumes fuel during a fuel-on interval and heats a defined space, thereby increasing a space temperature of said space; said space being thermally conductive to an ambient, whereby a heat flux occurs from said space to said ambient; said heating system comprising:

heating means for providing heat during said fuel-on interval;

delivery means for delivering heat to said space during a delivery interval, whereby a heat flux occurs from said heating means to said space during said delivery interval;

a heat exchanger;

signal-receiving means, coupling said thermostat and said heating means, for:
 initiating one of said fuel-on intervals, which begins when said signal-receiving means receives a fuel-"1" signal from said thermostat;
 terminating said fuel-on interval and initiating a fuel-off interval in which said furnace does not consume fuel, said fuel-off interval beginning when said signal-receiving means receives a fuel-"0" signal from said thermostat;
 initiating one of said delivery intervals, which begins when said signal-receiving means receives a delivery-"1" signal from said thermostat; and
 terminating said delivery interval and initiating a nondelivery interval in which said furnace does not deliver heat to said space, said nondelivery interval beginning when said signal-receiving means receives a delivery-"0" signal from said thermostat;

said thermostat including:
 a clock providing clock signals;
 a temperature sensor having means for providing a space-temperature signal representative of said space temperature;
 means for providing a set-point-temperature signal representative of a set-point temperature; and
 means for providing said fuel-"0," fuel-"1," delivery-"0," and delivery-"1" signals;

and said thermostat further comprising:
 means for providing a maximum-on signal representative of a maximum fuel-on interval, where said maximum-on signal is provided by signal generating means for providing a signal representative of how long said heat exchanger can operate during a fuel-on interval in a linear mode before its mode of operation becomes nonlinear; and
 burn-control means for causing a fuel-on interval to have a duration of no longer than said maximum fuel-on interval.

2. A thermostat according to claim 1, wherein said signal-generating means provides a signal representative of a maximum fuel-on interval which is specific to the particular heating system used to heat the defined space.

3. A thermostat according to claim 2, wherein said signal is provided by probe means for measuring changes over time of a monitored temperature representative of the temperature of the heat exchanger of said heating system.

4. A thermostat according to claim 3, wherein said signal is:
 representative of a maximum fuel-on interval which is specific to the particular heating system that was in fact installed at the site of the defined space; and
 empirically determined from measurements of said heating system in operation at said site.

5. A thermostat according to claim 4, wherein said probe means includes a temperature probe located in an air duct at said site and said monitored temperature is that of air in said air duct.

6. A thermostat according to claim 4, wherein said probe means includes a temperature probe located in or on a hot-water or steam source line at said site and said monitored temperature is representative of a temperature of fluid in said line.

7. A thermostat according to claim 3, wherein said probe means comprises:
a temperature probe for providing probe signals representative of temperature of said heat exchanger;
means for:
receiving said probe signals;
registering them at time intervals; and
providing signals representative of temperature increments that occur over said time intervals;
means for registering and storing a reference temperature increment signal representative of a reference start-up temperature increment over a start-up time interval occurring near the beginning of a delivery interval; and
means for:
comparing signals representative of temperature increments over successive said time intervals following said start-up time interval, said successive intervals occurring during a continuous fuel-on and delivery interval;
determining a stop-time point when one of said temperature increments has a normalized value equal to or less than a normalized value of said reference start-up temperature increment multiplied by a predetermined constant c, where $1>c>0$; and
providing a probe-means output signal which is representative of the total time elapsing between the beginning of said delivery interval and said stop-time point.

8. A thermostat according to claim 7, further comprising:
read-write memory means for storing a maximum-on signal representative of a maximum fuel-on interval; and
means for feeding said probe-means output signal to said read-write memory means, whereby said probe-means output signal is stored as said maximum-on signal.

9. A thermostat according to claim 7, wherein said temperature probe is removably coupled to said means for receiving said probe signals.

10. A thermostat according to claim 7, wherein said temperature probe is integrally coupled to said means for receiving said probe signals.

11. A thermostat in accordance with claim 1:
wherein said delivery means delivers heat for a delivery interval consisting of a primary-delivery interval and a secondary-delivery interval, where:
said primary-delivery interval generally coincides with a fuel-on interval and ends when said fuel-on interval ends, whereupon a fuel-off interval begins;
said secondary-delivery interval begins immediately after said primary-delivery interval ends; and
said fuel-off interval continues throughout said secondary-delivery interval;
wherein said thermostat further comprises:
further signal-generating means for providing a signal representative of said secondary-delivery interval; and
further burn-control means for causing a fuel-off interval to have a duration of no less than said secondary-delivery interval; and
wherein said further signal-generating means is a means for providing a signal representative of how long it takes after a fuel-off interval begins before said heat exchanger falls to a temperature level such that said heat exchanger can operate in a linear mode during a next-following fuel-on interval.

12. A thermostat in accordance with claim 11, wherein said further signal-generating means provides a signal representative of how long it took after a fuel-off interval began before said heat exchange fell to a temperature $T_{sd}$ such that the ratio of:
the difference $(T_{mx}-T_{sd})$ between said heat exchanger's temperature $T_{mx}$ when said immediately preceding fuel-on interval ended and said temperature $T_{sd}$, to
the difference $(T_{mx}-T_{mn})$ between said heat exchanger's temperature $T_{mx}$ when said fuel-on interval ended and said heat exchanger's temperature $T_{mn}$ when said fuel-on interval began is a predetermined constant c, where $1>c>0$, so that $(T_{mx}-T_{sd})/(T_{mx}-T_{mn})=c$.

13. A thermostat according to claim 11, wherein said signal representative of said secondary-delivery interval is provided by a probe means for measuring changes over time of a temperature monitored within the particular heating system installed at the site of the defined space.

14. A thermostat according to claim 13, wherein said probe means includes a temperature probe located in an air duct at said site and said monitored temperature is that of air in said air duct.

15. A thermostat according to claim 13, wherein said probe means includes a temperature probe located in or on a steam or hot-water source line at said site and said monitored temperature is representative of a temperature of fluid in said line.

16. A thermostat according to claim 13, wherein said probe means comprises:
a temperature probe for providing probe signals representative of temperature of said heat exchanger;
means for receiving and storing a reference probe signal which is a probe signal registered at a start-up time occurring when said fuel-off interval begins;
means for receiving further probe signals which are probe signals registered at successive times following said start-up time, during a continuous delivery interval occurring thereafter;
means for providing a first difference signal representative of a difference between said reference probe signal and a current one of said further probe signals;
means for providing a second difference signal representative of a difference between said reference probe signal, on the one hand, and either said set-point-temperature signal or said space-temperature signal, on the other hand;
means for providing a ratio signal representative of a ratio between said first and second difference signals;
means for determining a stop-time point when said ratio signal becomes equal to or more than a predetermined constant c, where $0<c<1$; and
means for providing a probe-means output signal which is representative of the total time elapsing between the end of said fuel-on interval and said stop-time point.

17. A thermostat according to claim 16, further comprising:
read-write memory means for storing said signal representative of a secondary-delivery interval; and
means for feeding said probe-means output signal to said read-write memory means, whereby said probe-means output signal is stored as said signal representative of a secondary-delivery interval.

18. A thermostat according to claim 16, wherein said temperature probe is removably coupled to said means for receiving said probe signals.

19. A thermostat according to claim 16, wherein said temperature probe is integrally coupled to said means for receiving said probe signals.

20. A thermostat according to claim 11, comprising:
means for providing fuel-"1" signals of a duration equal to said maximum fuel-on interval;
means for providing delivery-"1" signals during said fuel-"1" signals;
means for providing a fuel-0" signal after a fuel-"1" signal ends;
means for continuing to provide said delivery-"1" signals after said fuel-1" signals end, said delivery-1" signals continuing for an additional interval of a duration equal to said secondary-delivery interval;
means for providing a delivery-"0" signal after a delivery-"1" signal ends; and
means for terminating said delivery-"0" signal thereafter, and for then providing a fuel-"1" and a delivery-"1" signal, when a predetermined condition occurs.

21. A thermostat according to claim 20, comprising an increment-decrement unit for adjusting the duration of said delivery-"0" signals, said unit comprising:
means for storing a current signal representative of the duration of a most recently occurring delivery-"0" signal;
means for providing a decremented signal by decrementing said current signal by a signal representative of a predetermined decrementation interval, if a difference between said setpoint temperature and said space temperature became more than a predetermined temperature increment before the end of said most recently occurring delivery-"0" signal, and storing said decremented signal in place of said current signal; and
means for providing an incremented signal by incrementing said current signal by a signal representative of a predetermined incrementation interval, if the difference between said space temperature and said setpoint temperature became more than a predetermined temperature increment before the end of a most recently occurring delivery-"1" signal, and for storing said incremented signal in place of said current signal.

22. A thermostat according to claim 20, comprising:
first means for timing the duration of each said delivery-"0" signal; and
second means for sending a fuel-"1" signal to said signal-receiving means when said delivery-"0" signal reaches a duration such that: $F_{in}$ is approximately equal to $F_{out}$, where:
$F_{in}$ is total heat flux from said heating system to said space during a delivery-"1" immediately preceding said delivery-"0" signal; and
$F_{out}$ is total heat flux from said space to said ambient during said delivery-"0" signal and said delivery-"1" signal.

23. A thermostat according to claim 22, which is adapted for operation in a "computed-pause mode," wherein said second means sends a fuel-"1" signal to said signal-receiving means when said delivery-"0" signal reaches a duration of said maximum fuel-on interval times a ratio of parameters, said ratio being the value of a leakage-time system parameter, divided by the value of a charging-time system parameter, where:
said leakage-time system parameter is representative of an interval of time that elapses for said space to leak enough heat to said ambient to alter said space temperature by a given increment; and
said charging-time system parameter is representative of an interval of time that elapses for said space to receive enough heat from said heating system to alter said space temperature by said increment.

24. A thermostat according to claim 23 wherein the ratio of parameters is increased by a factor representative of a secondary-delivery effect, said factor being approximately 5 to 10 percent for a home forced-air heating system.

25. A thermostat according to claim 23, which is adapted for a "fixed-time-increment parameter determination," said thermostat comprising means for providing charging-time and leakage-time signals representative of said charging-time and leakage-time system parameters, said means comprising:
a counter for counting said clock signals from when said counter receives a count-start signal until a predetermined count is reached, said count being representative of a predetermined time interval, and for thereupon generating a count-end signal;
means for sending a count-start signal to said counter, and for thereupon reading said space-temperature signal, thereby providing a first signal representative of an initial value of said space temperature;
means for reading said space-temperature signal upon occurrence of said count-end signal, thereby providing a second signal representative of a final value of said space temperature;
means for sending said first signal and said second signal to a means for providing a difference signal representative of a difference between said first signal and said second signal, thereby providing a signal representative of a difference between said initial and final values of space temperature;
means for sending said difference signal to a means for providing a ratio between said difference signal and a signal representative of said predetermined time interval, thereby providing a system-parameter signal representative of said predetermined time interval divided by said difference in temperature values, or of the inverse thereof.

26. A thermostat according to claim 23, which is adapted for a "fixed-temperature-increment parameter determination," said thermostat comprising means for providing charging-time and leakage-time signals representative of said charging-time and leakage-time system parameters, said means comprising:
a counter for counting said clock signals from when said counter receives a count-start signal until said counter receives a count-end signal and for thereupon generating a time-count signal representative of an interval of time elapsed while said clock signals were counted;

means for sending a count-start signal to said counter, and for thereupon reading said space-temperature signal, thereby providing a first signal representative of an initial value of said space temperature;

means for sending said first signal and a signal representative of a predetermined temperature increment to a means for providing a second signal representative of a sum of said initial temperature value and said temperature increment;

means for subsequently reading said space-temperature signals, thereby providing further signals representative of subsequent values of said space temperature;

a comparator to one of whose inputs is fed said second signal and to another of whose inputs is fed said further signals, said comparator providing an output signal when said input signals are equal;

means for sending said output signal from said comparator to said counter as a count-end signal, causing said counter to generate said time-count signal;

means for sending said time-count signal to a means for providing a ratio between said time-count signal and a signal representative of said predetermined temperature increment, thereby providing a system-parameter signal representative of said interval of time elapsed divided by said predetermined temperature increment, or of the inverse thereof.

27. A thermostat according to claim 20, which is adapted for operation in a "demand pause determined by temperature excursion" mode, said thermostat further comprising:

means for reading said space-temperature signal at the beginning of a delivery interval, thereby providing a first signal;

means for subsequently reading said space-temperature signals during a nondelivery interval occurring immediately after said delivery interval has ended, thereby providing further signals; and a comparator for:
 comparing said first and further signals; and
 generating a fuel-"1" signal when a difference between said first and further signals becomes equal to or less than a predetermined threshold.

28. A thermostat according to claim 20, which is adapted for operation in a "demand pause determined by set-point" mode, said thermostat further comprising:

means for reading said space-temperature signals during a nondelivery interval, thereby providing further signals; and a comparator for: comparing said set-point-temperature signals and said further signals; and generating a fuel-"1" signal when a difference between said set-point-temperature and further signals becomes equal to or less than a predetermined threshold.

29. A thermostat in accordance with claim 28, comprising a comparator and a logic unit:

said comparator comprising means:
 for comparing signals representative of said space temperature and said set-point temperature;
 for causing transmission of a fuel-"0" signal to said signal-receiving means to occur if a difference between said space temperature and said set-point temperature is more than a first predetermined temperature increment;
 for generating a fuel-"1" signal, if a difference between said set-point temperature and said space temperature is less than a predetermined temperature increment, said signal being transmitted to said signal-receiving means if and only if enabled by said logic unit;

said logic unit having decision means:
 for terminating transmittal to said signal-receiving means of a fuel-"1" signal and instead transmitting a fuel-"0" signal to said signal-receiving means, whenever one of said fuel-on intervals becomes as long as said maximum fuel-on interval;
 for stopping a fuel-"1" signal from being transmitted to said signal-receiving means, and instead transmitting a fuel-"0" signal to said signal-receiving means, unless and until said fuel-"1" signal has been immediately preceded by a fuel-off interval at least as long as said secondary-delivery interval; and
 for permitting said fuel-"1" signals generated in said thermostat otherwise to be transmitted to said signal-receiving means.

30. A thermostat according to claim 20, said thermostat comprising:

means for providing three system states—A, B, and C; said states having state signals representative thereof—STATE_A, STATE_B, and STATE_C;

said state signals each having either the value "0" or else the value "1" and each of said state signals being mutually exclusive so that when any one of them is "1" the other two are "0";

means for sending "fuel" and "delivery" signals to said signal-receiving means in accordance with the following conditions of said state signals:
 when STATE_A=1, said thermostat sends a FUEL=1 signal and a DELIVERY=1 signal;
 when STATE_B=1, said thermostat sends a FUEL=O signal and a DELIVERY=1 signal; and
 when STATE_C=1, said thermostat sends a FUEL=O signal and a DELIVERY=0 signal; and cycling means for cyclically progressing among said states and state signals from STATE_A=1 to STATE_B=1 to STATE_C=1 to STATE_A=1 to . . . , wherein transitions between said values "0" and "1" occur in accordance with a set of predetermined conditions, said predetermined conditions comprising the following:
 a transition from STATE_A=1 to STATE_B=1 occurs if said STATE A signal has been "1" for an interval as long as said maximum fuel-on interval;
 a transition from STATE_B=1 to STATE_C=1 does not occur if said STATE_B signal has not been "1" for an interval as long as a secondary-delivery interval;
 a transition from STATE_C=1 to STATE_A=1 does not occur if it is not the case that a FUEL=0 signal has been in effect for an interval as long as said minimum fuel-off interval.

31. A thermostat according to claim 30, said predetermined conditions further comprising:

a transition from STATE_C=1 to STATE_A=1 does not occur if the difference between said set-point-temperature signal and said space-temperature signal fails to exceed a predetermined threshold; and a transition from STATE_C=1 to STATE_A=1 occurs if:
said difference exceeds said threshold;
said STATE_B signal has been "1" for an interval as long as a secondary-delivery interval; and
a FUEL=0 signal has been in effect for an interval as long as said minimum fuel-off interval.

32. A thermostat according to claim 11, wherein said burn-control means and/or said further burn-control means are coupled to disabling means for disabling said burn-control and/or further burn-control means.

33. A thermostat according to claim 32, wherein said disabling means does not operate unless said heating system has operated for a predetermined interval during which a difference between said set-point-temperature signal and said space-temperature signal exceeds a predetermined threshold.

34. A thermostat according to claim 32, wherein said disabling means does not operate unless actuated by a user-controlled input device.

35. A thermostat according to claim 32, comprising means for, when said disabling means is operating:
providing said fuel-"1" signals to said signal-receiving means when a difference between said set-point-temperature signal and said space-temperature signal exceeds a predetermined threshold; and
providing said fuel-"0" signals to said signal-receiving means when said difference does not exceed said predetermined threshold.

36. A thermostat according to claim 32, comprising means for, when said disabling means is operating:
providing said fuel-"1" signals of a duration greater than said maximum fuel-on interval by a predetermined incrementation factor;
providing said fuel-"0" signals of a duration which is no longer than a predetermined secondary-delivery interval.

37. A thermostat in accordance with claim 1, in combination with said furnace system and coupled to said signal-receiving means of said system, said combination comprising a fuel-conserving furnace system.

38. A fuel-conserving thermostat for controlling operation of a heating system that consumes fuel during a fuel-on interval and heats a defined space, thereby increasing a space temperature of said space; said space being thermally conductive to an ambient, whereby a heat flux occurs from said space to said ambient; said heating system comprising:
heating means for providing heat during said fuel-on interval;
delivery means for delivering said heat to said space during a delivery interval, whereby a heat flux occurs from said heating means to said space during said delivery interval;
a heat exchanger;
signal-receiving means, coupling said thermostat and said heating means, for:
initiating one of said fuel-on intervals, which begins when said signal-receiving means receives a fuel-"1" signal from said thermostat;
terminating said fuel-on interval and initiating a fuel-off interval in which said furnace does not consume fuel, said fuel-off interval beginning said signal-receiving means receives a fuel-"0" when signal-receiving means receives a fuel-"0" signal from said thermostat;
initiating one of said delivery intervals, which begins when said signal-receiving means receives a delivery-"1" signal from said thermostat; and
terminating said delivery interval and initiating a nondelivery interval in which said furnace does not deliver heat to said space, said nondelivery interval beginning when said signal-receiving means receives a delivery-"0" signal from said thermostat;
said thermostat including:
a clock providing clock signals;
a temperature sensor having means for providing a space-temperature signal representative of said space temperature;
means for providing a set-point-temperature signal representative of a set-point temperature; and
means for providing said fuel-"0," fuel-"1," delivery-"0," and delivery-"1" signals;
and said thermostat further comprising:
means for providing a maximum-on signal representative of a maximum fuel-on interval, said maximum-on signal being provided by signal-generating means for providing a signal representative of how long said heat exchanger can operate during a fuel-on interval in a linear mode before its mode of operation becomes nonlinear, said signal-generating means comprising a probe means for measuring changes over time of a temperature representative of the temperature of the heat exchanger of the specific heating system installed at the location of the defined space;
first burn-control means for causing a fuel-on interval having a duration of no longer than said maximum fuel-on interval;
delivery-control means for causing heat to be delivered to said space during a delivery interval comprising said fuel-on interval and continuing after it ends until said heat exchanger falls to a temperature level such that said heat exchanger can operate in a linear mode during a next-following fuel-on interval; and
second burn-control means for causing a nondelivery interval to follow said delivery interval for a duration at least as long as said heat exchanger takes to fall to said temperature level.

39. A thermostat in accordance with claim 38, further comprising third burn-control means for causing a fuel-off interval to have a duration such that it continues until its length bears a ratio to the length of said maximum fuel-on interval that is approximately equal to:
the length of time that it takes for said space temperature to fall by a given increment during a nondelivery interval/the length of time that it takes for said heating system to raise said space temperature by said given increment during a delivery interval.

40. A thermostat in accordance with claim 38, further comprising third burn-control means:
for causing a fuel-off interval to continue until said space temperature falls to a temperature level equal to the temperature of said space when the fuel-on interval immediately preceding said fuel-off interval began; and
for then causing a next fuel-on interval to begin.

41. A thermostat in accordance with claim 38 further comprising third burn-control means:
for causing a fuel-off interval to continue until said space temperature falls to said set-point temperature; and for then causing a next fuel-on interval to begin.

42. An apparatus for providing a signal representative of a maximum fuel-on interval for a furnace, said interval being how long a heat exchanger for said furnace can operate during a fuel-on interval in a linear mode before its mode of operation becomes nonlinear, said apparatus comprising:

a temperature probe for providing probe signals representative of temperature of said heat exchanger;

means for:
  receiving said probe signals;
  registering said probe signals at time intervals; and
  providing signals representative of temperature increments occuring over said time intervals;

means for registering and storing a reference temperature increment signal representative of a reference start-up temperature increment over a start-up time interval occurring near the beginning of a delivery interval; and means for:
  comparing signals representative of temperature increments over successive said time intervals following said start-up time interval, said successive intervals occurring during a continuous fuel-on and delivery interval;
  determining a stop-time point when one of said temperature increments has a normalized value equal to or less than a normalized value of said reference start-up temperature increment multiplied by a predetermined constant c, where $0<c<1$; and
  providing a probe-means output signal which is representative of the total time elapsing between the beginning of said delivery interval and said stop-time point.

43. An apparatus for providing a signal representative of a secondary-delivery interval, said interval being how long it takes after a fuel-off interval of a furnace begins before a heat exchanger of said furnace falls to a temperature level such that said heat exchanger can operate in a linear mode during a fuel-on interval following said fuel-off interval, said apparatus comprising:

a temperature probe for providing probe signals representative of temperature of said heat exchanger;

means for receiving and storing a reference probe signal which is a probe signal registered at a start-up time occurring when said fuel-off interval begins;

means for receiving further probe signals which are probe signals registered at successive times following said start-up time, during a continuous delivery interval occurring thereafter;

means for providing a first difference signal representative of a difference between said reference probe signal and a current one of said further probe signals;

means for providing a second difference signal representative of a difference between said reference probe signal, on the one hand, and either said set-point-temperature signal or said space-temperature signal, on the other hand;

means for providing a ratio signal representative of a ratio between said first and second difference signals;

means for determining a stop-time point when said ratio signal becomes equal to or more than a predetermined constant c, where $0<c<1$; and means for providing a probe-means output signal which is representative of the total time elapsing between the end of said fuel-on interval and said stop-time point.

44. A method for conserving energy utilization in a heating system for heating a defined space and thereby increasing a space temperature of said space; said space being thermally conductive to an ambient, whereby a heat flux occurs from said space to said ambient; said heating system consuming fuel, during a fuel-on interval, to provide heat;

delivering said heat, during a delivery interval, to said space;

having a heat exchanger;

having signal-receiving means coupled to a thermostat, for:
  initiating one of said fuel-on intervals, which begins when said means receives a fuel-"1" signal from said thermostat;
  terminating said fuel-on interval and initiating a fuel-off interval in which said heating system does not consume fuel, said fuel-off interval beginning when said signal-receiving means receives a fuel-"0" signal from said thermostat;
  initiating one of said delivery intervals, which begins when said signal-receiving means receives a delivery-"1" signal; and
  terminating said delivery interval and initiating a nondelivery interval, during which said heating system does not deliver heat to said space, said nondelivery interval beginning when said signal-receiving means receives a delivery-"0" signal said method comprising:
(1) providing said thermostat with a signal maximum-on representative of a maximum fuel-on interval, where said maximum fuel-on interval is how long said heat exchanger can operate during a fuel-on interval in a linear mode before its mode of operation becomes nonlinear;
(2) sending from said thermostat to said signal-receiving means fuel-"1" signals of duration no longer than said maximum fuel-on interval;
(3) when one of said fuel-"1" signals reaches a duration of said maximum fuel-on interval, sending a fuel-"0" signal from said thermostat to said signal-receiving means; and
(4) sending from said thermostat to said signal-receiving means delivery-"1" signals while said thermostat sends said fuel-"1" signals.

45. A method according to claim 44, wherein said maximum fuel-on interval is specific to the particular heating system used to heat the defined space and is empirically determined by making time and temperature measurements of said system when it is in operation.

46. A method according to claim 45, wherein said maximum-on signal is provided by:
(a) measuring changes over time of a monitored temperature representative of the temperature of the heat exchanger of the specific heating system that heats the defined space;
(b) comparing successive said changes with one another to determine whether said changes occur linearly; and
(c) measuring for how long a time interval said changes occur linearly and providing an output signal representative of said interval.

47. A method according to claim 46, wherein said monitored temperature is monitored by placing a temperature probe in an air duct of said heating system and said monitored temperature is that of air in said duct.

48. A method according to claim 45, wherein said monitored temperature is monitored by placing a temperature probe in or on a steam or hot-water source line of said heating system and said monitored temperature is representative of a temperature of fluid in said line.

49. A method according to claim 46, wherein said maximum-on signal is provided by carrying out the following steps:
(a) allowing said heat exchanger to approach an ambient temperature, during a fuel-off state;
(b) beginning a continuous fuel-on and delivery interval, starting to measure time elapsed since the beginning of said interval, and providing a clock signal representative of said elapsed time;
(c) placing a temperature probe in a location having a temperature representative of the temperature of said heat exchanger, thereby providing probe signals;
(d) registering a first reference probe signal representative of the temperature of said heat exchanger at a time near the beginning of said delivery interval;
(e) registering a second reference probe signal representative of the temperature of said heat exchanger after a predetermined time interval has elapsed after said first reference probe signal is registered;
(f) providing a reference difference signal representative of a difference between said first and second reference probe signals, thereby providing a signal representative of a start-up temperature increment over a start-up time interval;
(g) registering further probe signals at subsequent times,
(h) providing further difference signals representative of differences between successive probe signals, thereby providing signals representative of successive temperature increments for the temperature of said heat exchanger over successive time intervals during said continuous fuel-on and delivery interval;
(i) comparing said reference difference signal with said further difference signals;
(j) determining a stop-time point when one of said further difference signals has a normalized value equal to or less than a normalized value of said reference difference signal multiplied by a predetermined constant c, where $0 < c < 1$; and
(k) registering said clock signal at said stop-time point, providing an output signal representative of total time elapsed since the beginning of said delivery interval.

50. A method according to claim 48, comprising feeding said output signal to said thermostat and storing it to provide said thermostat with said maximum-on signal.

51. A method according to claim 44 further comprising:
(1) providing said thermostat with a secondary-delivery signal representative of a secondary-delivery interval, where said secondary-delivery interval is how long it takes after a fuel-off interval of a furnace begins before a heat exchanger of said furnace falls to a temperature level such that said heat exchanger can operate in a linear mode during a fuel-on interval immediately following said fuel-off interval;
(2) when one of said fuel-"1" signals ends, sending from said thermostat to said signal-receiving means:
(a) a fuel-"0" signal having a duration at least as long as said secondary-delivery interval; and
(b) a delivery-"1" signal of duration equal to said secondary-delivery interval; and
(3) thereafter sending from said thermostat to said signal-receiving means a delivery-"0" signal until a next fuel-"1" signal begins.

52. A method according to claim 51, wherein said secondary-delivery signal is provided by measuring changes over time of a monitored temperature representative of the temperature of the heat exchanger of the specific heating system of the defined space.

53. A method according to claim 52 wherein said monitored temperature is measured by placing a temperature probe in an air duct of said heating system and measuring air temperature in said duct.

54. A method according to claim 52 wherein said monitored temperature is measured by placing a temperature probe in or on a steam or hot-water source line and measuring fluid temperature in said line or measuring a temperature representative of said fluid temperature.

55. A method according to claim 52, wherein said secondary-delivery signal is provided by:
(a) placing a temperature probe in a location having a temperature representative of the temperature of said heat exchanger, thereby providing probe signals;
(b) registering and storing a reference probe signal representative of the temperature of said heat exchanger at the end of a fuel-on interval;
(c) commencing a continuous fuel-off and delivery interval for said heating system, after the end of said fuel-on interval;
(d) starting a clock signal representative of elapsed time;
(e) registering further probe signals representative of temperature at subsequent times;
(f) processing said probe signals to provide (i) a first difference signal representative of a difference between said reference probe signal and a reference-temperature signal representative of the temperature of said heat exchanger at one of said subsequent times; (ii) a second difference signal representative of a difference between said reference probe signal and a limit-point-temperature signal representative of a lower limit which the temperature of said heat exchanger approaches; and (iii) a ratio signal representative of a ratio between said first and second difference signals;
(g) providing a stop-clock signal when the value of said ratio signal becomes equal to or more than a predetermined constant c, where $1 > c > 0$; and
(h) providing an output signal representative of the total time elapsing between when said fuel-on interval ends and when said stop-clock signal is provided.

56. A method according to claim 55, wherein said temperature probe is placed in an air duct of said heating system and said reference probe signal is indicative of a maximum air temperature in said duct.

57. A method according to claim 56, wherein said limit-point-temperature signal is indicative of said space temperature.

58. A method according to claim 56, wherein said limit-point-temperature signal is indicative of said set-point temperature.

59. A method according to claim 55, comprising a further step of feeding said output signal to said thermostat and storing said output signal to provide said secondary-delivery signal.

60. A method according to claim 55, wherein said temperature probe is removably coupled to said thermostat.

61. A method according to claim 55, wherein said temperature probe is integrally coupled to said thermostat.

62. A method according to claim 45, further comprising adjusting the duration of said delivery-"0" signals by:
  (a) storing a current signal representative of the duration of a most recently occurring delivery-"0" signal;
  (b) providing a decremented signal by decrementing said current signal by a signal representative of a predetermined decrementation interval, if a difference between said set-point temperature and said space temperature became more than a predetermined temperature increment before the end of said most recently occurring delivery-"0" signal, and storing said decremented signal in place of said current signal; and
  (c) providing an incremented signal by incrementing said current signal by a signal representative of a predetermined incrementation interval, if the difference between said space temperature and said set-point temperature became more than a predetermined temperature increment before the end of a most recently occurring delivery-"1" signal, and storing said incremented signal in place of said current signal.

63. A method according to claim 45, wherein no fuel-"1" signal is provided unless and until said nondelivery interval has reached a duration such that total heat flux from said space to said ambient during said nondelivery interval and an immediately preceding delivery interval approximates total heat flux from said HVAC apparatus to said space during said delivery interval.

64. A method according to claim 45, which is adapted to a "computed-pause mode of operation," wherein no fuel-"1" signal is provided unless and until said nondelivery interval has reached a duration of said maximum fuel-on interval times a ratio which is (the value of a leakage-time system parameter)/(the value of a charging-time system parameter), said ratio being optionally corrected for a secondary-delivery interval, where:
  said leakage-time system parameter is representative of an interval of time that elapses for said space to leak enough heat to said ambient to alter said space temperature by a given increment; and
  said charging-time system parameter is representative of an interval of time that elapses for said space to receive enough heat from said apparatus to alter said space temperature by said increment.

65. A method according to claim 64, which is adapted for a "fixed-time-increment parameter determination," wherein charging-time and leakage-time signals representative of said charging-time and leakage-time system parameters are provided by:
  (1) starting a count of clock signals;
  (2) measuring said space temperature, providing a first space-temperature signal representative of said space temperature when said count begins;
  (3) continuing said count of clock signals until a predetermined count is reached, said predetermined count being representative of a predetermined time interval;
  (4) measuring said space temperature, providing a second space-temperature signal representative of said space temperature when said count predetermined is reached;
  (5) sending said first space-temperature signal and said second space-temperature signal to a means for providing a difference signal representative of the difference between said space temperatures; and
  (6) sending said difference signal to a means for providing a signal representative of a ratio between said predetermined time interval and said difference between said space temperatures, or of the inverse thereof.

66. A method according to claim 64, which is adapted for a "fixed-temperature-increment parameter determination," wherein charging-time and leakage-time signals representative of said charging-time and leakage-time system parameters are provided by:
  (1) starting a count of clock signals;
  (2) measuring said space temperature and providing a first space-temperature signal representative of said space temperature when said count begins;
  (3) adding to said first space-temperature signal a signal representative of a predetermined temperature increment and providing a second signal representative of the sum of said space temperature when said count begins and said temperature increment;
  (4) measuring said space temperature and providing further space-temperature signals representative of subsequent values of said space temperature;
  (5) comparing said further signals with said second signal;
  (6) continuing said count of clock signals until one of said further signals equals said second signal;
  (7) thereupon stopping said count and providing a time-count signal representative of ah interval of time that elapsed while said space temperature changed by said temperature increment from its value when said count began; and
  (8) sending said time-count signal to a means for providing a signal representative of a ratio of said interval of time and said predetermined temperature increment, or of the inverse thereof.

67. A method according to claim 45, which is adapted for a "demand pause determined by temperature excursion" mode of operation, wherein no fuel-"1" signal is provided unless and until a difference between a first space-temperature signal representative of said space temperature at the beginning of a delivery interval, on the one hand, and a further space-temperature signal representative of said space temperature during a nondelivery interval immediately following said delivery interval, on the other hand, must have become less than a predetermined threshold, said method further comprising:
  (a) registering and storing said first space-temperature signal;

(b) registering said further space-temperature signals;

(c) comparing said difference in first and further space-temperature signals, and providing an output signal when said difference is less than said threshold.

68. A method according to claim 45, which is adapted for a "demand pause determined by set-point" mode of operation, wherein said no fuel-"1" signal is provided unless and until a difference between a set-point-temperature signal representative of a set-point temperature, on the one hand, and a further space-temperature signal representative of said space temperature during a nondelivery interval immediately following said delivery interval, on the other hand, becomes less than a predetermined threshold, said method further comprising:

(a) registering and storing said set-point temperature signal;

(b) registering said further space-temperature signals;

(c) comparing said difference between said set-point-temperature signal and said further space-temperature signal, and providing an output signal when said difference is less than said threshold.

69. A method according to claim 68 wherein said fuel-"1" signal is not sent to said signal-receiving means unless and until said fuel-"1" signal has been preceded by a fuel-"0" signal whose duration was at least as long as said secondary-delivery interval.

70. A method according to claim 45, said method further comprising:

(a) comparing signals representative of said space temperature and a set-point temperature;

(b) generating a fuel-"0" signal and transmitting it to said signal-receiving means, when the difference between said space temperature and said set-point temperature becomes more than a predetermined temperature increment;

(c) generating a fuel-"1" signal, when the difference between said set-point temperature and said space temperature becomes more than a predetermined temperature increment; and (d) transmitting fuel-"1" signals to said signal-receiving means if said transmittal is enabled, and generating and transmitting a fuel-"0" signal to said signal-receiving means in lieu thereof if said transmittal is prevented or terminated, in accordance with the following criteria:

(i) terminating transmittal of a fuel-"1" signal whenever its duration exceeds said maximum fuel-on interval;

(ii) preventing transmittal of a fuel-"1" signal unless and until it has been immediately preceded by a fuel-"0" signal of duration at least that of said secondary-delivery interval; and (iii) enabling transmittal of a fuel-"1" signal in the absence of conditions (i) or (ii).

71. A method according to claim 45, comprising:

(a) providing three system states within said thermostat—A, B, and C; said states having state signals representative thereof—STATE_A, STATE_B, and STATE_C; said state signals each having either the value "0" or else the value "1" and each of said state signals being mutually exclusive so that when any one of said state signals is "1" the other two are "0";

(b) sending FUEL=0, FUEL=1, DELIVERY=0, and DELIVERY=1 signals from said thermostat to said signal-receiving means in accordance with the following conditions of said state signals:

(1) when STATE_A=1, sending a FUEL=1 signal and a DELIVERY=1 signal;

(2) when STATE_B=1, sending a FUEL=0 signal and a DELIVERY=1 signal; and (3) when STATE_C=1, sending a FUEL=0 signal and a DELIVERY=0 signal; and (c) cyclically progressing among said states and state signals from STATE_A=1 to STATE_B=1 to STATE_C=1 to STATE_A=1 to wherein transitions between said values "0" and "1" occur in accordance with a set of predetermined conditions, said predetermined conditions comprising the following:

(1) a transition from STATE_A=1 to STATE_B=1 occurs if said STATE_A signal has been "1" for an interval as long as said maximum fuel-on interval;

(2) a transition from STATE_B=1 to STATE_C=1 does not occur if said STATE_B signal has not been "1" for an interval as long as a secondary-delivery interval;

(3) a transition from STATE_C=1 to STATE_A=1 does not occur if it is not the case that a FUEL=0 signal has been in effect for an interval as long as said secondary-delivery interval.

72. A method according to claim 71, said predetermined conditions further comprising:

(a) a transition from STATE_C=1 to STATE_A=1 does not occur if the difference between said set-point-temperature signal and said space-temperature signal fails to exceed a predetermined threshold; and (b) a transition from STATE_C=1 to STATE_A=1 occurs if:

(1) said difference exceeds said threshold; said STATE_B signal has been "1" for an interval as long as a secondary-delivery interval; and (2) a FUEL=0 signal has been in effect for an interval as long as said minimum fuel-off interval.

73. A method according to claim 45 wherein said fuel-"1" signal is no longer limited to said maximum fuel-on interval, when at least one of the following predetermined conditions is met:

(a) said heating system has operated for a predetermined interval during which a difference between a set-point temperature and a space temperature has exceeded a predetermined threshold; and (b) a user-actuated input device has been actuated.

74. A method according to claim 73 wherein, when said predetermined condition is met, said furnace goes into a continuous-burn mode until said space temperature rises to within a predetermined threshold of said set-point temperature.

75. A method according to claim 73 wherein, when said predetermined condition is met, said fuel-on interval is increased above said maximum fuel-on interval by an incrementation factor.

76. A method according to claim 45, adapted to making a transition between a pair of set-point temperatures, said method further comprising:

(a) providing a first set-point temperature at which said heating system is to be regulated during a first time interval;

(b) providing a second set-point temperature at which said heating system is to be regulated during a second time interval, where said second time interval follows said first time interval and said second set-point temperature exceeds said first set-point temperature by a set-back temperature interval S;

(c) providing an arrival-time signal representative of a time $t_{ar}$ when said second time interval is to begin;

(d) during said first time interval, measuring a temperature rise $\Delta T$ that occurs during a time interval $\Delta t$ in which a maximum fuel-on interval is followed by a secondary-delivery interval;

(e) providing a transition signal representative of a ratio R of said set-back temperature interval S to said temperature rise $\Delta T$, where $R = S/\Delta T$ and is the number of cycles of a maximum fuel-on interval followed by a secondary-delivery interval needed to make a transition from said first set-point temperature to said second set-point temperature;

(f) providing a transition-time signal representative of $R \times \Delta t$, which is the time $t_{tr}$ needed to execute said R number of cycles;

(g) deriving from said transition-time signal and said arrival-time signal a start-time signal representative of a start-up time which is said time $t_{ar}$ less said time $t_{tr}$; and (h) at said start-time, placing said heating system in a continuous-delivery mode of operation in which said furnace alternates between a maximum fuel-on interval and a fuel-off secondary-delivery interval, without any nondelivery interval, said mode continuing until said space temperature approaches said second set-point temperature within a predetermined threshold.

77. A method for conserving energy utilization in a heating system for heating a defined space and thereby increasing a space temperature of said space; said space being thermally conductive to an ambient, whereby a heat flux occurs from said space to said ambient; said heating system consuming fuel, during a fuel-on interval, to provide heat;

delivering said heat, during a delivery interval, to said space;

having a heat exchanger; and having signal-receiving means coupled to a thermostat, for:

initiating one of said fuel-on intervals, which begins when said means receives a fuel-"1" signal from said thermostat;

terminating said fuel-on interval and initiating a fuel-off interval in which said heating system does not consume fuel, said fuel off-interval beginning when said signal-receiving means receives a fuel-"0" signal from said thermostat;

initiating one of said delivery internals, which begins when said signal-receiving means receives a delivery-"1" signal; and terminating said delivery interval and initiating a mondelivery interval, during which said heating system does not deliver heat to said space, said nondelivery interval beginning when said signal-receiving means receives a delivery-"0" signal said method comprising:

(1) measuring a maximum fuel-on interval, said interval being how long said heat exchanger can operate during a fuel-on interval in a linear mode before its mode of operation becomes nonlinear;

(2) providing a maximum-on signal representative of the duration of said maximum fuel-on interval;

(3) providing said maximum-on signal to said thermostat;

(4) measuring a secondary-delivery interval, said interval being how long said heat exchanger takes to cool from its temperature at the end of a maximum fuel-on interval to a temperature level such that said heat exchanger can operate in a linear mode during a next-following fuel-on interval;

(5) providing a secondary-delivery signal representative of the duration of said secondary-delivery interval;

(6) providing said secondary-delivery signal to said thermostat;

(7) sending from said thermostat to said signal-receiving means a fuel-"1" signal of duration no longer than said maximum fuel-on interval;

(8) when one of said fuel-"1" signals reaches a duration of said maximum fuel-on interval, sending a fuel-"0" signal from said thermostat to said signal-receiving means;

(9) sending from said thermostat to said signal-receiving means a delivery-"1" signal while said thermostat sends one of said fuel-"1" signals and continuing said delivery-"1" signal thereafter until said secondary-delivery interval ends;

(10) preventing any fuel-"1" signal from being sent from said thermostat to said signal-receiving means before said secondary-delivery interval ends, thereby providing a fuel-off interval that continues at least until said secondary-delivery interval ends; and

(11) sending from said thermostat to said signal-receiving means a delivery-"0" signal when said secondary-delivery interval ends, thereby terminating a delivery interval and initiating a nondelivery interval.

78. A method according to claim 77, comprising the additional steps of:

(a) continuing said nondelivery interval until the ratio of its length to the length of said maximum fuel-on interval is approximately equal to:

the length of time that it takes for said space temperature to fall by a given increment during a nondelivery interval;

the length of time that it takes for said heating system to raise said space temperature by said given increment during a delivery interval;

(b) continuing said fuel-off interval until said nondelivery interval ends; and (c) then causing a next fuel-on interval to begin.

79. A method according to claim 77, comprising the additional steps of:

(a) continuing said nondelivery interval until said space temperature falls to a temperature level equal to the temperature of said space when the fuel-on interval immediately preceding said fuel-off interval began; and (b) continuing said fuel-off interval until said nondelivery interval ends; and (c) then causing a next fuel-on interval to begin.

80. A method according to claim 77, comprising the additional steps of:

(a) continuing said nondelivery interval until said space temperature falls to said set-point temperature;

(b) continuing said fuel-off interval until said nondelivery interval ends; and (c) then causing a next fuel-on interval to begin.

81. A method for decreasing utility peak load comprising installing individual thermostats to control heating systems of a set of separate buildings, said thermostats limiting fuel-on intervals of said heating systems to less than a 100-percent duty cycle, where said fuel-on intervals are how long said heating system's heat exchanger can operate in a linear mode during a fuel-on interval before operating in a nonlinear mode.

82. A method for decreasing or limiting peak-load usage of fuel, said method comprising installing in buildings thermostats to control heating systems of said buildings, said thermostats comprising:

means for limiting a fuel-on interval of a heating system, during which said heating system consumes fuel, to no longer than a predetermined maximum fuel-on interval, where said maximum on-time interval is how long said heating system's heat exchanger can operate in a linear mode during a fuel-on interval before operating in a nonlinear mode; and means for initiating a fuel-off interval of said heating system, during which said heating system does not consume fuel, said interval continuing for at least a predetermined secondary-delivery interval.

83. A method for decreasing or limiting peak-load usage of fuel, said method comprising installing in buildings thermostats to control heating systems of said buildings, said thermostats comprising:

means for limiting a fuel-on interval of a heating system, during which said heating system consumes fuel, to no longer than a predetermined maximum fuel-on interval; and means for initiating a fuel-off interval of said heating system, during which said heating system does not consume fuel, said interval continuing for at least a predetermined secondary-delivery interval, where said secondary-delivery interval is how long said heating system's heat exchanger takes to return, after a fuel-on interval ends, to a temperature level such that said heat exchanger operates in a linear mode in a next-succeeding fuel-on interval.

84. A method for decreasing or limiting peak-load usage of fuel, said method comprising installing thermostats in buildings to control heating systems of said buildings, where said thermostats:

(a) limit fuel-on intervals of said heating systems, during which said heating systems consume fuel, to no longer than predetermined maximum fuel-on intervals, where said maximum on-time interval is how long said heating system's heat exchanger can operate in a linear mode during a fuel-on interval before operating in a nonlinear mode; and (b) initiate fuel-off intervals of said heating systems, during which said heating systems do not consume fuel, said intervals continuing for at least a secondary-delivery interval.

85. A method for decreasing or limiting peak-load usage of fuel, said method comprising installing thermostats in buildings to control heating systems of said buildings, where said thermostats:

(a) limit fuel-on intervals of said heating systems, during which said heating systems consume fuel, to no longer than predetermined maximum fuel-on intervals; and (b) initiate fuel-off intervals of said heating systems, during which said heating systems do not consume fuel, said intervals continuing for at least a secondary-delivery interval, where said secondary-delivery interval is how long said heating system's heat exchanger takes to return, after a fuel-on interval ends, to a temperature level such that said heat exchanger operates in a linear mode in a next-succeeding fuel-on interval.

* * * * *